July 17, 1956  T. A. BANNING, JR  2,755,334
COLOR TELEVISION AND THE LIKE
Filed July 9, 1951  12 Sheets-Sheet 1

Inventor:

July 17, 1956   T. A. BANNING, JR   2,755,334
COLOR TELEVISION AND THE LIKE
Filed July 9, 1951   12 Sheets-Sheet 2

Key to Translations:
A — Normal Scan.
B — Normal Interlace.
C — Offset Scan.
D — Offset Interlace.

Inventor:
Thos. A. Banning Jr.

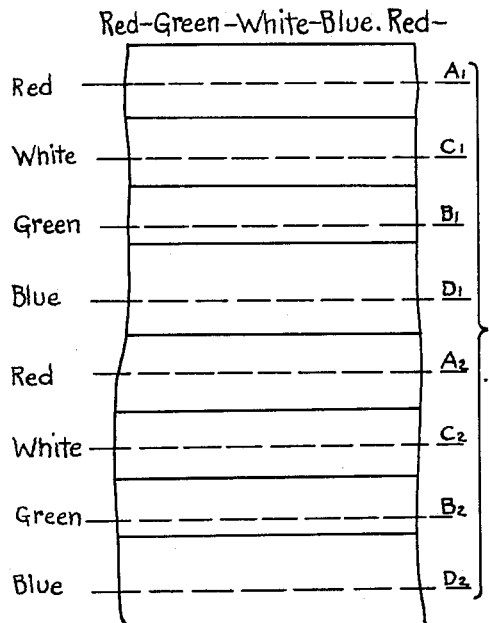
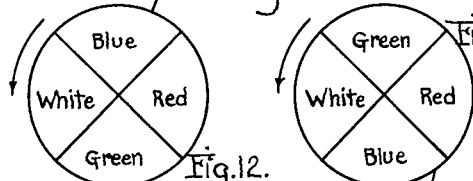
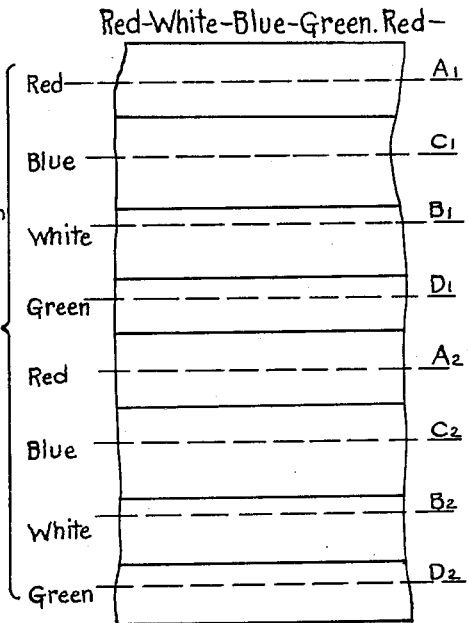
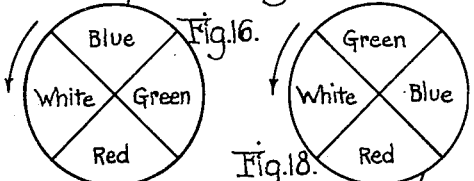
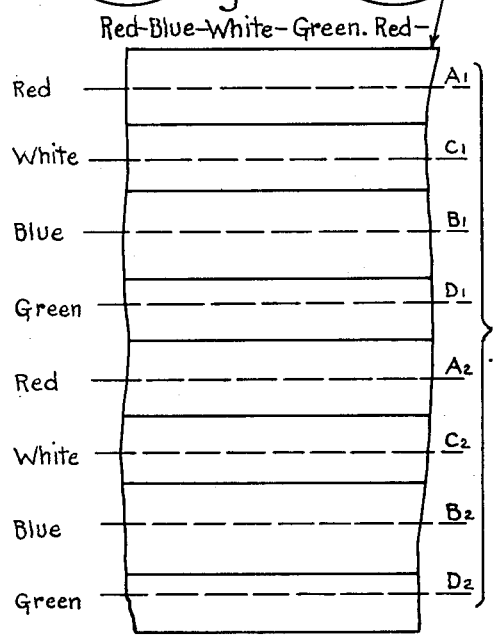
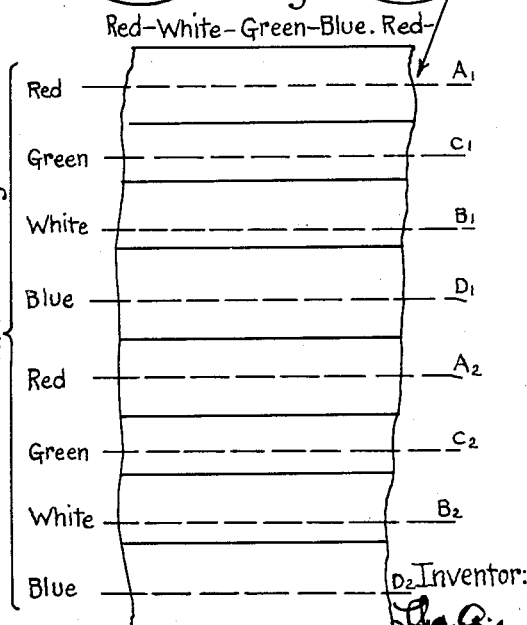

July 17, 1956
T. A. BANNING, JR
2,755,334
COLOR TELEVISION AND THE LIKE
Filed July 9, 1951
12 Sheets-Sheet 4
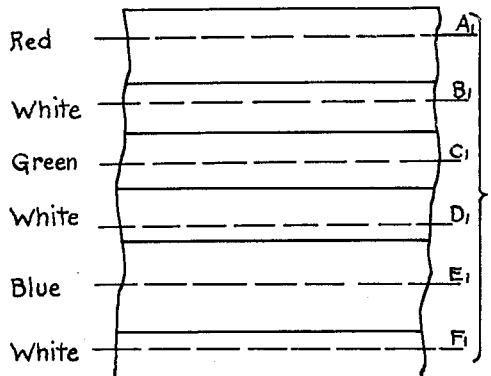
Fig.19.
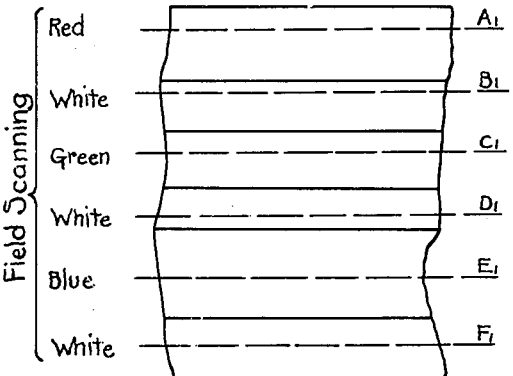
Fig.21.
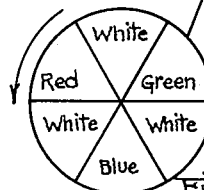
Fig.20.
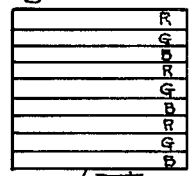
Fig.22.
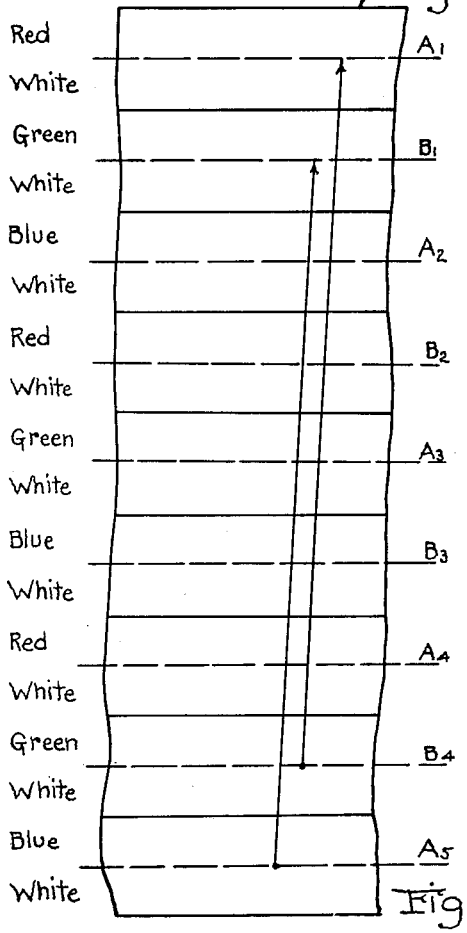
Fig.23.
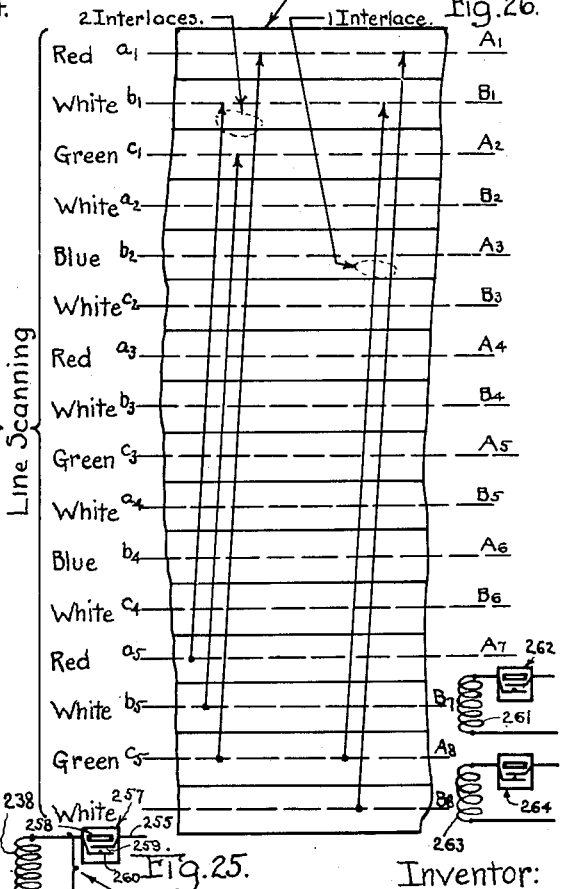
Fig.25.
Fig.24.
Fig.26.
Vertical beam shift control effected by strength of kinescope electron beam.
Inventor:

July 17, 1956
T. A. BANNING, JR
2,755,334
COLOR TELEVISION AND THE LIKE
Filed July 9, 1951
12 Sheets-Sheet 5
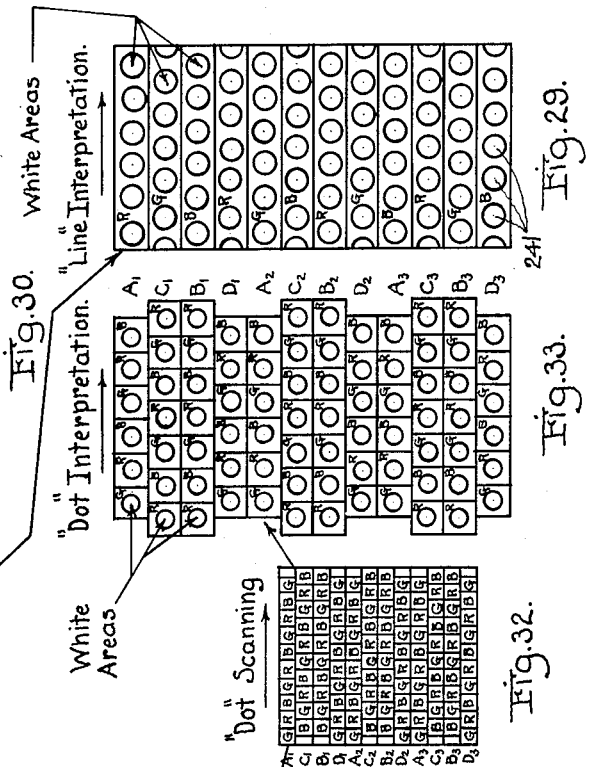
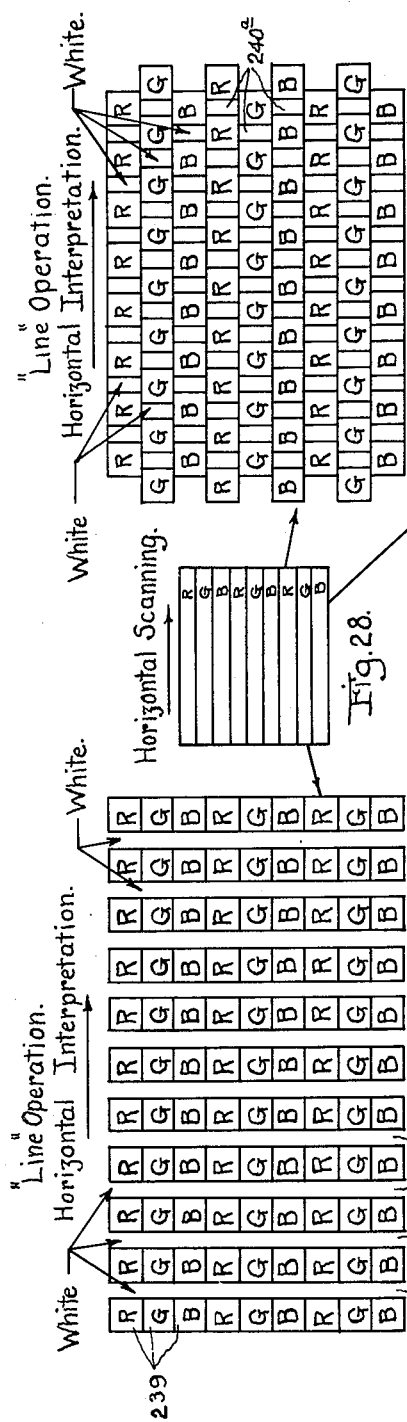
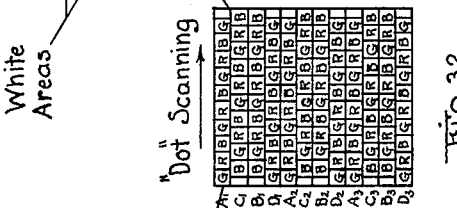
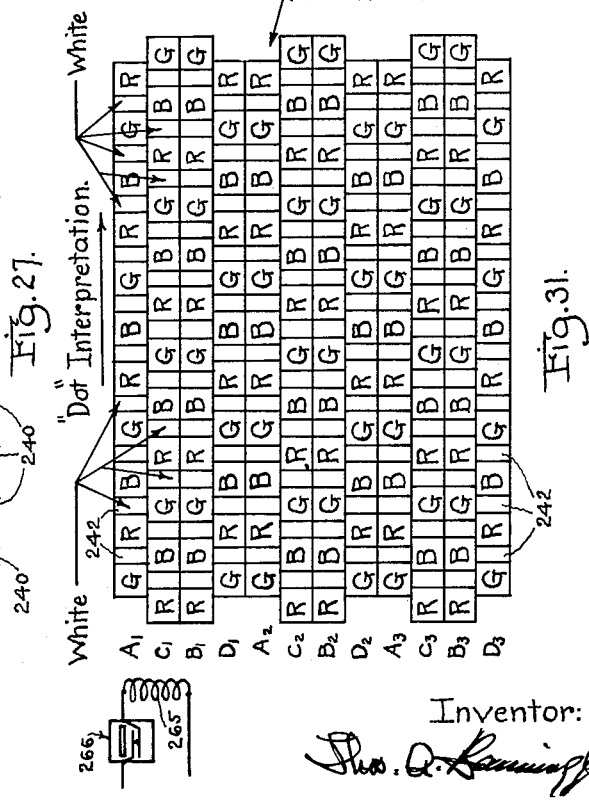
Inventor:
Thos. A. Banning Jr.

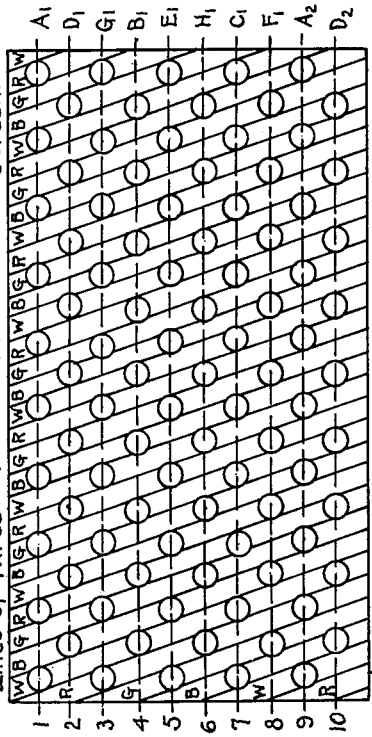

Fig. 37.

Single Beam Kinescope Executing Straight Linear Scans and placing successive Dots on Successive Lines of Three Color and White Lineated Screen.

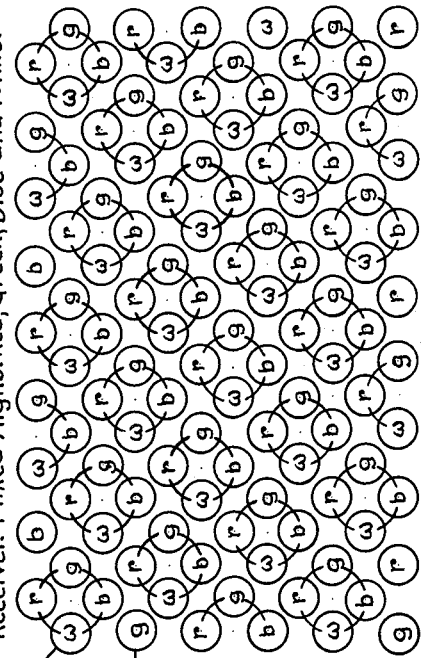

Fig. 34.

Sending Station. Four Quartering Signals sent to Receiver. Mixed Highs. Red, Green, Blue and White.

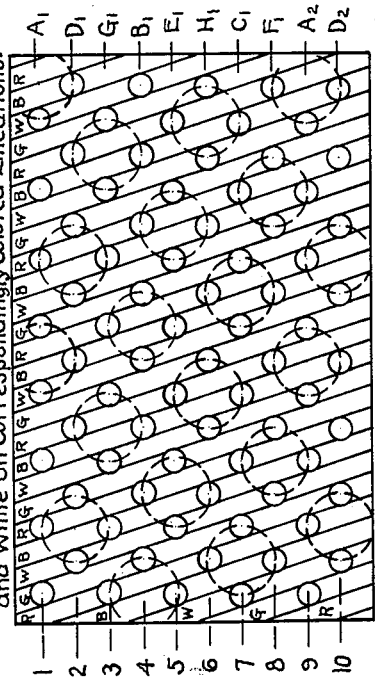

Fig. 36.

Single Gun Kinescope Having Linearly Movable Rotating Beam Placing Dots for Three Colors and White on Correspondingly Colored Lineations.

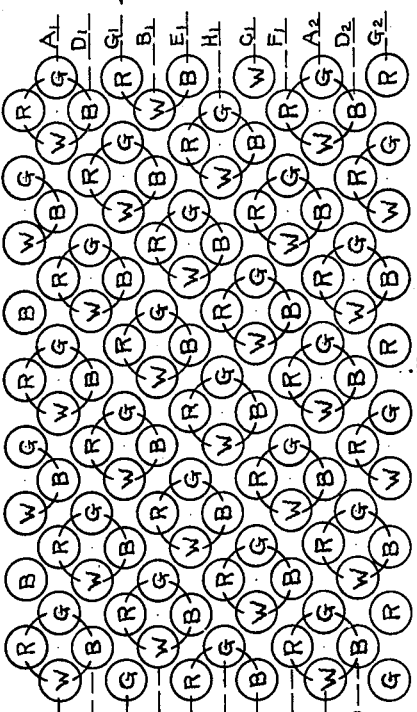

Fig. 35.

Color Dots and White Dot Receiver. Single-Gun Rotating Beam Three Color and White Kinescope, or Four-Gun, Four Color Kinescope Receiver, or Four One-Color Kinescopes Receiver. Includes white dots.

Inventor:

July 17, 1956
T. A. BANNING, JR
2,755,334
COLOR TELEVISION AND THE LIKE
Filed July 9, 1951
12 Sheets-Sheet 7
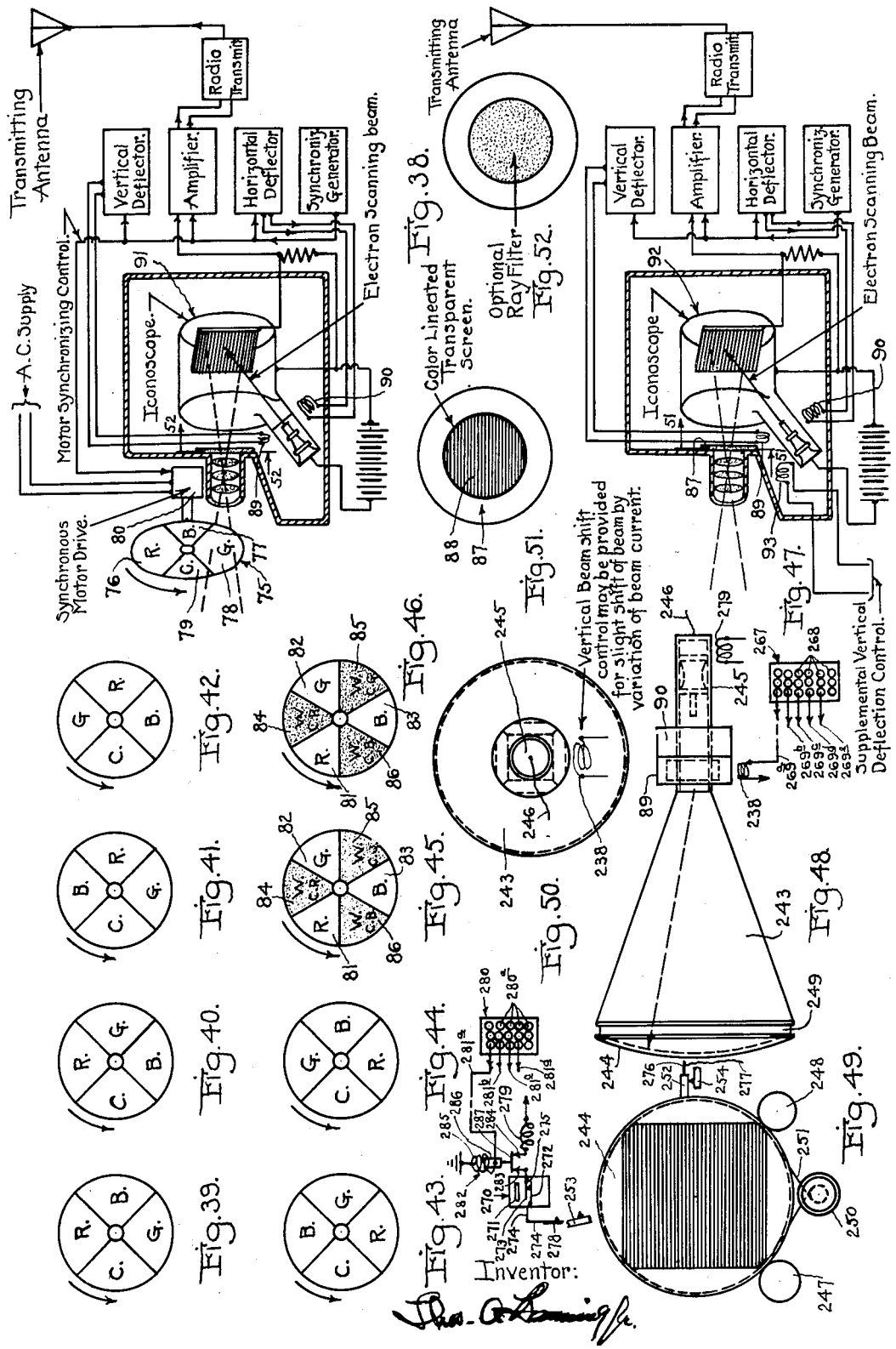

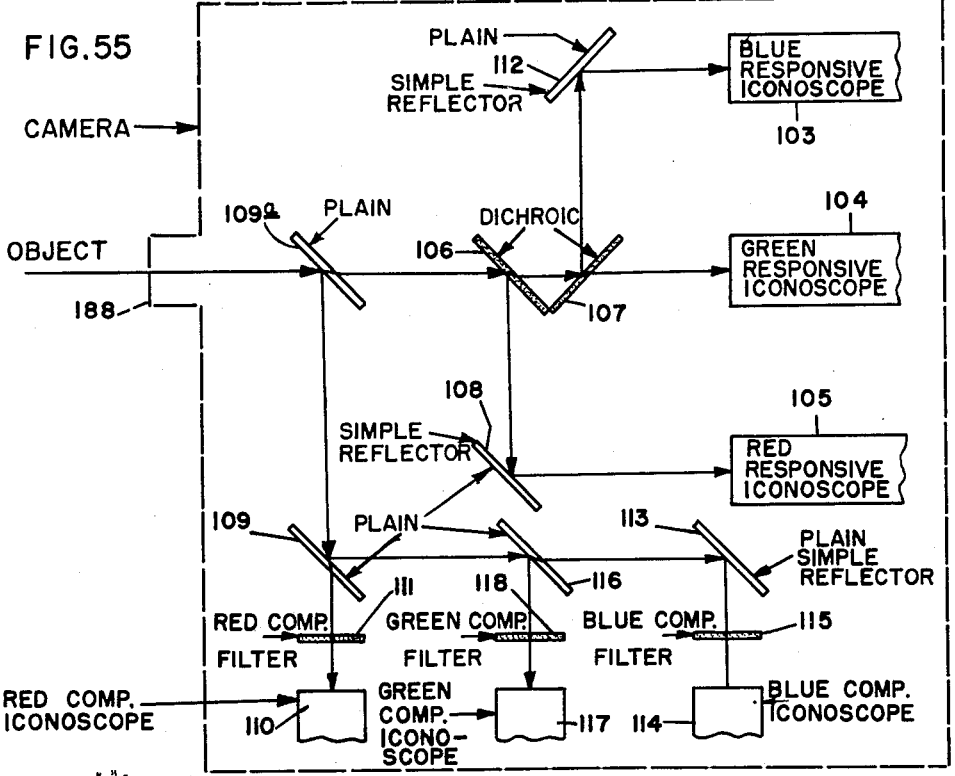

July 17, 1956  T. A. BANNING, JR  2,755,334
COLOR TELEVISION AND THE LIKE
Filed July 9, 1951  12 Sheets-Sheet 10

Inventor:

July 17, 1956  T. A. BANNING, JR  2,755,334
COLOR TELEVISION AND THE LIKE
Filed July 9, 1951  12 Sheets-Sheet 11

Inventor:

July 17, 1956 T. A. BANNING, JR 2,755,334
COLOR TELEVISION AND THE LIKE
Filed July 9, 1951 12 Sheets-Sheet 12

Inventor:
Thos. A. Banning Jr.

2,755,334
COLOR TELEVISION AND THE LIKE

Thomas A. Banning, Jr., Chicago, Ill.

Application July 9, 1951, Serial No. 235,854

71 Claims. (Cl. 178—5.2)

This invention relates to improvements in television, and the like. By the term "television" I contemplate transmission of intelligence either with or without wire connection between the sending and receiving stations; but generally the present improvements have been devised with regard to conditions imposed by wireless transmission of such intelligence. The present improvements, in the case of color television, concern themselves, among other things, with means to improve the faithfulness of the replicas produced at the receiving station, as respects both perfection of color and chroma and hue, and also as respects brightness or brilliance of the replica at each point reproduced. Furthermore, the present improvements concern themselves with both the sending and the receiving arrangements, as well as the relationships existing between these two principal elements of the system.

The present improvements are intended for use in either or both of the presently accepted forms of translation, including both the "dot" system developed by R. C. A. and others, in its various forms, as well as the "linear" system developed by various workers in this field. The present improvements are also intended for use in connection with other forms of transmission and reception, and various modifications or species of such various forms. Some of these have been illustrated and will be described hereinafter as they may be modified or improved to include my present improvements; but the inclusion of such specific illustrations and descriptions is not exclusive of others in or with which said improvements may be usable.

By the term "dot system" I contemplate a system wherein the excitation of the phosphor surface at the receiver is produced by a system of electron beam or similar impulses, generally but not necessarily of a disconnected form, which impulses act on successive elemental areas of the phosphor to produce elemental areas of illumination to the viewer in the primary colors, or in white or monochrome, as distinguished from substantially continuous lineations of electron beam or similar excitations, each such lineation of illumination producing illumination to the viewer in a primary color, or in white or monochrome. In the case of such "dot" system the impulses may be emitted at the sending station by a system of sampling and mixing "highs" corresponding to the several primary colors, and white or monochrome, or corresponding to colors complementary to such primary colors, the so-mixed "highs" being transmitted as a stream of signals on one or two channels. Such signal stream is then received by the receiver and processed for production of the successive impulses of electron beam strength for proper excitation of the elemental areas of the phosphor to produce the elemental areas of illumination to the viewer in the primary colors, or in white or monochrome, corresponding to the primary colors, or white or monochrome represented by the signals used in producing such stream of signals. The processing at the receiver is one by which successive impulses of electron beam intensity are produced, coming at a regular sequence corresponding to the primary colors, and white or monochrome, when white or monochrome signals are included in the sequence.

The prime purpose and object of any satisfactory and acceptable system of color television is and must be the faithful reproduction, in form suitable for ready viewing by the observer of an exact replica of that which is undergoing observation or examination by the "camera." This requirement is further encompassed by the specification that each and every portion of the object being observed must be correctly reproduced in the replica, both as to form, proportion, depth and "color" effect, at all times, and all of these must change from instant to instant according to the changes going on at the object being thus scrutinized. Of these effects, that relating to the "color" effect is of importance here. Nevertheless, let it not be forgotten that changes in such "color" effect must be correctly and immediately replicated in the image produced on the viewing screen of the receiver, or any surface on which such replica is being translated.

It is of course true that under presently acceptable systems of replica transmission and reproduction use must be made of suitable signals contained within one or two channels so that all desired color effects produced in the replica must be attained by suitable translation of these signals and their effective use on or in connection with suitable translation means in the receiver. Fortunately, also, the wave lengths and frequencies contained within the visible spectrum may be satisfactorily broken into three (and sometimes, two) "primary" colors, by whose combination various color "hues" may be produced, such hues being dependent on both the primary colors which are mixed, and the proportions and strengths in which such mixtures are produced and combined together. Furthermore, due to the limitations imposed by practical "channel" requirements the reproducing means must be so arranged as to discriminate, in the receiver means, between signals and locations on the screen for each of the several colors to be produced in the replica. The intensities of illumination produced at various points on the screen may also be used for production of intensities of the primary colors thus reproduced on the viewing screen. Thus, by use of signals of the limitations already referred to one may produce on the viewing screen replicas such as already mentioned. However, the mere production of various "hues" by proper mixing of various color impressions is greatly insufficient to produce a true replica corresponding to and faithfully representing the object seen by the "camera" in all of its true form and beautiful shades and "hues," "values," and "chroma," and with varying conditions of light values at all or over parts of the replica. In order to correctly understand these many conditions of the problem, and to show how I have herein provided the means to produce a greatly improved and truly faithful replica of what is seen by the camera I shall now discuss briefly certain fundamental elements of color analysis and reproduction, and shall then disclose fully my present improvements and their application to various systems of scanning, transmission, and reproduction in various forms of receivers.

If we want to specify a light physically we must not only be able to measure what wave lengths are present in the mixture, but also the intensity of each. When we have done this we shall have sufficient information to enable us to reproduce a colored light which will have the same color effect on any normal eye in a normal state as is due to such physical specification. It must also be emphasized, however, that the reverse does not hold, namely, if we have a second colored light which produces exactly the same color effect as the first on a normal eye, it does not follow that it consists, physically, of the same wave lengths in the same strengths. For instance, light of a pure spectral yellow, consisting of a narrow range of wave lengths in the neighborhood of 5900 Angstrom units, can be matched exactly by a mixture of a spectral green light and of a spectral red light in suitable intensities. The eye is quite unable to decide if a color is simple or compound. It is a fact of the greatest practical importance that any color sensation, whatever the physical characteristics of the light that produces it, can be matched by light of three selected wave lengths by varying the relative intensities of these three components. This is an experimental fact which is quite independent of the validity of any three color theory of vision. It is noted here that this statement concerns itself with the matter of "color" of the sensation. Other factors must also be considered.

If we wish to classify the color sensations produced by the light from colored bodies the immediate problem is not to analyze the light physically into its different wave lengths, each of a given intensity, but rather to find the simplest way in which the same color sensation can be produced. It is a fact of experience that, apart from intensity, i. e., the brightness of the color, any color can be matched by a spectral color to which a proportion of white light has been added. Pure spectral colors, without admixture of white light, are said to be "saturated," and, in proportion as white light is added, become less and less saturated. The spectral color is usually referred to as a "hue," the term color being reserved for the general sensation. The statement that any color can be matched by a special hue to which white has been added requires qualification, for the purple sensation cannot be so matched. Saturated purple is itself produced by mixing light from the violet and red ends of the spectrum, and such a purple must be added to the spectral hues to complete the description. The purple hue which is compounded of the ends of the spectrum, can be regarded as affording a transition from one end to the other, so that the hues can be arranged in a circle, with the purple between the red and the violet, forming a bridge from one to the other. We may, then, taking the spectral colors and purple as saturated hues, say that color sensations can differ in three respects only; namely, "hue," "saturation," and "intensity."

Expressed somewhat differently, the sensation produced by any given colored light, however mixed it may be physically, can be matched by a certain quantity of a saturated hue. To specify the sensation we must give the wave length of the hue and the quantities of white light and of this colored light. If we are dealing with a colored surface we must clearly illuminate it with some kind of standard white light in order to make a measurement of the hue and saturation. The intensity of the light from the colored surface will be proportional to the intensity of the illuminating light. It is therefore reasonable to take, as a measure of the intensity of the color of the body, the ratio of the brightness of the light proceeding from the body, to the brightness of the light from a perfectly white surface similarly illuminated. The term "brilliance" is often used, especially in America, to denote this ratio.

Newton arranged the saturated hues around the circumference of a circle, and placed at the center of this circle a small circular area designated as "white." Any line joining this center "W" to a point "P" on the circumference then represents the transition from the saturated hue represented by this "P" to "White" light, the degree of saturation lessening to zero as the center or central area is approached. It has also been shown that by mixing the seven principal colors in proper ratios such mixture will produce white light. These proportions have been shown to be as follows. Around the circle the successive colors will be as follows: Red, 60 degrees 45.5 minutes; Orange, 34 degrees 10.5 minutes; Yellow, 54 degrees 41 minutes; Green, 60 degrees 45.5 minutes; Blue, 54 degrees 41 minutes; Indigo, 34 degrees 10.5 minutes; and Violet, 60 degrees 45.5 minutes.

White light serves to emphasize the fact that identical color sensations can be produced by different stimuli physically. Not only can any white light containing all wave lengths be imitated by the mixture of light of all seven colors related above, or by a mixture of three different narrow spectral regions, but there are various pairs of colors which, taken together in correct proportions, produce the sensation of white. Any two colors constituting such a pair are called "complementary" colors. Such pairs, for example, are red light of wave length 6560 A. U. and bluish green light of wave length 4920 A. U.; or yellow light of wave length 5850 A. U. and blue light of wave length 4850 A. U.; or orange light of wave length 6080 A. U. and blue light of 4900 A. U.; or yellow-gold light of 5740 A. U. and blue light of 4820 A. U.; or yellow light of 5670 A. U. and indigo blue light of 4640 A. U.; or yellow light of 5640 A. U. and violet light of 4330 A. U. This fact of the existence of colors which are "complementary" to each other for production of white light will be referred to hereinafter in connection with provision of means to produce signals which are proportionate to the amount of white light component contained in the light beams coming from the object to the camera, and for production of corresponding signals emitted to the receiver for production therein of corresponding proportions of white light components during production of the replica to be viewed by the observer.

Since the light arriving at the camera from each element of the object being reproduced contains not only wave-lengths of the primary colors, but also a proportion of "White" light, it is evident that provision for signalling and reproducing the primary color constituents and proportions will not and cannot produce a replica faithfully duplicating to the viewer of such replica all of the components of the "color" of such element of the natural objects. Correspondingly, reception and translation of such signals of limited and incomplete analysis will not and cannot produce a true and faithful replica in correct colors, shades, and hues, and chroma, of the object sought to be replicated. Failure to determine the proportion of white light component emitted from each element of the object analyzed, and to signal correspondingly, and failure to provide the means to inject or insert a corresponding or proportional amount of white light into each corresponding element of the replica as such replica is produced to the observation of the viewer, must of necessity result in much loss of faithfulness of reproduction, as well as actual complete distortion or serious damage to the true meaning or effect of the image thus provided for the inspection of the viewer. Additionally, many objects of shades and chroma whose faithful reproduction is desired will be shown in completely wrong color effects when the white component is not provided for. Thus, for example, many beautiful color effects of cloths, flowers, and pastels, for example, will be completely lost to the viewer, and not only will the interest of the viewer be greatly lowered, but wrong impressions will be created as to the true colors, shades, and beauty of the original object.

Colors or hues which are produced merely by mixing the saturated colors and without addition of white light, generally appear with an unnatural harshness and abruptness which is completely unnatural and ill-pleasing to the sight. Furthermore, when such unnaturally produced hues are brought into proximity to each other their unfaithfulness of reproduction is much exaggerated, and the eye appeal of such replicas is seriously reduced. The effect produced by such a "replica" is that of an amateur's effort to reproduce a beautiful work of art of one of the masters whose work not only carries in itself the softened effect which he originally introduced into his work, but also that further mellowing effect which time produces in all things.

An important object of the present invention is to provide the means to analyze the object in all of its portions to determine what portion of white light is emitted from each element of such object, to produce suitable signals corresponding to such white light components from such elements, and to correctly relate such white light signals to the corresponding and proper primary color signals, both as to timing and amount or intensities of all signals, to transmit all such signals to the receiver, and to provide in such receiver the means needed to correctly interpret all such signals, including the white light component signals. Also, to correctly inject into the replica at each portion thereof the proper amount of white light component according to the signalled value just referred to.

In connection with the foregoing it is a further object of the inention to provide the means to effect such analysis of the image of the object seen by the camera, and to effect such white light signalling for various forms of camera arrangements, including the so-called "dot" and "mixed highs" scheme of the R. C. A. Corporation, and also for linear scanning arrangements, or "field" scanning arrangements such as that of the C. B. S. Company, and others. When scanning according to the "dot" system above referred to it a further object to make provision for testing and signalling the white light component either for each group of three of the colored dots, or for each single dot; and also to make provision for effecting such signalling either simultaneously with the signalling of corresponding primary colors, or for each group of such color dots, or for effecting signalling of the white light components according to other schemes of signalling. When scanning according to the linear or the "field" principles, it is an object to provide the means to effect such signals either for each individual line scanned, or for each group of such lines; and to effect signalling either simultaneously with each line signalling or in related timing thereto. Various other objects and means to effect the same will also appear hereinafter respecting the signalling at the sending station to incorporate the features of the present invention.

The received signals must be correctly interpreted and coordinated on the viewing screen. I have hereinafter disclosed various means to effect such results, including means to produce the color effects either by use of single or multi-gun kinescopes, and either by line scanning or "dot" scanning, and when translating by the "dot" system, either when the dots are spotted linearly or in groups, such as shown in the so-called R. C. A. system. I have also disclosed such translating means to produce according to the "dot" or linear systems, and either with use of phosphors which, when excited, emit white light or colored and white lights according to which phosphors are excited, or by the use of transparent screens embodying the proper primary colors.

Another feature of the present invention has to do with the provision of means whereby the visual effects of the several reproduced colors shown on the viewing screen will be so compensated that the strengths or intensities of the viewed colors will constitute a correct replica of the original object, taking account of the fact that different wave lengths of the visible spectrum are not equally effective on the normal eye. The significance of this feature will be better understood from the following: The "efficiency of the eye for light" varies widely from one end of the visible spectrum to the other, being several times as great for the wave lengths in the central portion of the "Green," than at either the "Blue" or the "Red" end of the visible spectrum. Accordingly, without special provision to effect some compensation for this great inequality in "Efficiency," there might be excessive visible effect in the greens, and a deficiency in visible effects at the red and blue or violet ends of the visible spectrum. I have made provision for compensating for this inequality if necessary, by providing for color produced areas of sizes relatively proportioned to compensate for such inequalities of efficiency.

In my co-pending application for Letters Patent of the United States on Improvements in Color Television, and the like, Serial No. 197,782, filed November 27, 1950, issued July 13, 1954, as Patent No. 2,683,769, I have disclosed various means to produce and transmit and translate color signals wherein lineated screens are used. In that case I have disclosed such means of various forms including some in which the scans and the translations are parallel to the lineations; and in others of such forms the scans are across the lineations, with corresponding transverse translation movements of the kinescope beam in the receiver. According to one feature of the present invention I have herein shown a kinescope having a color lineated screen; and in order to make such lineated screen kinescope usable with either the parallel or the transverse type of translation in the receiver I have shown means to rotate the kinescope lineated screen with respect to the direction of the electron beam scans, that is, to change the direction of the lineations of the kinescope and the direction of the beam scans ("horizontal deflection") with respect to each other. Specifically, I have shown means to support such kinescope rotatably, while retaining the necessary control coils stationary, so that the electron beam movements will remain unchanged in direction.

Another feature of the present invention relates to the provision of means whereby signals emitted from a sending station for color translation may be received by a receiver embodying certain of the features herein disclosed and used to produce a replica either in monochrome or black and white, or the true colors for production of a true color replica. In this connection it is an object to provide a receiver which is so constituted, and is provided with the necessary means, that the incoming signals, emitted for color translation, may be received and translated for view either in the monochrome or in the true colors, without need of effecting any changes in such receiver and its kinescope other than a simple switching operation.

In connection with the foregoing it is a further object to provide coin or token or remote control operated means in connection with such receiving means as referred to in the preceding paragraph, so that normally the reception will be effected for replica production of one type, for example, in monochrome or black and white, whereas by effecting switching change through the medium of the remote control or coin or token insertion into such coin or token operated means, the reception will be made in such manner as to produce the replica in true colors and according to the color signals emitted and being so received. In this connection it is a further object to include in such coin or token operated means a suitable time control such that insertion of a coin or token will cause the switching means to function for a definite time interval, after which the switching means will restore to its non-coin or token operated condition, and will remain in such condition until a further coin or token is inserted. Thus, reception will normally be effected in the monochrome or black and white, but can be ensured in true color for such interval or intervals of time as have been prepaid by the user.

Another important feature of the invention relates to improvements whereby the replica produced on the viewing screen of the recorder shall incorporate steroscopic effects, thus endowing such replica with the property of simulating the "depth" effect needed to impart complete realism to the replica. In this connection my improvements are such that the stereoscopic or "depth" effect may be produced on the viewing screen when the reception is in either monochrome or black and white, or is in color. Therefore this feature of the invention is of wide application to the art of television. Furthermore, this feature of the invention is of application to systems operating on either the lineated scan principle of sending and receiving, as a plain lineated scan, whether in either monochrome or black and white, or in color, or on the "dot" system of sending and receiving, with the "dots" in lineations, whether in either monochrome or black and white, or in color.

The feature of producing "depth" or stereoscopic effects referred to above involves the use of two or more sending cameras, and which are located a known and proper distance apart and are focused on the same object element. Means are included in my disclosures whereby said cameras produce, or whereby there are delivered, signals originating in said cameras, which signals are properly related to each other in timing and in sequence and which signals are emitted by the sending station in such properly related timing that the signals coming from the several elemental areas of the object, and viewed by the several cameras at different angles of vision, are blended into a regular and orderly succession of signals interwoven together. Such signals may represent elements of linear scans produced by the several cameras, the signals for the elements coming at a predetermined timing and order; or said signals may represent dots, or parts of generally linear scans with the signals from the several cameras interwoven together in the proper sequence and timing. Thus the signals emitted by the sending station include signal elements from all of the cameras, with said signal elements properly related and timed with respect to each other in an orderly pattern of timing. This timing pattern of the signals conforms to a consolidated pattern of the signals coming from the several cameras interwoven in the timing sequence which sequence is the same as the timing sequence at which all of the elemental areas of the object are examined by all of the cameras comprising the system.

The receiver which receives and interprets the signals thus emitted by the sending station may operate according to any one of various schemes or constructions some of which are to be hereinafter disclosed. Such receiver produces on the viewing screen elemental illuminated areas which correspond to the interwoven signals emitted by the sending station, and said elemental illuminated areas correspond to the consolidated timing pattern above referred to, and with the elemental illuminated areas produced on the viewing screen in the same spatial pattern as a consolidated spatial pattern of all of the elemental area examinations produced by all of the cameras. Thus there are produced on the entire area of the viewing screen image elements of one set corresponding to signals from one camera and representing elemental areas examined by that camera in a pattern predetermined both spatially and in timing, and another set of image elements corresponding to signals from each of the other cameras and representing elemental areas examined by each of said other cameras in a pattern harmonious both spatially and in timing to the first mentioned pattern. All of said patterns may occur in interwoven fashion with elemental areas or groups of areas corresponding to the several cameras interwoven into a complete orderly ensemble comprising a complete pattern composed of elemental areas produced by all of the signals from all of said cameras.

The elemental areas of illumination thus produced in said complete pattern correspond to examination of corresponding elemental areas by the several cameras individually. Each elemental area of illumination thus produced on the viewing screen therefore conforms to the examination of an elemental area from the viewing position of the camera originating the signal which produces such elemental area of illumination. The successively adjacent elemental areas of illumination are produced by signals from different cameras viewing closely adjacent elemental areas of the object under scrutiny and from different angles of vision. Therefore the composite replica produced by elemental areas of illumination on the viewing screen will include elemental areas accurately corresponding to the viewing of the object from two or more separated points of vision, such as the two eyes of a person viewing said object. Thus the impression of "depth" will be produced in the illuminated replica, being "stereoscopic" effect.

I contemplate that the sending and receiving equipment may be of type and characteristics to produce the replica either in color, or in monochrome or black and white, as already stated. When color replication is to be produced the said several cameras may be used to institute elementary area signals for the several primary colors, and with such signals properly interwoven and sent out on a single carrier channel, or on two or more carrier channels as desired. This may be done, for example, by the so-called R. C. A. system of sampling and adding "highs" according to the principle of that well known system; or other systems of sending the elementary area signals may be used. A suitable means and system of interweaving and sending out the signals originating in the several cameras may also be used when the replica is to be produced in monochrome or black and white. Such a system may include the same arrangements as that just mentioned, but with elimination of the color screens or filters whereby the signals delivered by the several cameras were based on scanning of the image under the colors permitted to reach the scanned surfaces under such filter control. Elimination of said filters or screens would allow each camera to make its scans and emit its signals for monochrome or under natural illumination naturally reaching the cameras from the object under scrutiny.

In the drawings:

Figure 1 shows the relation between "hue," "value," and "chroma" of a color, according to the so-called "Munsell" system, such relationship being shown by what is called a "color tree," portions of such "tree" being broken away to better show the relationship between the various factors affecting the color showing or impression; and in this tree the various wave lengths within the visible spectrum are shown around the circle, the axis of such circle being concentric with a shaft or stem showing increasing amounts of white light from bottom to top of the tree, with the tree shown in nine horizontal layers, one above the next, and with the amount of white light delivered into each layer uniform throughout such layer; and in this tree the strength of the color varies proportionately to the radial removal of the point of inspection outwardly from such axis;

Figure 2:
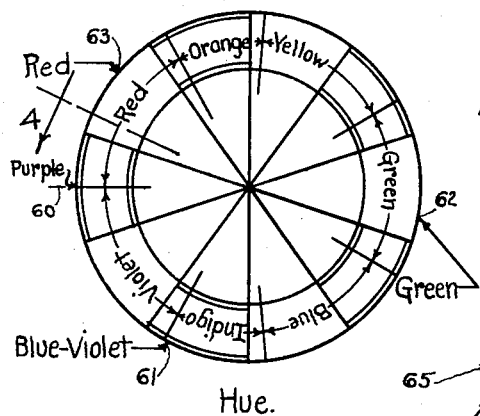
Figure 2 shows a typical plan view of one of the layers of the tree shown in Figure 1, the circumferential locations of the three primary colors selected for a typical three color television system being indicated by the notations "Blue-Violet," "Red," and "Green," all other colors being located around the circle according to their respective wave-lengths.
Figures 3, 4:
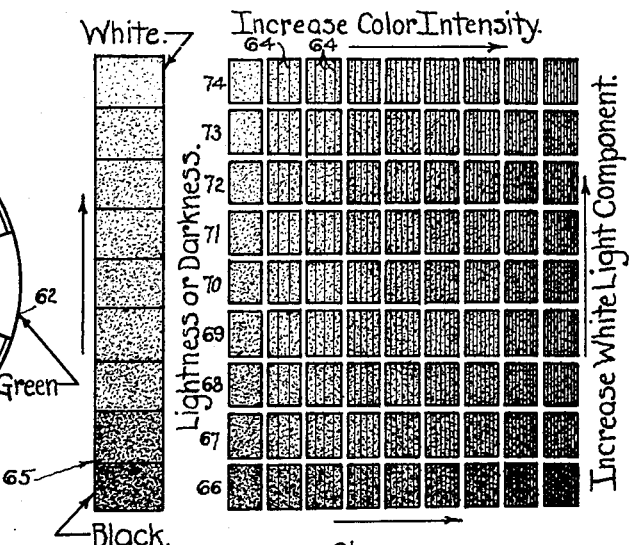
Figure 3 shows, on enlarged diameter, the core or trunk of the tree of Figure 1, and this figure shows how the amount of white light increases from substantially zero at the bottom of the tree to the tip thereof, where said core is substantially white.
Figure 1:
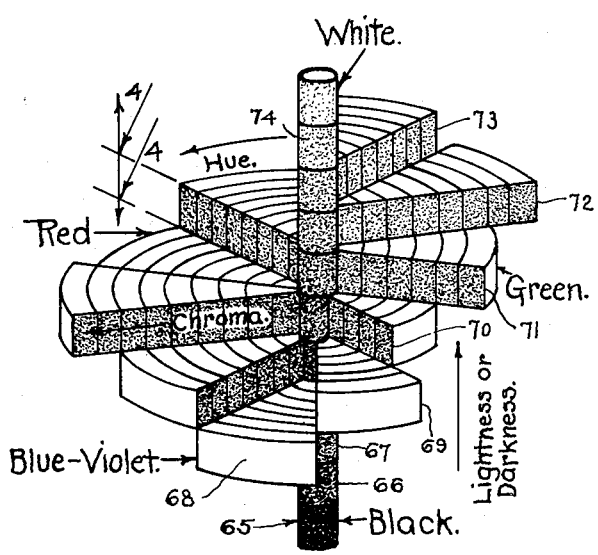
Figure 5:
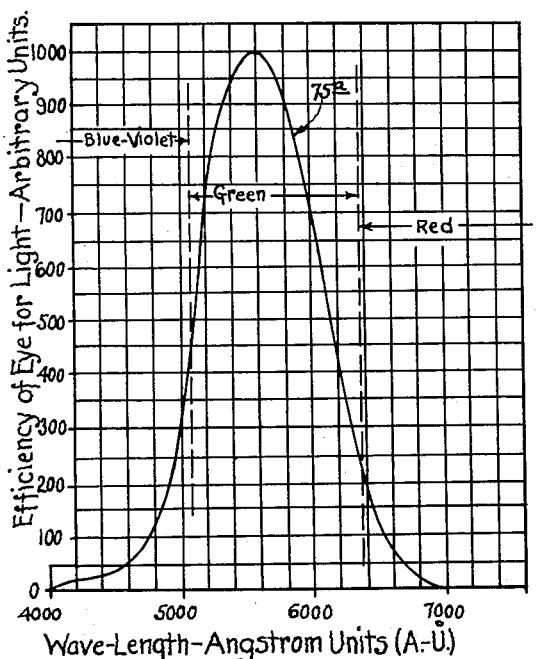
Figure 6:
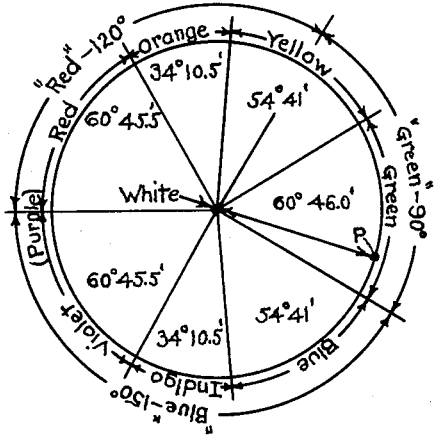
Figure 7:
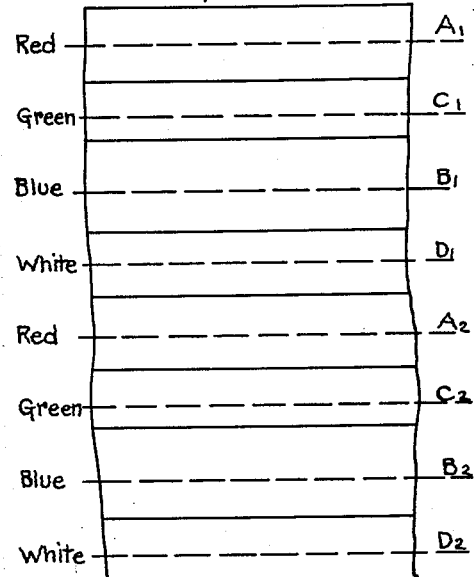
Figure 8:
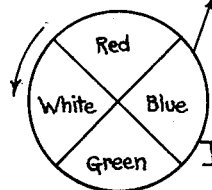
Figure 9:
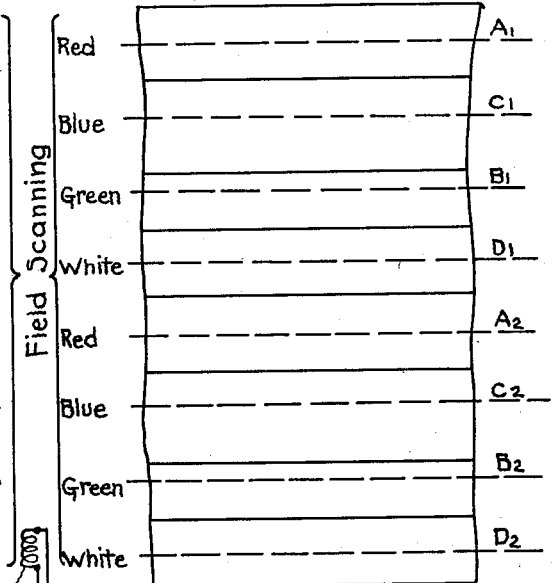
Figure 10:
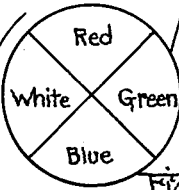
Figure 53:
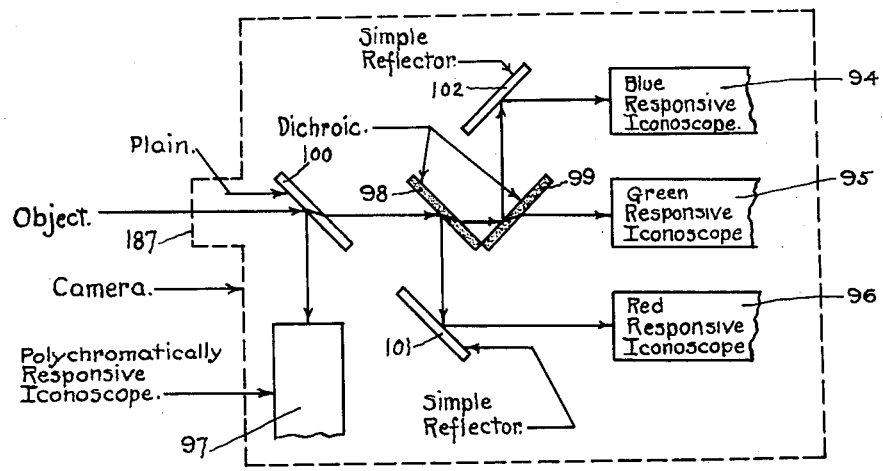
Figure 54:
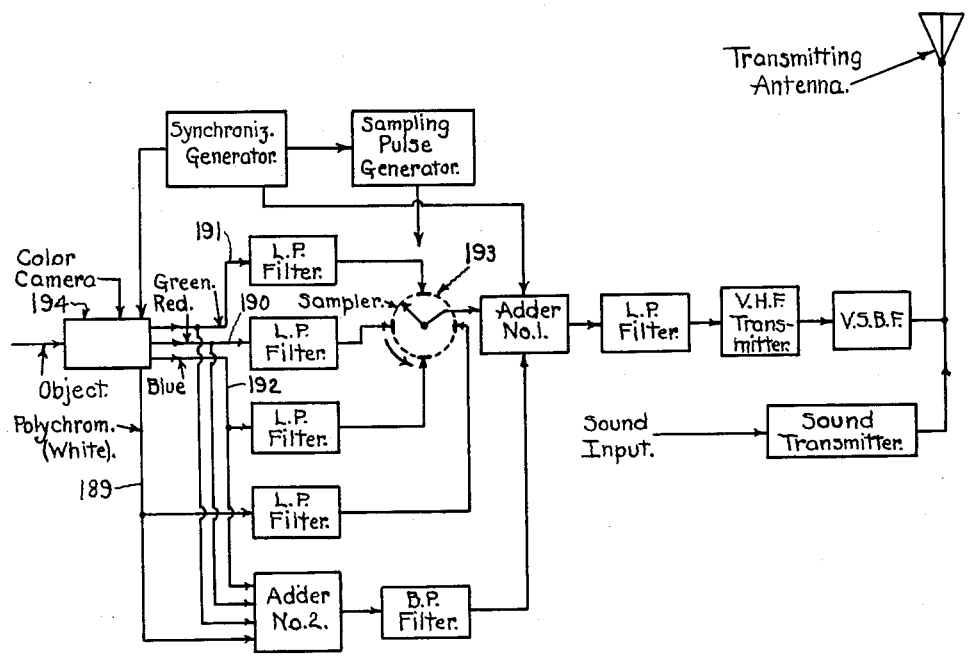
Figure 57:
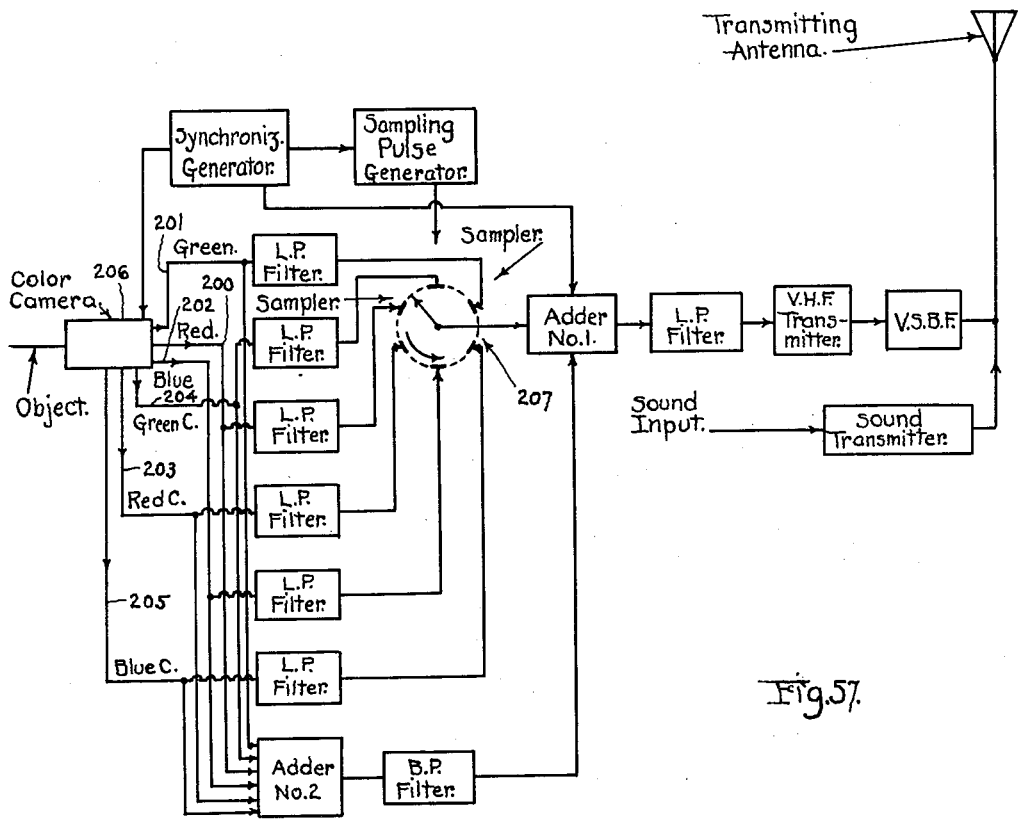
Figure 58:
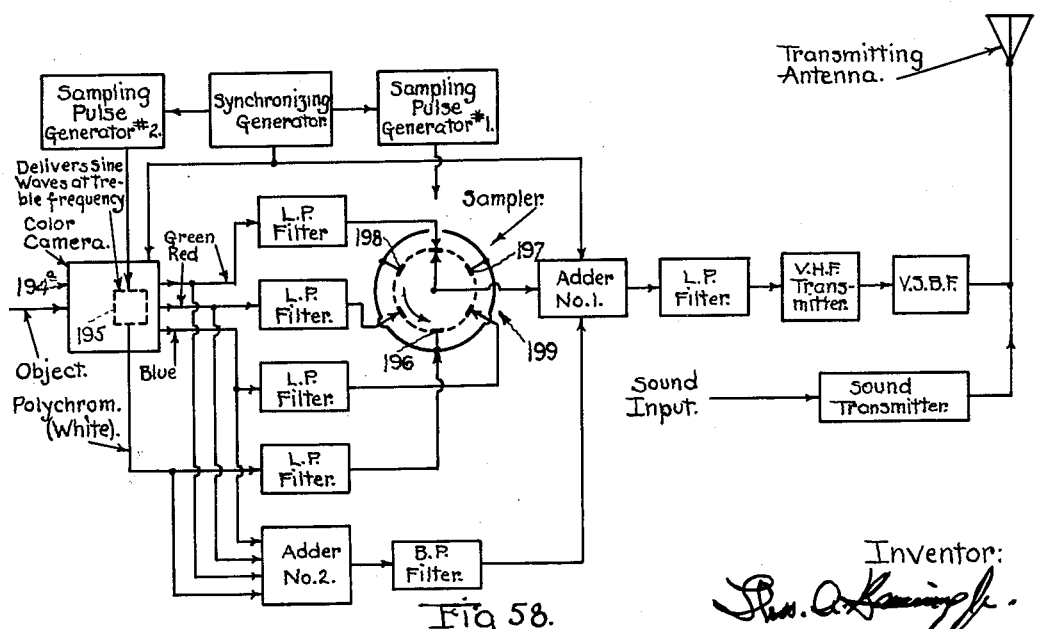
Figure 59:
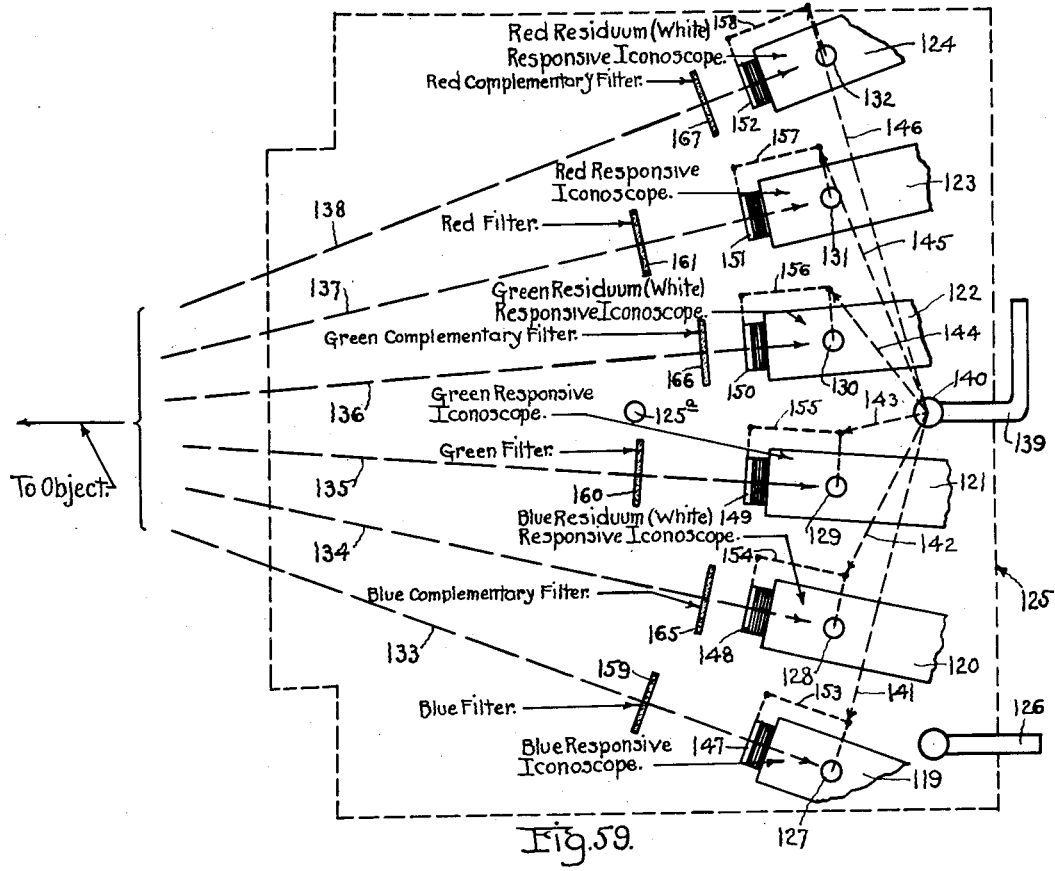
Figure 60:
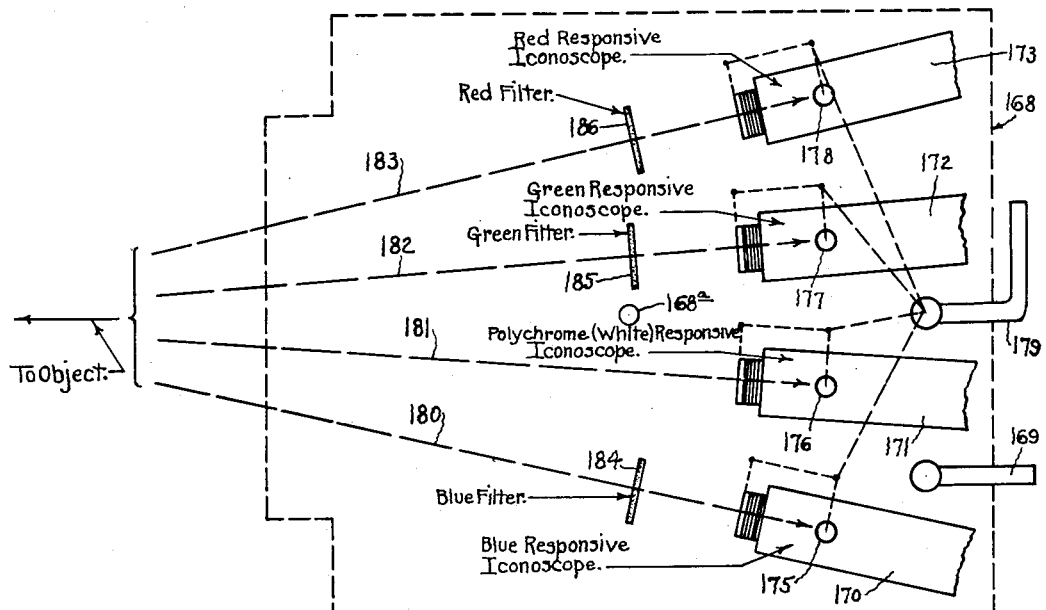
Figure 61:
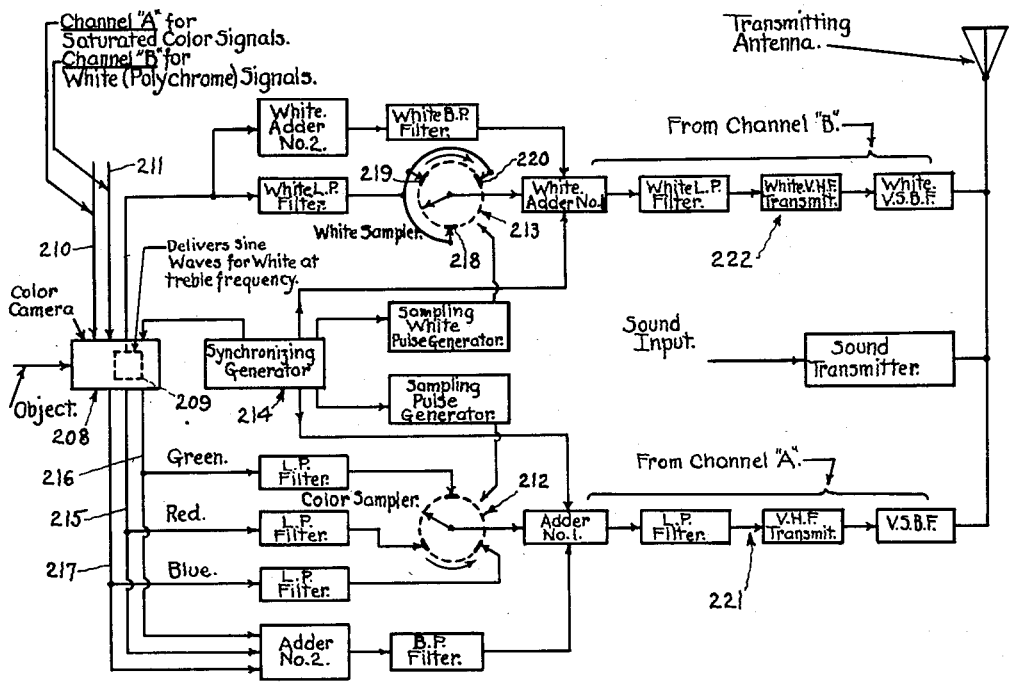
Figures 62, 63:
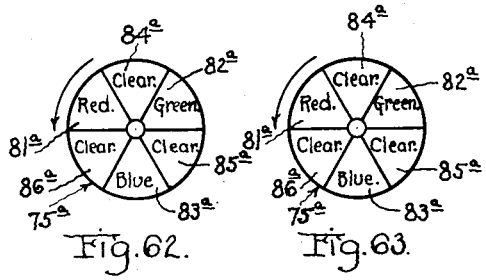

Figure 4 shows a typical vertical planar section through the tree of Figure 1, looking in the direction of the arrows and on the line 4—4 of Figure 1, and this figure shows how, for the Red, the strength and darkness of this hue change from a maximum at the lower-outer corner position, to a minimum at the top-inner axial position, so that the lightness or darkness, and the color intensity of the selected Red hue may be found for any combination of color intensity and White light component, for such selected Red hue; and in this figure the White light component is indicated by the darkness or lack of darkness) of the stippling, being uniform for all blocks across the figure at any selected hight of the tree;

and in this figure the color intensity is indicated by the closeness of the vertical shade lines in the blocks, being uniform for all blocks located in any selected vertical alignment, and increasing as the distance from the axis of the tree increases;

Figure 5 shows typically the manner in which the "efficiency of the eye for light" increases from a low value at the low wave-length end of the visible spectrum (Blue-Violet), to a maximum well within the Green portion of the said spectrum, and then falls again to a low value at the high wave-length end of said spectrum (Red) (Infra), the maximum point being shown at substantially 5600 A. U.;

Figure 6 shows the variation of the color positions around the circle, from the Infra-Red to the High-Violet, with these two brought together to produce the Purple; and this figure shows the general distribution of the arcuate embracements of the successive colors around the circle; and the tree of Figures 1, 2, 3 and 4 is formed substantially according to this color distribution around the circle;

Figure 7 shows a fragment of a viewing screen on greatly enlarged scale, of a kinescope, which screen is provided with successive color lineations progressing regularly through the three primary colors and then White, with successive repetitions, the widths of the several lineations being proportioned substantially according to the reciprocals of the "efficiencies" shown in Figure 5 for the respective primary colors, so that the surface areas of the color sections shown to the eye of the observer are balanced against the efficiencies of the several primary colors; and in this figure the successive lines of scan or translation are spaced substantially equidistant from each other according to conventional scanning operations; and in this figure the scanning is done with a single interlace, also according to conventional practice now in effect, and the color sequence is "Red," "Blue," "Green"; and in this figure the White is introduced on the fourth scan in each case, that is, between the concluding Green and the beginning Red, scanning being on the "field" scheme of scanning;

Figure 8 shows a typical segmented screen or filter to be introduced into the light path at the camera end of the system with rotation in the direction of the arrow in this figure, this segmented filter being provided with a "White" or clear segment corresponding to the signals to be emitted for the White lineations of the receiver kinescope screen;

Figures 9 and 10 show two views corresponding to Figures 7 and 8, but with the color sequence "Red," "Green," "Blue," with the White introduced between the Blue and the Red;

Figures 11 and 12 show two views corresponding to Figures 7 and 8, but with the color sequence "Blue," "Red," "Green," with the White introduced between the Green and the Blue;

Figures 13 and 14 show two views corresponding to Figures 7 and 8, but with the color sequence "Green," "Red," "Blue," with the White introduced between the Blue and the Green;

Figures 15 and 16 show two views corresponding to Figures 7 and 8, but with the color sequence "Blue," "Green," "Red," with the White introduced between the Red and the Blue;

Figures 17 and 18 show two views corresponding to Figures 7 and 8, but with the color sequence "Green," "Blue," "Red," with the White introduced between the Red and the Green;

It is here noted that each of the schemes shown in Figures 7 and 8, 9 and 10, 11 and 12, 13 and 14, 15 and 16, and 17 and 18 is one in which "field" scanning is used, that is, a full field is scanned for each color, successive fields, four in number, being scanned, two with a normal scan, and two with an "offset" scan, and in each case normal of offset, use is made of a single interlace so that four passes over the entire screen are made during each scanning cycle, one pass for each of the three primary colors, and the fourth pass for White. It is also noted that each of said schemes is one in which all of the color scans are completed prior to making the White scan, so that there is but one White scan for each group of color scans;

Figure 19 shows a fragment of a viewing screen on greatly enlarged scale, of a kinescope, which screen is provided with successive color lineations progressing through the three primary colors in succession, with White lineations interspaced between successive color lineations, the widths of the several color lineations being proportioned substantially according to the reciprocals of the "efficiencies" shown in Figure 5, for the respective primary colors, so that the surface areas of the color sections shown to the eye of the observer are balanced against the efficiencies of the several primary colors; and in this figure the successive lines of scan or translation are spaced substantially equidistant from each other according to conventional scanning operations; and in this figure the scanning is effected over the entire field by "field" scanning, one section, only, of the field being shown in Figure 19, all of the Reds being scanned over the field, then all of the adjacent and corresponding Whites, then all of the Greens, then all of the adjacent and corresponding Whites, then all of the Blues, and then all of the adjacent and corresponding Whites, then repetition;

Figure 20 shows a typical segmented screen or filter to be introduced into the light path at the camera end of the system with rotation in the direction of the arrow in this figure; corresponding to Figure 19; this segmented filter being provided with "White" or clear segments corresponding to the signals to be emitted for the White lineations of the receiver kinescope screen;

Figure 21 shows a fragment of a viewing screen similar to that of Figure 19, but in the present case the several White lineations are shown as being of widths proportioned substantially according to the reciprocals of the "efficiencies" for the primary color lineations to which these White lineations correspond, whereas in the showing of Figure 19 the White lineations are all of the same widths;

Figure 22 shows a typical segmented screen or filter corresponding to that shown in Figure 20, but for use with the arrangement shown in Figure 21;

Figure 23 shows a fragment of a viewing screen on greatly enlarged scale, of a kinesecope, which screen is provided with successive lineations progressing through the three primary colors in succession, each lineation including a linear zone of the coloration, and also an adjacent linear zone for White, the line of scan in each such double lineation being located substantially at the line of joinder between the color section and the White section, as shown by the dashed lines in this figure; so that normally both the color and White sections are brought into illumination simultaneously by overlap of the electron beam onto both of said sections; and this figure also shows, schematically a control coil element adjacent to the showing of the figure, which control coil element constitutes a portion of the vertical deflector control for the electron beam, so that as the strength of said electron beam varies while scanning or translating along each lineation, said beam is also slightly deflected vertically to thus modify the amount of color section which is illuminated, for either increase or decrease of such illumination, with corresponding simultaneous variation of the illumination of the White section of the lineation for decrease or increase thereof, and generally such variation will effect increase of the color section and decrease of the White section illumination with increase of beam strength, and opposite action with decrease of beam strength; and in this figure the scanning is done with a single interlace, also according to conventional practice now in effect, and the color sequence which is shown is "Red," "Blue," "Green," scanning being on the "line" principle;

Figure 24 shows a typical section of a lineated screen or filter to be introduced into the light path at the camera end of the system, so that the emitted signals are produced by effects controlled by passage of the light beam from the object being replicated, through such color lineated screen or filter;

Figure 25 shows a fragment of a viewing screen on greatly enlarged scale, of a kinescope, which screen is provided with successive color and White lineations, the color lineations progressing through the three primary colors in succession, and the White lineations being located adjacent to the corresponding color lineations, and scanning being shown on this figure according to either of two schemes, one scheme being indicated by the line lettering along the right-hand side of the figure, and the other scheme being indicated by the line lettering along the left-hand side of the figure. When using the scheme shown by the right-hand lettering the scanning will be effected by use of a single interlace, with scan of all of the color lineations followed by scan of all of the corresponding White lineations. When using the scheme shown by the left-hand lettering the scanning is such that each scan of a color lineation is followed by scan of a White lineation, the successive colors being scanned in regular linear scan with White linear scans between them; and in the scheme shown in Figure 25 the scanning will be effected by two interlaces;

Figure 26 shows a typical section of a lineated screen or filter to be introduced into the light path at the camera end of the system, so that the emitted signals are produced by effects controlled by passage of the light beam from the object being replicated, through such color (and White, or clear) lineated screen or filter;

Figure 27 shows a fragment of a viewing screen on greatly enlarged scale, of a kinescope, which screen is provided with successive horizontal color lineations, the colors progressing through the three primary colors in succession, and these color lineations are regularly broken or intercepted by White sections indicated by the vertical linear breaks in this figure, and shown by the "White" designations; so that during horizontal scan or translation of the electron beam said beam passes successively across color sections of the color of the lineation in question, broken by White sections, so that White is regularly introduced into the color effect during scan or translation;

Figure 28 shows a typical section of a lineated screen or filter to be introduced into the light path at the camera end of the system, so that the emitted signals are produced by effects controlled by passage of the light beam from the object being replicated, through such color lineated screen or filter; it being noted that the color lineations of this filter are shown as being continuous so that signals are continuously emitted along the entire length of each lineation, thus ensuring that signals will also arrive at the kinescope beam while such beam is passing across the "White" sections of lineations shown in Figure 27;

Figure 29 shows a fragment of a viewing screen on greatly enlarged scale, of a kinescope, which screen is provided with successive horizontal color lineations, the colors progressing through the three primary colors in succession, and these color lineations are provided with small White spots, preferably circular as shown, so that during linear scanning or translation the electron beam must needs traverse these White sections in regular fashion during each color interpretation; and the form of screen or filter shown in Figure 28 may also be used in connection with the arrangement of Figure 29 for emitting the signals from the camera;

Figure 30 shows a fragment of a viewing screen on greatly enlarged scale, of a kinescope, which screen is of form generally similar to that of Figure 27, but in the present case the White interruptions provided in the successive color lineations "break joints" so that a better distribution of the introduction of white light into the entire replica is produced than by the arrangement shown in Figure 27; and the form of screen or filter shown in Figure 28 may also be used in connection with the arrangement of Figure 30 for emitting the signals from the camera;

Figure 31 shows a fragment of a viewing screen on greatly enlarged scale, of a kinescope, which screen is provided with means to interpret according to the "dot" system of the R. C. A., wherein successive dots are produced in line across the screen, the dots being of the three primary colors in regular succession, and the dots being laid down by a process of scanning or interpreting four fields in the well understood manner; but in the present case I have shown White sections interlaid between these successive color dots, so as to ensure production of the desired White effect during each color interpretation;

Figure 32 shows the typical scanning operation at the position of the iconoscope or iconoscopes used in the camera for emission of signals to be used with the arrangement shown in Figure 31;

Figure 33 shows a fragment of a viewing screen on greatly enlarged scale, of a kinescope, which screen is of form generally similar to that of Figure 31, but in the present case the successive "color dots" produced on the screen are also provided with White portions, so that the desired introduction of white light is thus effected with a complete distribution over the area of the viewing screen; and the form of scanning operation shown in Figure 32 may also be used in connection with the arrangement of Figure 33 for emitting the signals from the camera;

The schemes shown in Figures 31 and 33 are "dot" arrangements in which the dots are laid down in alignments; this being according to one well known R. C. A. scheme;

Figure 34 shows a pattern of "dot" scanning of the image or images produced in the iconoscope or iconoscopes of the camera in which pattern the dots are grouped in groups each group including a dot of each of the primary colors, the groups being regularly placed over the face of the image, so that the color dots are produced in corresponding pattern on the viewing screen; this scheme of scan being well known at the present time, and one of the schemes used by the R. C. A.; but in the arrangement shown in Figure 34 I have introduced an additional dot of scan into each group, for emitting a signal for white light to the receiver viewing screen in corresponding position in each dot group of that element of the system; so that in Figure 34 each group is shown to include four dots instead of the conventional three dots, each such group of four including a Red, a Green, a Blue, and a White, the dots of each group in Figure 34 being located in a circular pattern as shown by the dashed circles joining the dots of each group together for identification; it being here noted that with this arrangement the various dots are found to lie within horizontal lineations as well as in various vertical or angular lineations, some of which will be noted hereinafter;

Figure 35 shows a fragment of a viewing screen on greatly enlarged scale, of a kinescope, which screen is of form to receive and interpret the "dot" signals received from the transmitter arrangement of Figure 34; and in the arrangement shown in Figure 35 the incoming dot signals are interpreted to produce the corresponding various dots in patterns corresponding to the patterns of image elements which were examined by the camera for production of the dot signals—that is, the dots are laid down in circular patterns as indicated by the dashed line circles in this figure; and such pattern arrangement includes a White dot for each group, that is, for each set of Red, Green, and Blue dots; and various forms of kinescope may be used for production of such dot patterns on the viewing screen, including a single-gun rotating beam arrangement used in connection with a screen provided with dots of phosphors selected to emit, respectively, the three primary colors, and other phosphor dots selected to emit white light, together with the necessary perforated mask between such gun and screen, this arrangement including the modification of the provision for emission of white light from the appropriate dots positions; or the pattern shown in Figure 35 may be produced by use of four guns delivering, through proper color or clear filters, the three primary colors and white, to produce the dots in the pattern shown in Figure 35, the electron beams of the various guns being regularly shifted from position to position as needed and in proper order and timing; or the pattern shown in Figure 35 may be produced on the viewing screen by use of four kinescope guns for delivering the dots of the primary colors and for white, together with suitable reflectors and dichroic elements to bring all these dots together on the viewing screen in proper patterns and proper advancement of such patterns over the face of the viewing screen; or other arrangements may be used, some of which are hereinafter disclosed; and it will be noted from examination of Figure 35 that the various dots produced on the viewing screen lie within horizontal lines, as well as within lines extending in angular fashion across the screen in various angular directions;

Figure 36 shows a fragment of a viewing screen on greatly enlarged scale, of a kinescope, which screen is provided with lineations of colors (and white) corresponding to the three primary colors, such lineations extending across the screen in angular manners, so that when using electron gun arrangements such as recited in connection with the description of Figure 35 the dots delivered by such guns may register with correct colored (and white) lineations, to produce the correct colored (and white) dots visible to the eye of the viewer, and in proper patterns to produce the accurate replica in color visible to the observer; the dots of each group being indicated by a broken or dashed line circle in this figure;

Figure 37 shows a fragment of a viewing screen on greatly enlarged scale, of a kinescope, which screen is of form similar to that of Figure 36 (lineated), but in the present case the dots produced on said screen are located in direct horizontal lines or scans traversing across the lineations of the screen itself, so that each dot is laid down onto a lineation of the proper color (or white) to produce to the eye of the observer a pattern replica of the object originally viewed by the camera; and it is here noted that the pattern shown in Figure 37 may be produced by use of a single gun kinescope of conventional form, emitting a single electron beam which beam will be regularly energized under control of the incoming signals of all the colors (and white) as emitted by the sending station, and of strengths as controlled by the sending station for such dot signals; and the lineations shown in Figure 37 may be either transparent lineations of the three primary colors (and clear, for white), located between a phosphor deposit which is responsive to the electron beam to produce white light, and the observer, so that the observer sees the various dots as thus colored by such lineations (or white for dots seen through the clear lineations), according to the principles disclosed in my co-pending application, Serial No. 197,782, filed November 27, 1950, Patent No. 2,683,769, or may be lineations of phosphors which emit light of the proper colors under electron beam excitation;

Figure 38 shows, more or less schematically, a simple form of sending station for emitting signals for reception by receivers embodying the arrangements shown in Figures 7 and 8, 9 and 10, 11 and 12, 13 and 14, 15 and 16, 17 and 18, 19 and 20, and 21 and 22; according to the form of the rotating segmented screen or filter which is used in connection with such sending station arrangement, and its camera, such sending station including such a rotating segmented disk, by way of illustration;

Figure 39 shows a typical segmented disk screen or filter for use in connection with the sending station of Figure 38, when signals are to be received according to the showing of Figures 7 and 8;

Figure 40 shows another form of segmented disk for the sending of signals to be received according to the showing of Figures 9 and 10;

Figure 41 shows another form of segmented disk for the sending of signals to be received according to the showing of Figures 11 and 12;

Figure 42 shows another form of segmented disk for the sending of signals to be received according to the showing of Figures 13 and 14;

Figure 43 shows another form of segmented disk for the sending of signals to be received according to the showing of Figures 15 and 16;

Figure 44 shows another form of segmented disk for the sending of signals to be received according to the showing of Figures 17 and 18;

Figure 45 shows another form of segmented disk for the sending of signals to be received according to the showing of Figures 19 and 20; and it is here noted that in this case the segmented disk is provided with sections which are of colors "complementary" to the preceding primary color sections of such segmented disk, so that signals may be emitted which are of strengths proportioned to the amount of white light component contained in such previously scanned "primary color" scannings, as will hereinafter appear in full detail it being noted that while each of such "complementary" color sections is in position to control the light moving to the detector plate such section causes the plate to be illuminated by rays of wave lengths which, combined with the wave lengths which were passed by the primary color section just preceding such complementary color section, would, if viewed by the human eye, give the impression of white by reason of the persistence of human vision;

Figure 46 shows another form of segmented disk for the sending of signals to be received according to the showing of Figures 21 and 22; and in this case too it is noted that the segmented disk is provided with sections which are of colors "complementary" to the preceding primary color sections of such segmented disk, for reasons similar to the reason just above stated with respect to the description of Figure 45;

Figure 47 shows more or less schematically, a simple form of sending station for emitting signals for reception by receivers embodying the arrangements shown in Figures 23 and 24, and 25 and 26; according to the form of the lineated screen or filter which is used in connection with the arrangement of Figure 47, as will presently appear;

Figure 48 shows a simple form of receiver kinescope which is mounted for rotation about its longitudinal axis through substantially ninety degrees of rotation, to change from horizontality of the screen lineations, to verticality thereof, or substantial verticality, as needed, as will presently appear; the control elements for both horizontal and vertical electron beam shifts remaining stationary while the body of the kinescope is thus rotated;

Figure 49 shows a front end view corresponding to Figure 48;

Figure 50 shows a back end view corresponding to Figure 48;

Figure 51 shows a form of lineated screen or filter provided with lineations of the three primary colors with intermediate lineations of the corresponding "complementary" colors or White, so that signals may be emitted for reception according to the showing of Figures 25 and 26 or similar receiving arrangements;

Figure 52 shows a modified form of screen or filter, but which is for the purpose of modifying the entire range of color reception, if needed;

Both of the screens or filters shown in Figures 51 and 52 are for use in connection with camera arrangements such as that shown in Figure 47, being interposed in the path of light coming to the iconoscope of such sending or camera station;

Figure 53 shows, schematically, a light system for use in connection with three iconoscopes or the like, for detection and signalling of signals proportionate to the strengths of the three primary colors, together with another iconoscope or the like, for detection of another light component for use in connection with the signalling of signals for production of White light component at the receiver, according to some of the principles hereinbefore referred to; and in the arrangement shown in Figure 53 I have provided a supplemental iconoscope whose functioning is proportional to the total body of light arriving at the camera, to produce signals which are thus proportional to such total body of light at all times, which signals may then be used for production White light signals to be received by the receiver for production of corresponding White light elements or components to be introduced into the replica produced on the viewing screen seen by the observer; and the light scheme shown in Figure 53 may be used, for example, in connection with such arrangements as shown schematically in Figures 34, 35, 36 and 37, with suitable sending arrangements therefor;

Figure 54 shows, schematically a transmitting arrangement using a camera arrangement such as that shown in Figure 53, with provision for emitting dot signals for the primary colors and White, such signals being emitted in regular succession with repetitions, according to the general principles of the R. C. A. system using mixed highs, etc.;

Figure 55 shows, schematically, a light system for use to deliver signals proportionate to the three primary colors, as well as signals proportionate to White light components contained in each of such primary color components, suitable iconoscopes or the like being provided for production of signals proportionate to such primary light components, and such White light components, for use in emitting corresponding signals to the receiver, and the light scheme shown in Figure 55 may be used, for example, in connection with such arrangements as shown schematically in Figures 27, 29, 30, 31, and 33, as well as others;

Figure 56 shows, schematically, a transmitting arrangement using a camera arrangement such as that shown in Figure 55, by way of example, or other camera arrangements, with provision for emitting dot signals for the three primary colors and White, and in this schematic arrangement provision has been made for emitting each White light component signal simultaneously with emission of the corresponding primary color signal, use being made, if necessary of two channels for this purpose, so that groups of two signals each may be emitted for each of the primary colors, one signal being for the primary color itself, and the other being for the corresponding White light component; and this sending scheme may be used in connection with production of replicas according to the showings of Figures 31 and 33, for example;

Figure 57 shows, schematically, a transmitting arrangement using a camera arrangement such as that shown in Figure 55, by way of example, or other camera arrangements, with provision for emitting dot signals for the three primary colors and White, in regular succession, each White component signal following directly after the corresponding primary color signal instead of being emitted simultaneously therewith as in the arrangement shown in Figure 56, this arrangement requiring only a single channel instead of the two channels required for the arrangement shown in Figure 56;

Figure 58 shows, schematically, a transmitting arrangement using a camera arrangement such as that shown in Figure 53, with provision for using the three primary color components signals, and also for using signals proportional to the total body of light arriving at the camera for production of White light component signals; and in the arrangement of Figure 58 I have also made provision for producing highs from such total light body at three times the frequency of the highs delivered from each of the primary color signals, and interspaced between such primary color signals, so that in the arrangement of Figure 58 I have also made provision for interweaving these additional highs between the primary color highs to thereby deliver successive signals, in regular order, each primary color high signal being followed directly by a White light high corresponding thereto, to thus produce a series of signals including both the primary color signal highs, and the corresponding White light highs in proper and regular sequence;

Figure 59 shows, schematically, a light system for delivering signals proportionate to the three primary colors, as well as signals proportionate to the White light components contained in each of the primary color components, using transmitted light instead of reflected light, as in the arrangement shown in Figure 55, the several camera elements being suitably mounted for continuous correct focus of all such elements on the object, and the plural camera arrangement of this figure may be used for production of signals which will be interpreted in the receiver to produce the replica with stereoscopic effects due to the separation of the several cameras from each other with proper interweaving of the signals from the several cameras and according to either the linear system of signalling and translation or the "dot" system of signalling and translation, or other systems;

Figure 60 shows, schematically, a light system for delivering signals proportionate to the three primary colors, as well as signals proportionate to the entire body of White light, arriving at the camera element, using transmitted light instead of reflected light, as in the arrangement shown in Figure 53, the several camera elements being suitably mounted for continuous correct focus of all such elements on the object, and the plural camera arrangement of this figure may be used for production of signals which will be interpreted in the receiver to produce the replica with stereoscopic effects due to the separation of the several cameras from each other with proper interweaving of the signals from the several cameras and according to either the linear system of signalling and translation or the "dot" system of signalling and translation, or other systems;

Figure 61 shows an arrangement similar to that shown in Figure 56, but using means to signal White light signals proportionate to the entire body of White light arriving at the camera, and signalling the White light signals simultaneously with signalling of the color signals; and Figures 62 and 63 show modifications of the filter forms shown in Figures 45 and 46, respectively.

The effects of white light component contained in the light emitted from the object under illumination, and which is to be replicated may well be understood by reference to Figures 1, 2, 3 and 4, to which I shall first refer. These figures show a study on the so-called Munsell scale. In these figures the entire range of colors contained within the visible spectrum is shown circularly, that is, around the central vertical axis; and the long wave-length end of said spectrum (Red) is shown at the point 60 (which will also be shown to represent the short wave-length (Violet) end). Movement around this circle counter-clockwise represents decrease of wave-lengths so that complete encirclement covers the entire visible spectrum. The positions for the Blue-Violet, the Green, and the Red wave-lengths which may, by way of illustration be selected as the primary colors for the present operations are shown at 61, 62, and 63, respectively. All other intermediate colors are contained between the point 60 and these several points, back to such point 60, but need not be specifically defined here. However, these other colors are produced by mixing two or three of these primary colors in varying proportions, as well understood on the arts. Purple, the generally accepted exception to this general rule, is produced by mixing the two end wave-lengths, for low violet and high red, where they overlap in Figure 2.

The selected primary colors are produced by the wave-lengths on narrow bands, and such colors, alone are generally defined as "saturated" colors. Few, if any, if the colors and color impressions actually encountered in nature are of these pure wave-length compositions, but actually comprise wave-lengths of complex forms.

Next, for any selected color (for example, one of the designated primary colors), the intensity of such color may vary between zero and a maximum value, thus presenting the second fundamental element of the color analysis affecting the provision of means suitable for complete solution of the problems presented for solution here. Representation of such "color intensity" on the Munsell scale is made by measurement of the radial distance of the color representation outwardly from the axis of the circle shown in Figure 2. All color representations on the radius representing the wave-length of such selected color are of the same wave-length, but their intensities may vary between zero and a maximum according to the radial distance from such circular axis. In Figure 4 (which may be considered as a planar section through Figure 2, on the line 4 thereof), the fine vertical lines 64 extending through the numerous blocks represent, by their closeness together, the color intensity at any selected block position. It will be seen that near the left-hand edge of Figure 4, that is, close to the axis, these lines are relatively far apart, whereas as we progress outwardly to the right-hand edge of the figure, these lines lie closer and closer together in the successive blocks, thus indicating a progressive increase of color intensity as we move farther and farther outwardly in the figure. Nevertheless the wave-lengths throughout such progress are always the same.

However, it is well known that even for a given color, and regardless of its intensity as so far discussed, such color may be "light" or "dark," or of some degree between these two extremes, so we must now introduce a third element into the problem. This third element is the "lightness" or "darkness" of the color. This element is dependent on the amount of "White" light which is contained in the color being impressed on the vision of the viewer. Such element of white light may vary between zero and a maximum and the lightness or darkness will be governed accordingly. To better analyze and represent the total effect of such white component there is shown in Figure 3 the axial portion or core of the circular representation of Figure 2 (but on enlarged width or diameter), by the post 65. This is divided into a number of vertically aligned blocks corresponding to the number of horizontal planar sections, one above the other, shown in Figure 4, one of which horizontal planar sections is the one shown in Figure 2. Thus, nine of these superimposed planar sections are shown in the figures, being numbered as 66, 67, 68, 69, 70, 71, 72, 73, and 74, respectively, measured from bottom to top. Each of these planar sections is, in turn, divided into the radially progressing blocks as shown in Figure 4, so that as we measure outwardly in any such planar section we progress into zones of successively greater color intensity, but remain within such selected planar section, horizontally.

Now the amount of white light component represented in each of the blocks of the core shown in Figure 3 is shown inversely by the amount of stippling contained within such block, and it is seen that as we progress upwardly the amount of such stippling decreases, from heavy at the lower end, to very light at the upper end. Furthermore, the amount of white light present in each of the planar sections is uniform, and is that amount represented by the stippling closeness of the corresponding block of the core.

It is now evident that for any selected wave-length, as represented, for example, by the vertical plane at which the showing of Figure 4 is made (a red), we can at once see the effect of variations of intensity of the color represented by such wave-length, by examining the corresponding vertical column of blocks (outwardly from the axial or core position), and we can also see the effect of variations of white light component as represented by selection of the proper horizontal row of such blocks. Thus, for such wave-length we have indicated the combined effects of variation of intensity, and variation of white light component. These combined effects are well shown in Figure 4 by the combined effects of variations of closeness of the fine vertical lines 64 in the various blocks, as well as the variations of the closeness of stippling in these same blocks. In considering the effects of the stippling it must be remembered that the closer the stippling, the less the amount of white light component contained in the color effect under examination in a given block.

To bring into the analysis so far discussed as respects the effect of white light component on other wave-lengths than that corresponding to the section (vertical) of Figure 4, reference may now be had to the "tree" shown in Figure 1. In this case there is shown a perspective representation of what is shown in Figure 4, for a large portion of the circle represented by Figure 2, but with portions broken away to better show the entire range of wave-lengths throughout the visible spectrum. The fine vertical lines representing intensity in any given wave-length circular position, and outwardly from the core or axis, have not been shown in Figure 1, to avoid confusion, but it will be understood that for any given radial position in Figure 1 the intensity of the color of the wave-length in question would be shown by the closeness with which such fine vertical lines might have been illustrated, and that such closeness would be uniform for all cylindrical elements of the designated radius, throughout the entire height of the tree, and completely around the tree.

It is now evident that the effects of introduction of white light component are shown by the tree of Figure 1, and that they are there shown in relation to the wave-length of the color being considered, as well as the intensity of such color.

Thus it appears that three vitally important elements must be considered and provided for to produce a correct replica of the color impression produced by the object sought to be replicated, as follows: First, wave-length; second, intensity; and third, amount of white light component present in the color to be replicated. When using a television system based on the three primary color (or two) principle, two of these essential elements, only, have heretofore been accounted for, namely, wave-length and intensity. Provision has not heretofore been made for introduction of white light component in proper proportions at all times to exactly simulate the amount of such component present in the light reflected or emitted from the object and which is being reproduced, or intended to be reproduced. In the absence of such white light component the reproductions are necessarily false as respects color simulations, and this falsity is in many cases so intense as to completely destroy the true value of the color replica. Many colors thus produced without introduction of the correct white light component appear harsh, and flat, and this is especially true when two colors of severe wave-length difference are brought into close proximity in the replica, as when there is a sudden and sharp contrast between the colors of two immediately adjacent objects, or parts of the same object. Also, the simulation or replication of color conditions involving the slow merging of one color with another are generally untrue, and are exaggerated by reason of the absence of the white light component. By my presently disclosed means to analyze the light emitted from each portion of the object to determine, not only the proper primary colors and the intensities of each to be transmitted and reproduced at the receiver, but also the amount of white light component being emitted from each such point of the object, together with provision for introducing the corresponding proportion of white light into each point of the replica, I have provided the means to greatly improve the color reproductions, and the faithfulness of the replica, as well as the actual beauty and lovliness of objects of which the replication could not otherwise be brought into true color realization.

At this point it is noted that the illumination seen by an observer looking at the original object under any condition of illumination is by reflected light (unless such object be a light source, such as a lamp), so that the white light by which the object is illuminated is also reflected and very materially influences the color effects viewed by the observer looking directly at such original object. The amount of white light thus reflected will depend of course on the intensity of the illumination to which the object is subjected, as well as the nature of the reflecting surface, its contour, and other influences; but nevertheless such white light reflection very materially affects the appearance of the object as seen by the observer. However, under presently known means to scan and transmit signals from which to reproduce the replica at the receiver viewing screen, and under the presently known reproducing means to receive and interpret such signals, only the color effects contained in the illumination reflected by the original object are scanned and used to produce the transmitted signals, with no provision for transmitting signals dependent on the reflected white light. Furthermore, under presently known means to translate the received signals at the receiver the image is produced on the viewing screen by excitation of a phosphor or phosphors excitation produced by the electron beam of the kinescope or kinescopes. The strengths of these excitations are controlled by the strengths of the received signals. However, no provision is made by such arrangements for production of white illumination on the viewing screen, except as such white illumination might be produced by mixing of two or more signals delivered by corresponding primary color effects. Thus it is evident that such previously known means have not made provision for direct signalling of white light components reflected from all portions of the object under examination by the camera, and especially it is seen that provision has not heretofore been made for signalling such white light component effects additionally to the signals and effects produced by the use of the three primary color signals themselves.

Before proceeding to describe the means which I have herein disclosed for carrying out the operations previously described herein I shall first briefly refer to certain additional elements of the present problem. To this end reference may now be had to Figure 5 and to Figure 6.

In Figure 5 there is shown more or less to scale, the relation which the human eye bears, as respects its ability to receive color impressions, to the wave-lengths of such color impressions. That is, in this figure the "efficiency" of the eye to receive color impressions is indicated by the hight of the curve 75ª at various indicated wave-lengths. These "efficiencies" are shown on an arbitrary scale, but their relative hights are indicative of relative effects. It will be seen that for short wave-lengths (in the violet end of the spectrum), a given color intensity has a small effect on the sensory nerves, so that to produce a strong effect by such short-wave illumination it is necessary to use a relatively high color intensity. This is also true of the long wave-lengths (at the infra-red end of the spectrum). As the wave-lengths vary between these two limits the eye response rises to a maximum at about the middle of the Green, with a rather sharp peak point.

Now, the production of primary color signals by the electron beam or beams of the iconoscope or iconoscopes or the orthicon tubes or other scanning elements is dependent on various photoelectric effects and the like, and the strengths of these signals are not proportional to the same controlling factors as affect the effects of corresponding color wave-lengths and strengths on the perception of the eye. This is also true of the translating effects produced by the electron beams of the kinescope or kinescopes used at the receiver. For this reason some compensation should be introduced into the system to ensure that for various wave-lengths scanned and thereafter reproduced by the receiver the effects produced on the observer's eye will correspond to those effects which would have been produced, had the observer directly seen the object itself instead of a replica thereof. The ability to effect complete compensation for the foregoing stated conditions is complicated by reason of the fact that a great majority of the color effects, both as originally scanned, and as then reproduced, are not the exact primary colors themselves, but rather are complex effects produced by mixing of two or more of the primary colors in proportions as controlled by the sending and receiving equipment.

In Figure 6 I have shown, in circular form a chart whereon the various generally accepted colors which produce white light are shown as subtending arcuate embracements proportional to reciprocals of the "efficiencies" shown in Figure 5. That is, in Figure 6, for example, the arc embraced by the Red is shown as covering 120 degrees of circle, and the arc for the Blue as covering 150 degrees of circle, whereas the arc for the Green covers only 90 degrees of circle. The arcs for the various ones of the seven generally accepted classes of colors, Red, Orange, Yellow, Green, Blue, Indigo, and Violet, are also shown individually in degrees in this chart. As one feature of my present invention I propose to provide lineations or other color responsive elemental areas in or on or as parts of the receiver viewing means, which are of area proportioned substantially according to the arcuate embracements shown in Figure 6; that is, the excited areas for the Red and Blue are greater than the areas for the Green. Thus, a greater amount of illumination will be produced when either the Red or the Blue is excited, than when the Green is excited; taking account of the intensities of the electron beams as controlled by the incoming signals. When the primary color areas are lineations, as shown in various of the figures hereinafter referred to, the widths of these color lineations may be proportioned according to the general proportions thus indicated. Other forms of color responsive areas may be correspondingly proportioned.

The ideal means for introducing the white light component into the replica would specify that such white component should be introduced simultaneously with the production of the corresponding color component so that exact registry of both components, spatially on the viewing screen might be secured. However, such an arrangement would of necessity require the production and provision of means to scan both the color component and the corresponding white light component simultaneously, and the transmission and reception of the white light component signal simultaneously with its companion color component signal. Such simultaneous signalling and reception and interpretation is possible by use of various means such as the provision of an extra channel of signals. Other means which may be used to effect the simultaneous transmission of two sets of signals are also known. In one embodiment of my invention as hereinafter described I have made such provision for simultaneous production, transmission, and translation of the white light component simultaneously with the corresponding color component. The specific means illustrated for effecting this result is one embodying the "dot" system of the R. C. A., but I wish it understood that I do not limit myself in the simultaneous production, transmission, and translation of the white component signals and the corresponding color component signals to the use of such "dot" system, nor to any other specific system, except as I may do so in the claims to follow.

I have also hereinafter disclosed various other means to carry my present improvements into effect. Included in such means are the following:

1. Linear scanning and translation:
   A. Field scanning and translation,
      I. All primary colors—then white—then repeat, with color areas proportioned according to efficiencies, but all whites equal to each other in areas.
         a. Red, Blue, Green, White, Figs. 7, 8.
         b. Red, Green, Blue, White, Figs. 9, 10.
         c. Blue, Red, Green, White, Figs. 11, 12.
         d. Green, Red, Blue, White, Figs. 13, 14.
         e. Blue, Green, Red, White, Figs. 15, 16.
         f. Green, Blue, Red, White, Figs. 17, 18.
      II. Each primary color followed by its White component until complete area is scanned, thus—Red, White, Green, White, Blue, White.
         a. With color areas proportioned according to efficiencies, but Whites all equal to each other, Figs. 19, 20.
         b. With color areas proportioned according to efficiencies, and Whites proportioned according to efficiencies of corresponding colors, Figs. 21, 22.
   B. Line scanning and translation,
      I. Compound lineations, each including a color lineation and a corresponding White lineation, with scan along both and means to shift beam more or less from one section to the other according to beam intensity, Figs. 23, 24.
      II. Lineations of color, with interspaced lineations for White.
         a. One interlace producing field scan for all colors followed by field scan of all Whites, Figs. 25, 26.
         b. Two interlaces producing linear scans of colors followed by linear scans of Whites corresponding to colors, between color scans, Figs. 25, 26, as modified by two interlace operation.
      III. Lineations of color with White injection along each lineation and during scan,
         a. Regular breaks in color occupied by Whites, such breaks being in vertical alignments, Figs. 27, 28.
         b. Regular breaks in color occupied by Whites, such breaks in the successive lineations "breaking joints," Figs. 28, 30.
         c. Partial breaks in color comprising White areas inserted into the bodies of the color lineations, Figs. 28, 29.
2. Dot scanning and translation:
   A. Dots laid down by lineations with dots of different colors coming in regular order,
      I. White areas injected between successive color dots, Figs. 31, 32.
      II. White areas injected directly into the color dot areas, Figs. 32, 33.
      III. Dots laid down in linear form, with the color dots and White dots coming in regular succession, Figs. 34, 37.
   B. Dots laid down in pattern groups with dots of each group located in circular pattern,
      I. Viewing screen being provided with phosphor dots responsive to emit colors and white from the respective dots as they are excited by electron beam, Figs. 34, 35.
      II. Viewing screen being provided with color lineations for the several primary colors, and White, positioned to be impinged by the successive electron beam dot impulses, Figs. 34, 36.

Included in the various schemes outlined above are various forms of translation at the receiver. Some of these include the use of phosphor screens which are responsive to produce the primary colors and White when various portions of the phosphor coatings are excited; others include arrangements in which the colors and White may be produced on a screen which is of uniform phosphor coating over its entire surface so that it will produce, when excited at any point, white light, such arrangements being usable in connection with such color lineation arrangements as are disclosed in my co-pending application, Serial No. 197,782, Patent No. 2,683,769, issued July 13, 1954, already referred to; and still others include arrangements in which use may be made of plural kinescope combinations together with colored filters interposed in the paths of the light beams projected by such kinescopes, which light beams are then brought together at the viewing screen by suitable light systems in well understood manner. It is pointed out, however, that in each case I have made provision for translating incoming signals which incoming signals represent the primary colors, and also directly represent White components, so that the replica includes the introduction of such white light components according to the amounts and patterns as determined by the sending equipment, including the camera. I shall now mention briefly the various sending arrangements herein disclosed for determining the amount of white light component contained in the images being scanned at the camera and at all portions of the image as said image continuously changes; and for emitting signals corresponding to such white light component for reception of such signals by the receiver, under proper discrimination and order with respect to the corresponding color signals, and for then translating the same according to the general schemes already referred to. Thereafter I shall describe each of the various sending and receiving arrangements herein disclosed, in such detail as may seem necessary for a correct understanding thereof. The signal sending arrangements herein specifically disclosed include the following, by way of illustration.

1. Single beam iconoscope—linear scanning:
   A. Field scanning,
      I. With rotating, four segment color filter including three segments for primary colors and one clear segment for white light component scan.
         a. Red, Blue, Green Clear, Fig. 39, for Figs. 7, 8.
         b. Red, Green, Blue, Clear, Fig. 40, for Figs. 9, 10.
         c. Blue, Red, Green, Clear, Fig. 41, for Figs. 11, 12.
         d. Green, Red, Blue, Clear, Fig. 42, for Figs. 13, 14.
         e. Blue, Green, Red, Clear, Fig. 43, for Figs. 15, 16.
         f. Green, Blue, Red, Clear, Fig. 44, for Figs. 17, 18.
      II. With rotating, six segment color filter including three segments for primary colors and a "complementary" segment between each pair of primary color segments, and of color complementary to preceding primary color segment.
         a. Red, Red complement, Green, Green complement, Blue, Blue complement, Fig. 45, for Figs. 19, 20.
         b. Red, Red complement, Green, Green complement, Blue, Blue complement, Fig. 46, for Figs. 21, 22.
   B. Line scanning—stationary three color lineated filter in light system, Figs. 47, 51, for Figs. 23, 24, and for Figs. 27, 29, 30.
   C. Line scanning—stationary three color and clear lineated filter in light system, with a clear lineation between each pair of color lineations, Figs. 47, 51, for Figs. 25, 26.
2. Dot scanning:
   A. Four iconoscopes or orthicon tubes, or other suitable tubes, one for each primary color, and one for White components:
      I. Using reflected light, Fig. 53:
         a. To produce signals in patterns of four, one for each primary color and one for White to complete the pattern, Figs. 53, 54, for Figs. 34, 35, 36, 37.
         b. To produce signals in patterns of six, one for each primary color, and one for the White component of each primary color, Fig. 53:
            1. Sequential signalling of primary color and White component signals, Figs. 54, 58.
            2. Simultaneous signalling of primary color and White component signals, combination of Figs. 56 and 58.
      II. Using transmitted light, Fig. 60:
         a. To produce signals in patterns of four, one for each primary color and one for White to complete the pattern, Figs. 60, 54 for Figs. 34, 35, 36, 37.
         b. To produce signals in patterns of six, one for each primary color, and one for the White component of each primary color, Figs. 60, 58: and 61:
            1. Sequential signalling of primary color and White component signals, Fig. 58.
            2. Simultaneous signalling of primary color and White component signals, Fig. 61.
   B. Six iconoscopes or orthicon tubes, or other suitable tubes, one for each primary color, and one for each of the corresponding White components:
      I. Using reflected light, Fig. 55:
         a. To produce signals in patterns of six, with each color signal followed by a corresponding White component signal, Fig. 57, for Figs. 31, 33.
         b. To produce signals for primary colors in sequence, with simultaneous signals for corresponding White components, Fig. 56, for Fig. 33.
      II. Using transmitted light, Fig. 59:
         a. To produce signals in patterns of six, with each color signal followed by a corresponding White component signal, Fig. 57, for Figs. 31, 33.
         b. To produce signals for primary colors in sequence, with simultaneous signals for corresponding White components, Fig. 56, for Fig. 33.

While special relationships have been indicated above as between the various receiving and sending elements of various schematic showings of light systems, and schematic showings of signalling means, still other possible combinations of these showings will suggest themselves to one skilled in the art, so the combinations stated above are not to be understood as limitations, but rather as illustrations of various possible combinations of these schematic showings.

It is also to be noted that each of the camera arrangements shown in Figures 59 and 60 will produce signals which may be used for securing the stereoscopic or "depth" effects already referred to. Also, that insofar as the production of said stereoscopic or "depth" effects are concerned, the provision for inclusion of white component may or may not be used. In the latter case the white light component signalling means might be eliminated or not used, together with the corresponding filters, etc. It is also noted that such arrangements as shown in Figures 59 and 60 by way of illustration, for producing the signals for stereoscopic or "depth" effects, may be used with suitable signal mixing arrangements such as shown in Figures 56, 57, 58 and 61, and others, by way of example. Such mixing arrangements, as well as others, may be timed to emit the signals for very short elements of time and line scan, producing "dot" signals and properly mixing said signals, or may be timed to emit the signals for full line scans, and with proper mixing for such complete linear scan signals. In the former case the receiver could operate on the "dot" system; in the latter case the receiver could operate on the linear scan system. In both cases the stereoscopic effects or "depth" effects would be produced.

I shall now describe the various specific disclosures as follows:

In Figure 38 I have shown, more or less schematically, a single beam, single iconoscope signalling element of the well known Zworykin detector plate type. This device need not be described in detail, as devices of this type are well known, and various of the elements are indicated by legends on the figure. The light system, however, includes the rotary disk filter 75, through which the beam of light received from the object must pass. This rotary filter is segmented into four segments, 76, 77, 78 and 79, when using any of the arrangements shown in Figs. 7–8, 9–10, 11–12, 13–14, 15–16, or 17–18. These segments are transparent, and are successively of the respective colors, and also a clear segment, as indicated in the various figures, such indications corresponding to the segment designations on said Figures 7 to 18, inclusive.

The segmented filter 75 is driven by the synchronous motor 80 under synchronous control effected through the sending system, as shown schematically by the legends in Figure 38, so that "field" scanning will be effected over the complete area of the image, for each primary color in succession, followed by a four "field" scan with the clear segment of the filter in the light path. Thus, for this fourth field scan the signals will correspond to excitation of the Zworykin plate under normal White light reflection from the object being viewed by the camera. Thus, when using either of the schemes shown in Figures 7–8, 9–10, 11–12, 13–14, 15–16, or 17–18, the White light component will be injected into the replica as a complete field of White light component after or during the cycle of the primary color field presentations. Various sequences of the primary colors and the White light component are shown in the various figures, and these need not be analyzed in detail here.

In Figures 45 and 46 I have shown other forms of segmented rotary filters. In these illustrations each filter includes six segments, including three segments for the three primary colors, with three interposed other segments; and in each of these arrangements each segment embraces sixty degrees of arc. When using such six segment filters the synchronous motor drive should be at a rate of one revolution of the filter for each six fields of scan, so that a complete cycle of operations is effected during each complete filter revolution. Filters such as shown in Figures 45 and 46 may be used with the scanning and translating schemes shown in Figures 19–20, and 21–22, and others. Of course the six segments of each of these forms of figures 45 and 46 are transparent.

In the forms shown in Figures 45 and 46 the interposed "other" segments are designated as 84, 85, and 86, the primary color segments being designated as 81, 82, and 83. These segments 84, 85, and 86 are of colors complementary to the corresponding primary colors. That is, with rotation in the direction of the arrows shown in Figures 45 and 46, the segment 84 is complementary to the "Red" of segment 81, the segment 85 is complementary to the "Green" of segment 82, and the segment 86 is complementary to the "Blue" of segment 83. With this arrangement it is evident that the following operation will be produced:

Assuming that a Red scan is being effected, the Red segment 81 will be in the light beam, allowing passage of any red rays coming from the object at that instant, and which red rays are transmittable by the wave lengths permitted by the segment 81. Other rays will be cut off and the transmitted rays will be of a substantially saturated color and of intensity corresponding to such saturated color. Next, upon completion of the field of scan through such segment 81 the segment 84 will move into the light path. This segment is of color complementary to the segment 81, so it will permit passage of rays contained in the light beam then being scanned, complementary to the red which was passed by the segment 81. Of course it is assumed that the time intervals between scan with the segment 84 and the segment 81 are so small that the light beam being investigated during these two successive scans is substantially the same, both as to form and color, including White light component. Under this assumption, when the segment 84 of complementary color comes into range it will pass those wave-lengths permitted by its color, and other than the Red. Therefore it will pass wave lengths of a White component other than any White light wave lengths passed by the segment 81. This complementary component will then be signalled through the system, and will be received at the receiver for such disposition as may be effected thereby, according to the receiving scheme, some of which schemes have been illustrated herein.

In the modifications shown in Figures 62 and 63 the segments 84$^a$, 85$^a$, and 86$^a$ are shown as being clear instead of being of colors complementary to the primary colors which precede them, so that when using such filter arrangements as shown in these Figures 62 and 63 the White light components will not be restricted to such wave-lengths as may be admitted and passed by segments of complementary colors.

In the showing of Figure 47 I have shown a stationary lineated screen or filter 87 located in the light beam coming from the object, so that the image produced on the Zworykin detector plate at any point is produced by wave-lengths which are passed by the corresponding transparent color of the filter. These lineations are indicated by the horizontal striping 88 shown in Figure 51, but due to smallness of size of that figure the various colors are not there shown. However, these stripings are of the three primary colors, and also White or "complementary" or clear stripings, and should correspond, in their color successions, to the color successions which are to be produced on the replica formed on the receiver screen, and as indicated in various of the enlarged showings of that screen. Evidently, with this stationary lineated filter arrangement of Figures 47 and 51 the "White" lineations may be either completely clear, to pass all wave-lengths arriving at any given spot, or of color complementary to the proper primary color to which such "White" lineation corresponds.

Referring to Figures 38 and 47 I have therein shown the controls 89 and 90 adjacent to the iconoscopes 91 and 92 of said figures. These are the usual controls for vertical deflection (89) and for horizontal deflection (90), whose functions are well known and understood, and need not be specially described here. However, it is here noted that in some of the systems herein disclosed I have provided scanning arrangements in which a single interlace is used, whereas in other systems I have shown a two-interlace arrangement. These forms of interlace operation are also well known in this art.

In Figure 47 I have shown a supplemental control element, 93 adjacent to the stem of the iconoscope, and legended "Supplemental Vertical Deflection Control." This control may be used for ensuring that the scanning swings of the electron beam will properly register with the lineations produced on the Zworykin plate by reason of the presence of the screen or filter 87.

I shall presently describe the various receiving arrangements illustrated in various figures and which are usable in connection with the general forms of sending elements thus far described. Before doing so, however, I shall describe the remaining forms of sending elements shown in Figures 53 to 61, inclusive. In these figures I have shown schematically various forms of sending elements each of which includes a number of iconoscopes or other detector arrangements, corresponding to the primary colors, and also includes one or more other iconoscopes of other detector arrangements, for sensing the White light components present in the illumination reaching the camera, and also includes suitable means for effecting the proper signals for transmission to and reception and interpretation by the receiver. Some of the arrangements shown in Figures 53 to 61 include forms of discrimination between the primary color components by use of reflected light, as when using such elements as dichroic plates; and others of said arrangements use transmitted light exclusively, for effecting the desired discriminations, as by the use of screens or filters of simple form.

In Figure 53 I have shown the three camera elements 94, 95 and 96 for the primary colors, and the camera element 97 for signalling White light signals corresponding to the full body of light arriving at the camera location. To this end the dichroic plates 98 and 99 are provided in the line of light, set at right angles to each other. The plain transparent reflector 100 is set in advance of the dichroic plate 98 to reflect a sample of the incoming beam, without, however, subtracting any band of wave-lengths from the beam. The sample reflected by this plain reflector 100 passes directly to the camera element 97 which will therefore signal proportionately to the full light beam arriving at the camera. The usual reflectors 101 and 102 are shown for directing the color components reflected by the dichroic plates 98 and 99 to the cameras 96 and 94, respectively; and the remaining segment of light passing through the dichroic plates passes to the camera element 95. With this arrangement the Red component will be directed to the camera element 96, the Blue component will be directed to the camera element 94, and the Green component will be delivered to the camera element 95. Reflectors 101 and 102 are full reflectors, whereas the reflector 100 is also a transmitter of light.

The scheme shown in Figure 53 is well known in this art, with the exception of the provision for abstracting a sample of White light by means of the plain reflector 100, and the provision of the White light component camera, 97. These elements make it possible to determine the full value of illumination arriving at the camera location, so that signals proportionate to this full body of illumination may be produced, for providing "White" light signals. These will be proportionate to this full body of illumination, including all White light component present, and thus will substantially approximate the amount of White light component. The signals from the cameras 94, 95, 96, and 97 are used for signalling the necessary signals to the receiver in any suitable manner. I shall presently disclose such signalling means effective to produce such signals as may be used with various receiving elements for production of the desired color replica, including the White light effects.

In Figure 55 I have shown another arrangement of camera elements employing dichroic plates for effecting separation of the Red and Blue components from the Green component, but in the present embodiment I have also provided means to produce signals proportionate to White light components corresponding to each of these three separated color components. Thus, the present arrangement is one in which White light components are made available according to the true amounts of White light contained in the various primary color segments.

To the above end, I have provided the three color responsive cameras, 103, 104, and 105 for the Red, the Green, and the Blue components, respectively. The dichroic plates 106 and 107 are provided in the main path of light arriving at the camera. The plate 106 reflects a Red sample to the simple reflector 108 from which said sample is directed towards the Red responsive signalling unit 105, such as an iconoscope or the like. The plain reflector 109 is placed in the path of a sample of the light coming from the main light beam from the object, such sample being taken from said main beam by the plain reflector 109ª before reaching the dichroic 106. The sample reaching this reflector 109 is divided, part moving to another iconoscope or the like, 110, so that this unit will deliver its signals proportionate to the effect produced thereon by the sample of light arriving at said unit 110. I place a screen or filter 111 between the reflector 109 and the iconoscope, 110, which filter 111 is preferably of color to pass those wave-lengths complementary to the Red component, which wave-lengths, combined with the wave-lengths of the Red component, would produce White light. At this point the Red wave-lengths contained in this light beam will be arrested by the filter 111, but any remaining White light component wave lengths will pass this filter, to the iconoscope 110. The iconoscope 110 will respond to that portion of this White light component which passes the filter, and will deliver signals proportionate to the same. These signals may then be used for signalling to the receiver for production of White light components of amount proportionate to their intensity, for use in connection with the Red component signals received corresponding thereto.

In the arrangement of Figure 55 the Blue component is reflected by the dichroic plate 107, and then is reflected by a simple reflector 112 towards the iconoscope or the like 103 which is responsive to the Blue component. The plain reflector 113 is placed in the beam coming from the reflector 109 and deflects a sample of said beam to the iconoscope or the like, 114 which produces a signal proportionate thereto. A filter or screen 115 is placed in the path of this sample. This filter is transparent and of color complementary to the Blue component passed over by the dichroic plate 107, so this filter 115 will pass only wave-lengths which are other than the Blue, which said filter blocks, and which wave lengths are contained in any White light component arriving said filter. The iconoscope 114 will respond to that portion of the White light component which passes this filter, and will deliver signals proportionate to the same. These signals may then be used for signalling to the receiver for production of White light components of amount proportionate to their intensity, for use in connection with the Blue component signals received corresponding thereto.

In the arrangement of Figure 55 the dichloric plates 106 and 107 transmit the Green component, directly to the iconoscope or the like, 104, which is responsive to such Green component. The plain reflector 116 is placed in the path of the beam coming from the reflector 109, and reflects a sample thereof to the iconoscope or the like, 117. A filter 118, or screen, is placed in the path of this sample, being transparent and of color complementary to the Green sample. Thus said filter will pass any wavelengths other than for the Green, and which wave-lengths are contained in the beam. This component which is thus passed will affect the iconoscope, 117, producing therein signals proportionate to the light arriving from the filter, 118. These signals may then be used for signalling to the receiver for production of White light components of amount proportionate to their intensity, for use in connection with the Green component signals received corresponding thereto.

Evidently all of the iconoscopes or other elements, 103, 104, 105, 110, 114, and 117 should be provided with signalling devices such as photo-responsive plates, such as Zworykin plates or the like, which will respond readily to the effects of wave-lengths intended to be received by said elements; and the circuits to which the signals are delivered from these plates should be provided with amplifying means and controls therefor, such as to enable the signal effects delivered under control of such camera arrangement to properly correspond to the intensities of the light components which are delivered to these units. Such means are well known in this art and need not be specifically disclosed herein.

Both of the arrangements described and shown in Figures 53 and 55 include the use of dichroic plate reflectors. The principles of these plates are well known, and camera arrangements have been made known in this art which embody such elements in connection with the separation of the primary color components. However, as far as I am aware no provision has heretofore been made for producing signals corresponding to the White light components corresponding to such primary color components.

In both of the arrangements of Figures 53 and 55 the separation of the Blue and the Red components from the Green component, is effected by reflection. In Figure 53 the sample of the entire body of light used for production of the White light signals is effected by reflection. In Figure 55 the White light samples are also produced by reflection, by plain reflectors. The signals produced by the various primary and White light components produced by the arrangements of Figures 53 and 55 may be used in various manners, some of which I shall presently describe in detail; but before doing so I shall first refer to certain disclosures of means to effect the desired formation of the primary color and White light components by transmitted light, instead of by reflection. This means also produces signals which may be used for securing the stereoscopic or "depth" effects in the replica produced by the receiver. For this purpose reference may be had to Figures 59 and 60, as follows:

In Figure 59 I have shown six camera elements 119, 120, 121, 122, 123, and 124; the elements 119, 121, and 123 being for signals of primary colors, and the elements 120, 122, and 124 being for signals of White light or complementary color components corresponding to the primary color signals. All of these camera elements are mounted on a common base or stand 125 which may be suitably carried by a bracket 125ª so that it may be quickly and easily moved into different angles horizontally and of tilt, to direct the camera towards the object being analyzed by the cameras. A handle 126 is shown for enabling the base 125 to be thus shifted by the operator. Each of the camera elements is pivotally carried by this base element, on the pivots 127, 128, 129, 130, 131, and 132, so that all of the camera elements may be simultaneously rocked in harmony to hold them all in focus on the object which may be in movement. The several lines of light from the object to the several camera elements are shown by the broken lines 133, 134, 135, 136, 137, and 138. All of these lines converge on the point of the object under scrutiny. A handle 139 carried by the base 125 may be rocked on its pivot 140 for control of all the camera elements; and the connections between this handle and the several camera elements are shown by the broken lines 141, 142, 143, 144, 145, and 146. Each of the camera elements is provided with a lens system which may be adjusted for varying focal lengths as needed according to the varying distances of the camera elements from the object. These lens systems are shown schematically at 147, 148, 149, 150, 151, and 152. These lens systems are also connected to the connections 141, 142, 143, 144, 145, and 146, respectively, by the connections 153, 154, 155, 156, 157, and 158, shown schematically by broken lines. With this arrangement, as the distance of the camera from the object is changed, the several camera elements are simultaneously rocked on their pivots 127, 128, 129, 130, 131, and 132 so as to maintain all of these elements simultaneously trained on the object, and at the same time the focal lengths of all of the camera elements are corrected so that the light beams arriving at all of the camera elements are continuously maintained in focus, to ensure continuous focus of all said light beams on the Zworykin or other detector plates contained within the several camera elements.

In Figure 59 I have not illustrated the means for shifting the various camera elements on their respective pivotal points and for simultaneously shifting the focal lengths of the various camera elements, under control of the handle 139, as such means are well known in the camera arts. Examples of such arrangements are shown and described in Letters Patent of the United States No. 1,528,464, issued March 3, 1925, to Donald C. Biedler and Antonius J. Viken, for Portrait Cameras, and No. 1,833,668, issued November 24, 1931, to Donald C. Biedler and Antonius J. Viken, for Camera and the Like. By mentioning the foregoing patents I do not intend to limit myself to the structures shown therein, but mention said patents only by way of illustration.

Suitable color screens or filters are located in the light paths leading to the several camera elements 119, 120, 121, 122, 123, and 124. In the schematic showing of Figure 59 I have shown these filter elements as located outside of their respective camera elements, for convenience of showing, but it will be understood that said filter elements may be located within the several camera elements. These filter elements are as follows: The Blue filter 159 in the light beam 133 leading to the camera element 119, the Green filter 160 in the light beam 135 leading to the camera element 121, and the Red filter 161 in the light beam 137 leading to the camera element 123. These filter elements pass saturated light of the several color segments corresponding to the respective primary colors used in the system, excluding the other wave-lengths from the respective camera elements.

Included in the light beams 134, 136, and 138 which lead to the camera elements 120, 122, and 124, respectively, are the screens or filters 165, 166, and 167, respectively. Each of these filters is of color complementary to the saturated color passed by the filter 159, 160 or 161, for corresponding saturated color. Several such complementary colors are stated earlier herein, by way of example, and not as limitations. The beams 134, 136, and 138 passing the complementary filters will contain only wave lengths from the light contained in the beams originally arriving at the filter systems. These wave length components will move into the respective camera elements 120, 122, and 124, respectively, to there produce signals proportionate to the intensities of such components. These signals may then be used for producing signals to the receiver for use in various manners to inject White light components into the replica. Several such translation means are herein disclosed, and will be described in detail hereinafter. It is noted at this point that this arrangement makes provision for a signal corresponding to and directly proportionate to the amount of White light component contained in the primary color component corresponding thereto.

In Figure 60 I have shown another schematic arrangement of camera elements similar to that shown in Figure 59, but in the present case I have made provision for signalling White light signals proportionate to the full body of light arriving at the camera from the object being examined. In the present case I have shown the base element 168, mounted by a bracket 168ª, provided with the handle 169 and mounted for movement in various directions, similarly to the base element 125 already described. This base element carries the four camera elements 170, 171, 172, and 173 which are pivoted to the base element 168 at the points 175, 176, 177, and 178, respectively. The base element 168 carries the handle 179 which may be moved in various directions to thus change the focal distance at which all of the camera elements will be brought to focus. The arrangement shown in Figure 60 is provided with connections between the handle 179 and the several camera elements and their lens systems so that all times all of the camera elements will be directed to the same point of the object being examined, and with all of the camera elements properly focused to such point. It is unnecessary to describe these connections in detail since said connections may be of form and function similar to those already described, in connection with Figure 59.

The light beams arriving at the several camera elements are shown by the broken lines 180, 181, 182, and 183, for the camera elements 170, 171, 172, and 173, respectively. All of these light beams come from the same point of the object, and move to the several camera elements. Located in the beams 180, 182, and 183, are the screens or filters 184, 185, and 186, for said beams, respectively. These filters are for passage of Saturated Blue, Green, and Red light, respectively, thus corresponding to the filters 159, 160, and 161 of the arrangement shown in Figure 59. Thus, the camera elements 170, 172, and 173 are effective to signal for Saturated Blue, Green, and Red components, respectively in manner already disclosed. No such filter is shown in the light beam 181 arriving at the camera element 171. Thus, signals delivered by the camera element 171 will be based on a light beam including the full body of wave-lengths reflected from the point of the object then under scrutiny. These signals may be used for injection of the desired White light components into the replica being produced at the receiver, suitable signalling, transmitting, and receiving means being provided as will hereinafter appear.

At this point I wish to emphasize that both of the arrangements shown schematically in Figures 59 and 60 include means to produce signals proportionate to the several Saturated color segments or components, by use of completely transmitted light beams, as distinguished from primary color light beams which are reflected by dichroic, as in such arrangements as those shown in Figures 53 and 55 previously referred to herein. Thus I have disclosed light systems functioning on both the reflected and the transmitted light systems, and provided with means to separate out the desired saturated color elements by means operating on both the color reflected and the transmitted light principles.

In connection with the foregoing distinction as between the reflected and the transmitted light arrangements, the reflected light systems herein shown include the use of dichroic plates. These plates are formed of crystals having the property of showing different colors when viewed in different directions, being exhibited by doubly refracting crystals. The functions of these dichroic plates will be understood when it is stated that the pleochroism of some crystals is so strong that when they are viewed through in different directions they exhibit marked differences in color. Thus a crystal of the mineral cordierite (also called dichroite because of its strong pleochroism) will be seen to be dark blue, pale blue, or pale yellow according to which of three perpendicular directions it is viewed. The "face colors" seen directly in this way result, however, from the mixture of two "axial colors" belonging to rays vibrating in two directions. An important character of transparent crystals is that of unequal absorption in different directions, so that light will, as a rule, be differently colored according to the direction in which it has travelled through the crystal. This is known as "dichroism" or "pleochroism." In any case, however, it is evident that the light beam seen by the viewer is of reflected nature, instead of being a transmitted beam, as in the case of the filters shown at all locations in the arrangements illustrated in Figures 59 and 60. To this extent, among others, the arrangements of Figures 59 and 60 differ importantly from those shown in Figures 53 and 55.

It is also noted that with either of the arrangements shown in Figures 53 and 55 a suitable lens system may be provided at the point 187 (Figure 53) or 188 (Figure 55) to bring the camera as a whole to focus on the object being examined. With these arrangements the various camera elements, filters, etc., may be rigidly secured to a suitable base element, so that they need not change positions relatively to each other during frequent changes of focus on the object. These arrangements, therefore, provide relatively simple arrangements to ensure that the scans being performed on the several Zworykin or other detecting plates will at all times retain their exact positions relative to each other so that all scans will be properly related to each other. On the contrary, with such arrangements as those shown in Figures 59 and 60, wherein the various camera elements are adjusted relatively to each other during focus change, it is necessary to provide close tolerances in the means used for effecting simultaneous rocks of the several camera elements, and for effecting corresponding changes in focal lengths of their respective light systems. Such means are completely feasible, and their details need not be disclosed herein, as they incorporate mechanical means for close controls, and do not affect the light systems or the signalling means to which the present invention is directed.

The color signals produced in the camera element must be properly converted into signals which may be transmitted to the receiver and there translated into the desired replica. In the arrangements of Figures 38 and 47 only a single iconoscope or other detecting element is used, with a single electron scanning beam. The signals produced by this single electron beam are effected under light conditions produced either by the primary colors under different scans, and White light or its proper correspondent (as for example, complementary color) excitation, and the receiving equipment must be able to deliver to the viewing screen correspondingly colored (or White light) replica elements. In the arrangements of Figures 53 and 55, and those of Figures 59 and 60 there is provided an iconoscope or other detector element corresponding to each color (and White) requirement. With the arrangements of Figures 53 and 55, and 59 and 60, the various color and White signals may be forwarded according to various schemes, such as linear, or by "dots" or otherwise. Furthermore, with these arrangements the signals for White may be forwarded either sequentially with the color signals, or simultaneously with the corresponding color signals. I shall now disclose the several means which I have shown herein schematically, for effecting various forms of signalling by use of the arrangements of Figures 53 and 55, and 59 and 60.

In Figure 54 I have shown, schematically a layout for translating the signals from such a light system as that of Figure 53 or that of Figure 60, into consecutive signals on a single channel, so that the signals for the primary colors, and for White are emitted in succession, by a series of mixed highs, according to the principles of the so-called R. C. A. system. In this case, the signals for White components are delivered as a fourth signal in a set of four, the remaining three signals being for the primary colors. In the layout of Figure 54 the signals for the White component are delivered from the camera over the line 189 which is in addition to the lines 190, 191, and 192 for the Red, the Green, and the Blue signals. Also, the sampler 193 is, in this case, provided with four selector positions, thus including all three primary colors, as well as the White component. These four positions deliver the successive signals at ninety degree positions for the "highs" instead of at one hundred and twenty degree positions as previously known and used.

It will be understood that the "color camera" 194 shown in Figure 54 may be of either the form shown in Figure 53, or that shown in Figure 60, since each of these camera arrangements produces signals for the three primary colors, and a fourth signal for the White component based on the entire body of light arriving at the camera from the object being analyzed.

In the layout scheme of Figure 58 I have shown an arrangement whereby signals arriving from such camera arrangements as those of Figures 53 and 60 may be translated into successive signals in sets of six, instead of sets of four, for transmission to the receiver. In this arrangement I have provided a unit 195, shown as comprising a portion of the camera element, 194ª, which unit 195 is capable of delivering sine waves based on the White light illumination arriving from the camera element 97, of Figure 53, or from the camera element 171, or Figure 60, and which sine waves are of treble frequency as compared to the frequencies of the sine waves delivered from the camera elements 94, 95, and 96 (of Figure 53), or from the camera elements 170, 172, and 173 (of Figure 60), and with the highs of all of the six sine waves coming at 60 degree timing. The signals from this element 195 are delivered ultimately to the three positions 196, 197, and 198 of the sampler 199, which positions are between the positions for the primary colors. Thus said sampler will take highs from the three primary colors in proper succession, and according to well understood principles, but with other highs between said primary color highs, such other highs being received from the element 195 and corresponding to signals of White light components derived from the camera element 97 (of Figure 53) or from the camera element 171 (of Figure 60). With the arrangement of Figure 58 the mixed highs will therefore come at sixty degree positions, instead of one hundred twenty degree positions, as heretofore known, or ninety degree positions, as with the arrangement of Figure 54. All of these signals will be emitted over a single channel for transmission to the receiver.

The arrangement shown in Figure 58 will thus effect emission of signals over a single channel, including signals for the three primary colors coming in regular succession, and with interwoven signals for the White light components corresponding to said primary colors, all signals coming at sixty degree intervals of the complete cycle.

In Figure 57 I have shown, schematically, a layout for translating the signals from such a light system as that of Figure 55 or that of Figure 59, into consecutive signals on a single channel, so that the signals for the primary colors, and for White, are emitted in succession, by a series of mixed highs, according to the principles of the so-called R. C. A. system. But in this case the White light component signals are three in number, corresponding to the respective primary color signals, instead of being derived from the entire body of light arriving at the camera element. In this case of Figure 57 the signals for White components are delivered as individual signals for the several primary color signals, and interwoven between the successive primary color signals, to produce a complete set of six signals for the cycle.

In the arrangement of Figure 57 the several primary color signals are delivered over the lines 200, 201, and 202, and the several White component signals are delivered over the lines 203, 204, and 205, all of said signals coming from the camera element 206 which camera element includes the several elements 103, 104, 105, 110, 114, and 117, of Figure 55, or the elements 119, 121, 123, 120, 122, and 124, of Figure 59. All of these signals are delivered as sine waves, with their wave forms coming at sixty degree timings. The sampler 207 receives the signals just referred to and takes the highs from them in succession, for delivery to a common signal emitting system, as shown in Figure 57. Thus, this arrangement differs from that shown in Figure 58 primarily in this, that with the arrangement of Figure 58 the successive signals for primary colors and for corresponding White components include such White component signals based on the entire body of light arriving at the camera, whereas with the arrangement of Figure 57 each White light component signal is derived from the corresponding primary color segment of light.

It will be understood that the "color camera" 206 shown in Figure 57 may be of either the form shown in Figure 55, or that shown in Figure 59, since each of these camera arrangements produces signals for the three primary colors, and corresponding White light signals derived from the primary color segments, all light arriving from the object being analyzed.

In both of the arrangements of Figures 58 and 57 the six signals emitted to produce a complete cycle are emitted in succession, and at sixty degree spacings. Thus they can be emitted over a single channel. In Figures 56 and 61 I have shown schematic arrangements for emitting each primary color signal and a corresponding White component signal simultaneously, use being made of two channels for this purpose. Also, in Figure 61 the several White component signals are derived from the entire body of light arriving at the camera by such camera arrangements as those shown in Figures 53 and 60, whereas in Figure 56 the several White component signals are derived from the light segments from which the several primary color signals are derived.

In the arrangement of Figure 61 the camera element 208, of the form of either figure 53 or that of Figure 60, is provided with an element 209, similar to the element 195 of Figure 58, and which is capable of delivering sine waves based on the White light illumination arriving from the camera element 97, of Figure 53, or from the camera element 171, of Figure 60, and which sine waves are of treble frequency as compared to the frequencies of the sine waves delivered from the camera elements 94, 95, and 96 (of Figure 53), or from the camera elements 170, 172, and 173, (of Figure 60); but in the present case the highs of these treble frequency sine waves corresponding to White light components come simultaneously with the highs of the primary color signals corresponding to such White light component highs. Thus, at each one hundred twenty degree wave position there comes a high for a primary color, and also a high derived from the White light signal means.

The arrangement of Figure 61 includes provision for two channels, arriving over the lines 210, and 211, and also includes two samplers, 212, and 213, for the primary color signal highs and for the White light component highs, respectively. Both of these samplers are controlled by the same synchronizing generator 214, so are held locked in synchronism. The primary color signals are delivered over the lines 215, 216, and 217 to the sampler 212, and the White component signals are delivered from the element 209 to the sampler 213. This sampler is provided with three signal connections 218, 219, and 220 by which the highs for the White component signals are delivered through the sampler 213. The signals for the primary colors are delivered over one line 221 to the transmitting antenna, and the signals for the White components are delivered over the line 222 to the transmitting antenna, said lines carrying channels derived from the two channel lines 210 and 211 already referred to.

In the arrangement of Figures 56 the camera element 223, of the form of either Figure 55 or that of Figure 59, provides the means for delivering signals for the primary colors, and corresponding signals for White light components corresponding to the primary color segments.

The two channel lines 224 and 225 deliver two channels to this camera element. In Figure 56 the three primary color signals are delivered over the lines 226, 227, and 228 to the primary color sampler 229, said primary color signals coming either from the camera elements 103, 104, and 105, of Figure 55, or from the camera elements 119, 121, and 123, of Figure 59. The White component signals coming from the camera elements 110, 114, and 117, of Figure 55, or from the camera elements 120, 122, and 124, of Figure 59, are delivered over the lines 230, 231, and 232 to the sampler 233 of Figure 56. Both of these samplers are controlled by the same synchronizing generator 234 so they are locked in synchronism. In the present case, however the two samplers are so timed that the White component signals are transmitted simultaneously with the primary color signals corresponding to them, instead of sequentially as with the arrangement of Figure 57. The primary color signals are handled on one channel, and are delivered over the line 235 to the antenna system, and the corresponding White component signals are handled on the other channel, and are delivered over the line 236 to the antenna system. Thus it is possible to transmit each White component signal simultaneously with the corresponding primary color signal, receiving both signals simultaneously by the receiver for proper translation, according to one or more of the schemes presently to be described in detail.

Evidently, other suitable arrangements may also be used for enabling the simultaneous sending of the primary color signals and the white light component or complementary color component signals corresponding thereto, simultaneously. I contemplate all such arrangements as being within the purview of my present invention when falling within the scope of the claims to follow.

It is pointed out that I have provided means to signal the three primary colors and also the three White components corresponding thereto, being six signals for each cycle. Also, that I have disclosed means to produce and transmit these six signals either on a single channel, or on two channels. When all six signals are transmitted on a single channel it is evident that these signals will come at a rate of twice the rate of signals produced and transmitted according to the principles of the R. C. A. "dot" system using mixed highs, etc. By the use of two channels or other arrangements I am able to deliver each primary color signal and its corresponding White component signal simultaneously, with corresponding benefits, by so adjusting the signalling and transmitting means that such two companion signals come simultaneously; and in such case the rate of cyclic transmission will be the same as that used for such 'dot" system. However, it is pointed out that when using the two channel arrangement it is also possible to so adjust the White light component signals that they will not be in synchronism with the corresponding primary color signals, although being formed and transmitted at the same rate as the primary color signals. That is, the rate of transmission on both channels would be the same, but not necessarily in timed synchronism. Nevertheless, each channel would carry only the same number of signals as are carried by this "dot" system according to the principle of such system, but without provision for the signals of White light components. I shall presently disclose means to receive the White light component signals simultaneously with their primary color signals, and to lay down both the primary color and the corresponding White light component at the same point on the viewing screen, with a maximum of faithfulness of replication.

Various schemes of translation of the signals transmitted for production of the replica in color, including the effects of the White light component are shown in Figures 7 to 37, inclusive. These are as follows:

Various forms of "field scanning" or translation are shown in Figures 7 to 22. The replicas produced by these schemes are formed by scanning the entire area for production of the replica in the three colors in succession, each such scan constituting a "field" of scan in its color; but each of the schemes shown in these figures also includes means to introduce into the complete replica White light components according to the corresponding signals transmitted from the sending station. Generally, therefore, each of these arrangements includes means to effect a fourth or additional scan or scans to cause such introduction of White light component.

Adjacent to each of Figures 7, 9, 11, 13, 15, 17, 19, and 21 is a companion figure, being the Figures 8, 10, 12, 14, 16, 18, 20, and 22. These companion figures are reproductions of corresponding Figures 39 to 46, inclusive which have already been referred to. They show the order of colors scanned by the sending equipment, and thus also represent the orders in which the scans produced by the receiver shall produce colors on the viewing screen. The intensities of the colors produced are controlled by the strengths of the electron beams of the kinescopes of the receivers, and this is also true of the intensity of the White light component produced at any instant during production of such component. The strengths of the kinescope beams are dependent on the strengths of the signals emitted by the sending equipment, so the intensities of replica colors and White light components must correspond to the intensities of the colors, and of the White light component examined by the sending equipment.

In each of the schemes shown in Figures 7, 9, 11, 13, 15, and 17, there is one complete field of scan for the White light component for each set of three complete scans for the three primary colors. Thus, the introduction of the complete field of White light component occurs either directly after or during the corresponding complete scan of three fields for the three primary colors. However, in this group of schemes, six in number, I have shown various orders in which the three primary colors are produced.

In each of the schemes shown in these figures the widths of the lineations for the three primary colors are proportioned substantially reciprocally according to the relative "Efficiencies" of the eye for receiving color sense for the primary colors chosen. Thus it will be noted that in each of these schemes as illustrated the Blue lineation is the broadest, the Red is next in width, and the Green is the narrowest lineation in each case. The lines of scan effected by the electron beam are shown in all cases by the broken horizontal lines which are designated "A," "B," "C," and "D," etc., and it will be seen that even with the different widths of the lineations all lines of scan run lengthwise through the respective lineations. Thus, these arrangements may be used without change in the conventional form of electron beam scanning in the kinescope.

Since there are four fields of scan effected in each of these schemes I have shown them as being produced by use of one interlace, and also with use of an "offset" scan in each scheme. This operation is as follows: First, a normal scan is produced, designated as "A." Next, an interlace scan is produced, designated as "B." Then the "offset" is effected by introducing an additional control effect into the kinescope which serves to shift the electron beam slightly downward, but without affecting the scanning which will be produced by the normal and conventional controls for both horizontal and vertical shifts of the beam. In Figure 7 I have shown, schematically, a control coil 237 which, when properly excited will effect this shift of the electron beam slightly down or up, so that during this control the scans will be effected for the lineations "C" and "D," for "offset" scans. Similar "offset" controls will also be provided for the kinescope beam when using various of the other schemes now being described, although they are not specifically illustrated in various of the figures.

The proper color responses may be secured when scanning the various lineations shown in these figures in various manners. Some of these have been disclosed in my co-pending application, Serial No. 197,782, Letters Patent No. 2,683,769, already referred to. Other ways may also be used. Included in these ways to effect such proper color responses may be included the following: Provision of a kinescope window, and a transparent lineated screen directly adjacent to such window (preferably inside the kinescope), which lineated screen is provided with transparent lineations of the primary colors in regular succession, together with clear or non-colored lineations included in these groups of color lineations, so that all three primary color lineations and a clear or White lineation comprise each set of four, these sets being regularly repeated over the area of the viewing portion of the screen. When using such an arrangement there will also be provided a layer or film of phosphor at the electron beam face of this lineated screen, that is, behind such lineated screen; such phosphor being of a form to emit White light when excited by the electron beam, in well understood manner. When this phosphor is thus excited at any given spot it will emit White light of intensity proportionate to the intensity of the excitation; and the illumination thus produced will be seen by the viewer at the front of the kinescope window, through the lineation which is in line with the spot of illumination, and thus the viewer will see the spot as of the color of such lineation (or White, in case the lineation is clear or White). Of course the spacings of the lineations, and the vertical shifts of the electron beam, must be properly co-ordinated with each other so that the scans of the beam and the lineations will properly register at all times. In my copending application, previously referred to I have shown means whereby proper "synchronization" of the color operations may be indicated to the observer, and may be effected in case such synchronization does not exist at any time.

Another means to effect the desired color responses by use of a lineated screen includes the use of lineations formed on a screen by the use of phosphors which, when excited by the electron beam will emit lights of the desired primary colors, or White. In this case each lineation is formed of phosphor of the proper composition and characteristics so that it will emit the desired color (or White) illumination when excited.

Various other color lineated screen arrangements may also be used, as will suggest themselves. However, it is here noted that with the schemes shown in Figures 7 to 17, inclusive, the scans and the lineations extend parallel to each other, so that during each scan the electron beam remains on a registering scan of proper color characteristics (or White). I shall hereinafter show certain operations within the purview of my present invention in which, however, the electron beam scans are effected across or transversely of the scans, thus causing illumination of the various colors in succession during successive scans of the beam.

Another means to effect the desired color (and White component) responses at the viewing screen is the provision of a multi-gun kinescope arrangement, forms of which are well known in this art. Thus, by use of a four-gun kinescope, with proper controls for the several guns, one gun would respond to the Red signals, one gun to the Green signals, one gun to the Blue signals, and one gun to the White component signals. All four of these guns would be trained continuously on the proper lineations and would effect proper illuminations thereof according to the signals emitted from the sending station. Similarly, a six gun arrangement would enable reception of all the primary color signals, and the corresponding White light component signals from a sending station emitting signals for all these components, including White light components. I shall hereinafter refer again to such arrangements in connection with other receiving arrangements to be presently described.

Still another means to effect the desired color (and White) responses at the viewing screen is the provision of a plural kinescope and reflector arrangement, together with suitable color screens interposed in the paths of light delivered by the several kinescopes and brought, by reflection, to the common viewing screen. This arrangement would include one or more kinescopes responsive to the White light component signals, so that the White light components would be properly injected into the replica produced on the viewing screen. Other arrangements are also feasible, which include provision for receiving and translating and interpreting the White light component signals and injecting the corresponding White light components into the replica.

Each of the schemes thus described in connection with Figures 7, 9, 11, 13, 15, and 17, involves field scanning in which there is a single field scanned for White component for all three of the fields scanned for the three primary colors. This operation is possible with four fields scanned for each complete area.

In Figures 19 and 20, and 21 and 22 I have shown two other schemes of field scanning. In each of these schemes there is provision for a field scan for White component corresponding to and following each of the field scans for a primary color. Thus, each color field scan is followed by the field scan for White light component corresponding to such color, thereby ensuring a more prompt injection of the White light component visual effect into the visual effect produced by the color scan, and also ensuring that the White light component injected for each color shall be more nearly proportional to the White light component contained in the original shade of color as viewed by the camera than would be possible with only a single field scan for White component corresponding to all three of the color scans. This scheme requires scan of six fields in succession, as shown by the designations adjacent to the successive lineations, thus, "A," "B," "C," "D," "E," and "F." The suffixes "1" shown adjacent to each of the lettered designations indicate that only the first set or group of scans is shown in the figures.

It is noted that in the screen shown in Figure 19 the various lineations for primary colors are of width proportioned to the reciprocals of the "efficiencies" of the eye to light. That is, the Blue is the broadest, the Red is next narrower, and the Green is the narrowest in width, reciprocally as the "efficiencies" of the eye to receive the several colors and sense them.

In Figure 19 all of the lineations for White components are of the same width. In Figure 21 the color lineations are of widths reciprocally proportioned to the "efficiencies" of the eye, so these color lineations in this figure are of the same property in this regard as corresponding color lineations of the showing of Figure 19. However, in Figure 21 the White light lineations are also proportioned reciprocally to the "efficiencies" just referred to, differing in this regard from the White light component lineations of Figure 19.

Adjacent to the showings of Figures 19 and 21 are the corresponding rotary segmented screens or filters which control the light beams moving to the cameras shown in Figure 38. These segmented filters are also shown in Figures 45 and 46 for convenience.

When using a rotary screen or filter at the camera and iconoscope location it would be possible to scan each line of the image under a different color of scan than the colors under which adjacent lines were scanned by rotating the filter at such a rate that the color segment presented in the light beam would be changed after each linear scan. However, this would require high rotative rates of the filter. Accordingly it is more convenient to use a lower rotary rate of the filter, and to scan a complete field of the image before changing the filter color.

In Figures 23 and 24, and 25 and 26 I have shown further schemes of translation at the receiver in which the consecutive lineations are scanned under the different colors and White component, instead of scanning by complete fields. With these schemes of translation at the receiver it is necessary to scan the successive lines of the image at the iconoscope under corresponding color (or White) illumination. As each line of the image being scanned at the iconoscope is traversed by the electron beam it must be under the proper color illumination, and since the lines are scanned in succession (or with one or two interlaces) it is evident that the image must be illuminated or formed in lineations of the primary colors and White so that as the beam traverses each line it will scan the same under the proper color (or White) illumination. The receiver kinescope is at the same time effecting its scans under conditions of the same color (or White) replica production as exist at the sending equipment at each instant.

In Figure 25 each of the lineations produces one of the primary colors (or White) as it is scanned, whereas in the arrangement of Figure 23 a somewhat different arrangement is shown, as will present appear.

Referring first to Figure 25, at the right-hand side of that figure I have shown the successive scans as "$A_1$," "$B_1$," "$A_2$" "$B_2$," etc. When scanning according to the sequence shown by these legends, a single interlace is used. With this sequence the scans occur as "Red," "Green," "Blue," (repeat, etc.) to the lower edge of the area. Then the interlace is effected and the scans on this interlace occur as "White," "White," "White," etc., and at the lower edge of the area the beam is restored to its high position for a new set of scans. Thus, although the lineations are produceable in the order of a White component line located between each color pair of lines, still all of the color lineations are actually scanned as a field, followed by the scan of all the White lineations as a second field. In the schowing indicated by the legends at the left-hand side of the Figure 25 the lineations are designated as "$a_1$," "$b_1$," "$c_1$," "$a_2$," "$b_2$," "$c_2$," etc. Also, at the left-hand side of this figure I have shown a two interlace movement of the beam. With this scheme of operation the sequence of scans will be as follows: "$a_1$" (Red); "$a_2$" (White); "$a_3$" (Red); etc.; then on the interlace, "$b_1$" (White); "$b_2$" (Blue); "$b_3$" (White); "$b_4$" (Blue); etc.; then on the second interlace, "$c_1$" (Green); "$c_2$" (White); "$c_3$" (Green); etc.; then returning to the original scanning elevation. With this scheme it is evident that there will be a White component scan following each color scan.

In Figure 26 I have shown a form of lineated screen which may be used at the camera location to produce the color lineations, and White, on the image which is scanned by the beam of the iconoscope to produce signals which may be transmitted and then received by a receiver scanning according to the scans of Figure 25. This screen or filter of Figure 26 is the screen or filter used at the point 87 of Figure 47 for this purpose.

In the arrangement shown in Figures 23 and 24 I have shown means to inject into the replica produced on the viewing screen a White component which is not directly signalled from the sending station but which is proportional to the intensity of the electron beam of the kinescope of the receiver, which intensity is proportional to the intensity of the illumination on the Zworykin plate of the sending icnoscope or other sending element. In the scheme of Figure 23 each lineation is so formed that it includes a color lineation and an adjacent lineation which will emit White component when excited by the electron beam. Normally, and with small beam strength and intensity, the beam will travel along one of these sub-lineations, generally the White component sub-lineation, but as the intensity of the beam increases during its traverse of the scan the beam is shifted slightly, either up or down as the case may be, but not sufficiently to move away from the double lineation being scanned. Thus, if the beam is travelling along the White component, with some overlap onto the color section of the lineation the beam will produce a combination illumination composed of partial illumination of the color lineation section and partial illumination of the White component section. If the arrangement is one in which increase of beam intensity serves to shift the beam more onto the color section and away from the White section, so that although a mixture of both color lineation and White illumination occurs, the ratio between the two components of such mixture will vary under control with variation of intensity of the beam. This scheme serves to increase the amount of illumination which will be produced on the viewing screen for low beam intensities, while at the same time ensuring some admixture of White light component even for high beam intensities. Thus the replica produced will be of increased illumination for the low signal strengths received from the sending station.

In Figure 23 I have shown the coil 238 adjacent to the lineated screen. This coil indicates a supplemental control for the vertical shift of the electron beam of the receiver kinescope, to shift the same slightly and proportional to the strength of said beam, for effecting the purposes stated above.

It is here noted that although the scheme of Figures 23 and 24 does not effect control of the amount of White light component injected into the replica proportionately to the White light component existing on the image being scanned at the sending station, still this arrangement does ensure injection of White light component, and does ensure increased illumination production by the phosphor of the kinescope, especially for low beam intensities. This is important, especially in those forms of color lineation in which the color lineations are in the form of transparent color lines through which the light must pass to the observer, as distinguished from those forms in which the different primary colors are produced by the use of different forms of phosphor, or other non-light transmission forms. When a transparent lineated screen is used there is some absorption of illumination passing through such screen. The arrangement just described in connection with Figures 23 and 24 will increase the intensity of illumination to compensate for such absorption, and such increase will be effected largely by increased White light component, and not simply by increase of intensity of the Saturated color component.

In Figures 27, 28, 29, and 30 I have shown other schemes for injecting White light component into the replica, without control of the amount thereof from the sending station. In Figure 27 each of the horizontal lineations 239 at the receiving kinescope is divided regularly by the short clear or White sections 240, so that as the electron beam traverses each lineation horizontally it encounters regularly these clear or White sections. If the lineations are in the form of transparent lines carried by a screen located directly in front of the phosphor surface which, when excited by the electron beam emits white light, then these sections 240 should be clear, whereas, if the phosphor surface is itself formed of different phosphors which, when excited by the electron beam, emit different colored lights, or White, then said surface should be so formed that these sections 240 will be of a composition which will emit White light components when excited. The corresponding screen or filter at the location of the light beam moving to the Zworykin plate of the iconoscope is shown in Figure 28, being a screen or filter shown at 87 in Figure 47, and also shown in Fig. 41.

In Figure 30 I have shown a modification of the form of arrangement shown in Figure 27, such modification consisting in staggering the sections 240$^a$ of the successive lineations, in Figure 30, instead of locating them in vertical alignments, as in Figure 27.

In Figure 29 I have shown a further modification of the scheme shown in Figure 27, which modification consists in providing small sections 241, either circular as shown in Figure 29, or of other forms, contained wholly within the lineations themselves. As the electron beam scans such lineations these small sections will ensure emission of White component injected directly into the body of the primary color then being scanned.

The sending arrangements shown in Figures 54, 56, 57, 58, and 61, already described, will emit successive "dots" of signals for the several primary colors (and White component), as each linear scan is effected by the sending iconoscope or iconoscopes used in those arrangements. Therefore, with such sending schemes the emitted signals, although being for linear scans, nevertheless contain successive signals corresponding to the successive colors (and White component) found along each scanned line. Included in such arrangements as developed in this art, are arrangements whereby these scans are truly linear, that is, straightly linear scans, and also scans in which the elements successively examined by the sending electron beams are located in small patterns, generally circular, which patterns are themselves located in horizontal alignments. I have not deemed it necessary to illustrate such "pattern" forming arrangements in detail herein, as they are well known in this art. However, the receiving equipment should be capable of receiving such "dot" signals either in truly linear form, if the signals are sent out in that form, or in such "pattern" form, if the signals are sent out in that form. I have herein shown means to inject into the signals as sent out for such "dot" systems, signals corresponding to the White components, as already detailed herein. I shall now describe means to receive such "dot" signals, including the White component signals, either of the truly linear scanning arrangement, or of the "pattern" arrangement. For this purpose reference may be had to Figures 31 to 37, inclusive.

According to a well known system of color transmission by "dots" (the R. C. A. system), the scanning is effected in four fields of scan. These are in the order of sequence shown in Figures 31, 32, and 33, being as follows: "$A_1$," "$A_2$," "$A_3$," "$A_4$," etc., then "$B_1$," "$B_2$," "$B_3$," "$B_4$," etc., then "$C_1$," "$C_2$," "$C_3$," "$C_4$," etc., and finally "$D_1$," "$D_2$," "$D_3$," "$D_4$," etc., and repeat. The several fields are offset lengthwise as indicated in these figures in well understood manner. As each line is scanned the primary colors are successively laid down as dots or small color areas, as shown by the legends in these figures. I inject into such a pattern the additional dots or areas for White light or complementary components corresponding to these conventional dots, and various schemes are shown for effecting this result.

In Figure 31 the conventional dots, shown by the rectangular areas carrying the legends "G," "R," and "B" are interspaced with additional dots 242 injected into the scans between the primary color dots, these additional dots injecting areas of White light or complementary component into the pattern in regular fashion over the entire area. Various means may be used to effect this result, some of which have been stated hereinbefore. Included in such means are various single gun arrangements. However, if the primary color dots are formed by use of a multi-gun arrangement, with provision for forming the primary colors by the several guns, then an additional gun may be provided for the White or complementary component dots, being a four gun arrangement. In this case the signals for these four guns may be emitted according to any suitable scheme from the sending equipment, as for example such an arrangement as that shown in Figure 58. In this case each of the White light or complementary components injected into the pattern at the receiver will correspond to the full body of illumination arriving at the camera. If the primary color dots are formed by use of a multi-gun arrangement, with provision for forming the primary colors by the several guns, then three additional guns may be provided for the White light or complementary components, being a six gun arrangement. In this case the signals for these six guns may be emitted according to any suitable scheme from the sending equipment, as for example such an arrangement as that shown in Figure 61, in which case each of the White light or complementary components injected into the pattern at the receiver will correspond to the full body of illumination arriving at the camera. Or, such an arrangement as that shown in Figure 57 may be used. In this case the White light or complementary component injected into each of the areas 242 will be of amount proportioned to the White light of complementary component as determined by the sending equipment for the corresponding primary color, just preceding such White light or complementary component injection.

In the scheme shown in Figure 33 use may be made of any of the emitting schemes above mentioned, as well as others, such as that of Figure 56. That is, use may be made of such schemes as those of Figures 56, 57, 58, and 61, but with the additional or supplemental gun or guns so trained onto the screen that their White light or complementary component dots will properly register with the corresponding primary color dots.

It is noted that some of the emitting schemes referred to above include provision for emitting the White light or complementary components simultaneously with emission of the primary color component signals. This is true of the schemes shown in Figures 56 and 61. Accordingly, when using such schemes as those of Figures 56 and 61 it is possible to lay down each White light or complementary component on the screen of the receiver simultaneously with the laying down of the corresponding primary color on said screen. This will give a most perfect replica since the primary color areas will be at once properly modified as to lightness or darkness by the presence of the proper White light or complementary components, and the element of persistence of vision will not be called upon to bring these two vital factors into juxtaposition in the sensual impression received by the observer.

In Figures 34, 35, and 36 I have shown various schemes for producing on the viewing screen the replicas including the primary colors, and also White light or complementary component. These schemes are based on the type of receiver in which there is provided one or more electron beams which, while travelling across the screen linearly, also are given a rotary movement, so that "dots" of the replica will be laid down onto the screen. Conventionally such arrangements include provision for laying down three dots for the primary colors, only. According to my present improvements I also make provision for laying down a fourth "dot" for the White light or complementary component in each of the patterns. Figure 34 shows a pattern in which the sending equipment may emit its signals for the four dots. In this figure each pattern of four includes the three primary colors, and a fourth for White light or complementary component, and these four are shown, for ready identification as connected by a dashed circle. Also, the dots of each such pattern are designated as "$r$," "$g$," "$b$," and "$w$," for identification. These groups of dots may be emitted in any suitable manner by the sending equipment, as successive signals. For examples of such emitting schemes reference may be had to Figures 54, and 53 and 60, wherein provision is made for emitting signals for the three primary colors, and for White or complementary component based on the whole body of light reaching the camera.

Figures 35 and 36 show schemes for receiving these signals and translating them into the desired replica. With the scheme of Figure 35 provision may be made, in the receiver, for four kinescope guns, for emitting the respective primary colors, and White or complementary; or, said receiver may be provided with a screen having small areas of different phosphors which will emit the three primary colors, and White or complementary, when excited by a single electron beam which is rotated, under proper control during its traversing movement of scan. With this arrangement the White light or complementary component injected into the replica will correspond to the White light component included in the whole body of light or complementary component arriving at the camera of the sending equipment.

In Figure 36 I have shown a modified arrangement for producing the desired replica, including the White light or complementary component, by the use of the "dot" system, and with use of a single gun kinescope, the gun being provided with means to cause its electron beam to rotate as it advances during traverse. In this case the kinescope is provided with a lineated screen including the primary colors, and provision for White or complementary lineations. These screens may be of such forms as disclosed in my aforesaid application, Serial 197,782 (Patent No. 2,683,769), for example. These lineations, may either be in the form of transparent color lineations, and transparent clear lineations properly interspaced between the color lineations; together with a suitable phosphor coating behind such screen, and formed of phosphor which will emit White or complementary light when excited by the electron beam of the kinescope, so that at each point the replica will be seen as of the color (or White or complementary) determined by the lineation which is in registry with the beam at that instant. Or the lineations may be formed of different phosphors which, when excited by the electron beam of the kinescope emit the primary colors, and white or complementary.

In Figure 36 these lineations are shown in their positions relative to the positions at which the various "dots" are laid down by the electron beam during its traverse. It will be seen from study of this figure that each dot for "Red" is laid down onto a "Red" lineation, that each dot for "Green" is laid down onto a "Green" lineation, that each dot for 'Blue" is laid down onto a "Blue" lineation, and that each dot for "White" or complementary is laid down onto a "White" or complementary lineation. Accordingly, it is possible with this arrangement to produce the desired color replica, including the White light or complementary components, by use of a single electron beam, or single gun kinescope, with the electron beam thereof properly co-ordinated with the incoming signals.

In Figure 37 I have shown a modified arrangement of the general form of that of Figure 36; but in the present case the electron beam of the gun is moved for traverses across the lineations, but without rotary movement of the beam. Still, the desired color (and White or complementary component) replica, will be produced within a tolerance of error which could not be detected by the eye of the observer, such error, if any, being due to non-rotation of the beam. However, if the signals emitted by the sending equipment were produced in the first instance by a traverse of the electron beam or beams of the sending equipment without rotary movement thereof, there would be no error whatsoever in the production of the replica by such an arrangement as that of Figure 37.

It is noted that when using a lineated screen at the receiver kinescope it is possible to use a single electron beam, and that special provision is not necessary to provide for such operations as causing several beams to continually focus on portions of a pattern which is itself moving laterally across the screen. Furthermore, when using such single beam arrangement it can be used with either of the schemes shown in Figures 36 and 37, thus providing a wide range of possible embodiments, each of which includes the injection of the White or complementary component.

It is also noted that although, in the schemes shown in Figures 36 and 37 the lineations do not extend vertically, but lie on a slant, still, by adjusting the electron beam operations so as to lay down the dots in a different angular position from that shown in these figures, vertical lineations could be used.

When using such schemes as those shown in Figures 7, 9, 11, 13, 15, 17, 19, 21, 23, 25, 27, 29, and 30, it is necessary for the scans of the electron beam of the kinescope to continually register with the lineations during traverses; and likewise, when using such schemes as those of Figures 36 and 37 it is necessary that the lineations of the screen properly receive the dots laid down on them. Accordingly, it is necessary that correct rotative position of the kinescope screen be ensured, with respect to the direction in which the electron beam scans are performed. It is furthermore desirable that the same kinescope, with its screen, be usable for reception of signals emitted on either the linear scan basis, or on the "dot" basis, thus making the receiver universally usable for reception of both kinds of signals.

To this end provision is made in the present case for rotation of the lineated screen about an axis extending centrally through said screen and extending substantially normal to the plane of the screen at the location of said axis, such rotation being through ninety degrees of angle or slightly more, so as to bring its lineations into either a horizontal position or an angular position, such as that shown by the lineations of Figures 36 and 37. Or provision may be made for changing the direction of electron beam scan, as from horizontal to vertical or vice versa, without rotation of the screen. Any suitable means may be used for effecting such screen rotation, but conveniently, and as a preferred arrangement, I provide mountings for the entire kinescope tube, including the screen, so that said tube may be bodily rotated either for adjustment of its lineations into correct registry with the electron beam scans, or for conversion from the horizontal scan and lineation arrangement to the "dot" scan arrangement. In Figures 48, 49, and 50 I have shown, more or less schematically, a mounting for the kinescope tube, whereby said tube may be rotated through substantially the ninety degrees or more of rotation. In this case the several control coils remain stationary in their positions around the stem or neck of the tube, so that the directions of the lines of beam scan are not changed when the tube is rotated. In these figures the cone 243 of the tube carries the usual front section 244 carrying the window, lineated screen, etc. The stem 245 extends backwardly from the cone in the usual manner. The flexible connection 246 for carrying current to the gun is shown extending from the end of the stem. The control coils for horizontal and vertical deflections are shown at 90 and 89, respectively. Any supplemental coil, such as the coil 238 of Figure 23 is also located around the stem, as shown in Figure 48. All of these control coils are mounted stationary and are not secured to the kinescope stem, but the stem is loose within the coils. Consequently the tube and stem may be rotated, the window and lineated screen rotating with the tube leaving the several control coils in their permanently located positions, so that the directions of beam scan are not changed by the tube rotation.

Conveniently the front end of the tube is carried by the rollers 247 and 248 working in the annular groove 249 of the front end of the tube; and a control button 250 is located just beneath (or adjacent to) the front end of the tube. This button has a short stem around which is wound a cord or narrow tape 251, which cord or tape also encircles the groove 249 once or twice so as to take a firm grip on the front end of the tube itself. The rear end, generally the stem, of the tube, may also be suitably journalled, if necessary, to relieve the front end of the tube of bending torque developed by the weight of the rearwardly extending portions of the tube. If desired the front portion of the tube may be provided with a lug 252 which may engage the two stops 253 and 254 carried by a stationary part to limit tube rotation; but such stops, if provided, should be so located that they would not prevent rotation of the tube sufficiently to bring its lineations into either proper horizontality or proper near verticality, as needed to bring about correct registry with the beam movements.

I wish to point out that the White light component contained in the illumination reflected from the element of the object being analyzed at the camera and sending equipment for replication at the viewing screen of the receiver is very different from the saturated components of color which are reproduced by the primary colors for which the apparatus operates. The illumination reflected from the element of the object under examination at any instant is due to the illumination to which that element of the object is then subjected. The reflection includes both saturated color elements and White light component. The primary colors by which this reflected illumination is broken up for signalling to the receiver must of necessity comprise "saturated" colors, that is colors each of which is of a narrow band of wave-lengths, since the selection of these primary colors and the filters used for color selection in the sending equipment must be such that the combination of these primary colors will produce white light. Each of these primary colors is, however, a saturated color of itself and is restricted to its narrow band of wave lengths. Consequently the signal based on such primary color cannot possibly convey "information" as to the "brightness" of the elemental area of the object being examined, but only information as to the intensity of the primary color component being signalled. Therefore the conventional signalling arrangements must of necessity effect signals based on saturated color components derived from whatever color of light is received from the element of the object then under analysis, and cannot convey any "brightness" information.

Likewise the receiving equipment must of necessity include filter or other means responsive to the incoming signals, either directly or through the medium of some intervening elements, to produce to the view of the observer on the viewing screen, replica elements which are of corresponding saturated colors, the intensities of such colors, however, being determined by the strengths of the received signals corresponding thereto. Here again the conventional equipment is not capable of producing in the replica any brightness component—that is, White component, since no signal has been received based on the amount of such component included in the illumination of the elemental area of the object being examined by the camera. The replica produced by the conventional equipment must therefore be composed of saturated colors without the tempering effect of the White light component included in the light originally reflected by the object under the illumination to which it is being subjected at the instant of examination by the camera.

Even if the White light component received by the camera equipment should modify the intensities of the signals emitted by the sending equipment corresponding to the successive primary colors being signalled, still, with conventional equipment these so modified signals would be received and translated by conventional receiving equipment merely as saturated color components of intensities corresponding to the strengths of the received signals. Such conventional receiving equipment is not provided with the means to discriminate what portion, if any, of the signal strength is due to any White light component, and the reproduction produced by such conventional receiving equipment must of necessity be composed solely of saturated colors admixed to the view of the observer by the process of persistence of vision, but without injection of proper amounts of White light component corresponding either exactly or even substantially, to the amount of White light component which was contained in the light originally reflected from the object under examination. Thus the "brightness" effect cannot be produced in the replica formed on the viewing screen by such conventional equipment.

On the contrary, I have in the present invention disclosed and provided the means to determine the amount of White light component contained in the elements of the object reflection, and have provided and disclosed the means to reproduce in the replica produced by the receiver corresponding White light components with all of the corresponding benefits, some of which I have previously explained herein.

I wish to point out that when using such an arrangement as that shown in Figures 7 and 8 it is possible to inject White light component into the replica produced to the view of the observer without special provision for signalling the White light components from the signalling station. In this case the amount of White light component thus injected into the replica will not be controlled by the amount of White light component reflected by the object under scrutiny; but various benefits will nevertheless be secured with this scheme some of which have been referred to previously herein. One such benefit is as follows:

In the case of the sending of three color signals by either the "dot" system or the linear system, both of which have been highly developed, I have shown that either of such forms of signals may be received and color interpreted according to the principles of my "lineated screens" disclosed in my aforesaid co-pending application, Serial No. 197,782 (Patent No. 2,683,769), or the present disclosures, it being merely necessary to rotate the kinescope tube to bring the lineations into horizontality or verticality (near) as the case may be, depending upon which type of sending of the color signals is to be received. Nevertheless, in either case the use of lineations of the form shown in Figures 23 and 24 will make it possible to inject White component into the replica produced by reception of such three color signals, even when such signals do not themselves include the added signal or signals for White light component. When using such a kinescope of lineated form, and with the lineations of the type of Figure 23, for reception of signals emitted according to the "dot" system, the lineations should be substantially vertical; and in such case there should be provision for slight shift of the kinescope electron beam horizontally instead of vertically, to cause each dot to emit light including both the color of the lineation and some White component, according to the principles stated in connection with description of Figure 23, etc. In such case of "dot" reception, and verticality of the lineations, the supplemental control element 238 should act to effect slight shift of the electron beam horizontally instead of vertically, and according to the strength of the electron beam current. Or, provision may be made for two such control elements, one for effecting slight horizontal beam shift, when using vertical lineations according to the "dot" system, and the other for effecting slight vertical beam shift, when using horizontal lineations according to the "linear" scanning system. In either case such control element would effect beam shift substantially proportional to the strength of the beam current or beam strength, and would not be of sufficient beam shift to normally cause said beam to depart from the overall width of the double lineation. In case of such two control arrangement, provision could readily be made for causing the proper control element to be brought into effect, as the kinescope tube was rotated from its horizontal to its vertical lineation position, or vice versa, so that proper beam control would be ensured in either case of operation. For example, when the tube is rotated to bring its lineations into horizontality the lug 252 may come into engagement with a contact carried by the stop 254 to bring the proper control into effect, the other control being out of operation, and when the tube is rotated to bring its lineations into verticality said lug 252 may come into engagement with a contact carried by the stop 253 to bring the other control into effect, the first mentioned control being out of operation.

An important feature of the present disclosures is that they include color television receiving and interpreting means which is compatible with conventional color television receivers; that is, when sending color and White or complementary component signals according to some of the disclosures herein contained, said signals may be received as fully responsive color and White or complementary component signals for translation to include the White components by reception in receivers which are provided with the means needed to receive such fully responsive color and White or complementary component signals, or they may be received as color signals, only, and translated to produce color reception, without inclusion of the White components, when the receiver is provided with the means to receive such color signals, only. Examples of such compatibility may be stated as follows:

In the case of color and White or complementary component signals emitted according to a conventional R. C. A. "dot" system (modified to include the White component signals, according to the present disclosures), such full color and White or complementary component signals may be received with linear interpretation to include the White components in the replica, by use of such lineated screen arrangements as shown, for example, in Figures 31 and 33 herein. In such case the White components will be laid down onto the receiving screen at the elements 242 of Figure 31, or in the circular White spaces shown in the "dots" of Figure 33. Thus a full reception, including the White component, will be produced. If, however, the receiver screen was not provided with such White spaces 242 (of Figure 31), or the White circular spaces in the dots of Figure 33, these spaces would be ignored in the replica, but the replica would include complete color interpretation, with production of a replica as correct and true as those produced by presently known conventional interpretations, which do not include the White components. In such case, also, it would be possible to produce complete and faithful replicas of such full signals (including the White components), by use of the same receiver, substantially without any converter, merely by substituting a kinescope provided with a viewing screen having provision for interpretation of the White or complementary component signals in White on such viewing screen. Similar remarks also apply with respect to signals received on the "dot" principle, but with a rotating beam receiver, and including the White or complementary component signals. These signals may be received by a lineated screen arrangement, not provided with the White lineations, but provided with the color lineations. In such case the kinescope would be rotated to bring the lineations into such condition of near verticality that proper registry of the several color dots with the color lineations would occur to secure the correct color interpretation (without inclusion of the White components).

The foregoing are mentioned as examples of such compatability as referred to herein. I have already shown how, by the use of such arrangements as those of Figures 23, 27, 30, 31, 33, and 29, it is possible to inject White light component into the replica, even when White light or complementary component signals are not included in the signals emitted from the sending station.

It is noted that such camera arrangements as those shown in Figures 59 and 60 will produce scanning effects in which a stereoscopic effect will be included in the signals derived from such camera arrangements. This is true since in each of the camera arrangements shown in these figures the same object element is viewed by the different camera elements from different angles, all of the camera elements being simultaneously and continuously focused at any given instant on the same element of the object. The distance between the outside camera elements (between 119 and 124, in Figure 59, and between 170 and 173, in Figure 60), is substantial, for example, substantially equal to the separation between the focal axes of a pair of human eyes; so the stereoscopic effect will be substantial, and will produce signals reflecting a substantial amount of such stereoscopic effect.

It is also noted that this stereoscopic effect will be secured, with such camera arrangements as those of Figures 59 and 60, either with inclusion of camera elements for White light or complementary component, or with inclusion of camera elements for the primary colors, but without inclusion of camera elements for the White or complementary component.

Reference has already been made to the control element 238 shown in Figure 23 whereby the kinescope beam may be shifted slightly between the white interpretation bands and the color interpretation bands of the showing of that figure. I have also pointed out that by connecting this element into the circuit of the electron beam, or some element which is responsive to or carries current proportional to the beam strength, the beam may be shifted between the white and color bands of each lineation to thereby effect changes in the proportion or strength of white light contained in each element of the replica. Also, that normally, if desired, the adjustment may be so made that the beam will ride the white band, and will be shifted onto the color band with increase of beam strength, corresponding to increase in strength of received signal.

In Figure 23 I have also shown this element as connected to the leads 255 and 256, which in turn connect to the proper portions of the receiver's circuits to effect the desired controls as above explained.

In Figure 23 I have also shown the coin or token controlled unit 257 having the slotted opening 258 through which a coin of stated denomination or a suitable token, may be inserted into the unit. This unit includes suitable switching means, including the contacts 259 and 260 which are connected into the lead 255. When these contacts are brought together the lead 255 is closed so that the element 238 will function in normal manner to effect beam shift. On the contrary, when said contacts are not closed said lead 255 is opened so that the element 238 does not effect beam shift, but leaves the beam to ride or travel along the white band of the lineation without being shifted onto the color band. Under these conditions it is evident that the replica will be produced in monochrome or black and white, even when the incoming signals are emitted from a sending station in such manner as to correspond to the primary colors. Thus, when the kinescope electron beam is traveling along a "red" lineation it will remain on the white band of such lineation, and thus translate in monochrome, but the strength of the signals will be reflected in the strength of the illumination of such white band from point to point. Thus a true monochrome replica will be produced instead of a color replica.

The unit 257 is so constructed that insertion of the coin or token will effect closing of the contacts 259 and 260, to thus switch to the color replica condition. This unit 257 may be provided with suitable time controlled means whereby the insertion of a coin or token will ensure closure of said contacts for a predetermined time interval, whereupon said contacts will separate, thus terminating the effective operation of the element 238 until another coin or token is inserted. In this way the production of the replica in color may be made dependent on the "pre-pay" principle, while at the same time allowing reception of the signals and translation thereof in monochrome without need of prepaying for such monochrome reception. Of course the time interval for which color reception will be ensured upon insertion of each coin or token may be made as great as desirable, for example, long enough to cover a full evening.

In Figure 25 I have shown a special control element 261 which, when brought into the receiving circuits in proper manner, will serve to cut out or modify the "interlace" operation, so that when this control element is brought into service the functioning of the "interlace" control will be modified to ensure that all scans will be along the "B" lineations, namely, the white lineations.

Under this operation, for a full frame or area of translation, each of the white lineations would be scanned twice, leaving the color lineations unscanned. Thus, with this operation a replica in monochrome would be produced, notwithstanding that the signals received could be translated in color replica when such special control element was not in service. This control element 261 is shown as being under control of a coin or token operated unit 262, similar to the unit 257 of Figure 23, and preferably also provided with a time limit element so that insertion of a single coin or token would ensure color reception for a specified time interval. However, it is noted that in the present case of Figure 25 the insertion of the coin or token should serve to open the circuit leading to the special control element 261, since that element should normally be in condition to effect monochrome reception, when the coin or token has not been inserted, or the time interval has been exhausted. In the arrangement of Figure 23, when the electron beam of the kinescope normally rides along the white band of a lineation such beam will then normally restore to that white band for production of monochrome reception when the coin time has expired.

Since in Figure 25 I have shown two schematic plans of scanning, one with a single interlace, and the other with a double interlace, I have indicated the special control element 261 as being effective for the single interlace arrangement.

In this Figure 25 I have also shown another special control element 263 which will, when effective, serve to cut out the double interlace operation shown by the legends "$a_1$," "$a_2$," . . ., "$b_1$," "$b_2$," . . ., "$c_1$," "$c_2$," . . ., etc. When this control element 263 is made effective the operation will be made without interlaces, and on the white lineations only, and in regular order and repetition. This special control element 263 is controlled by the coin or token unit 264 of form similar to that of the unit 262, and in place of such unit 262. That is to say, with this double interlace and coin unit or token control unit arrangement, reception will normally be in monochrome, the unit 263 normally being cut into service; but upon insertion of a coin or token said unit will be cut out of service for a predetermined time interval, to thus ensure scanning on the double interlace operation, for color reception according to the principle previously described herein.

In Figure 31 I have shown a special control element 265 which when brought into service will serve to ensure "dot" reception of the successive color signals on the white spaces 242 of that figure, so that monochrome reception will be produced. When this element 265 is not in service the reception is made according to the incoming color signals spotted onto the proper dots for proper color reception. When this element is cut into service the reception is made by spotting the dots onto the white areas 242 to produce the white and black or monochrome replica. The coin unit or token unit 266 is provided in this arrangement, for time control of this element 265 according to the principles already explained. Thus, with the arrangement of Figure 31 it is possible to secure either monochrome or true color interpretation when the incoming signals are emitted on the "dot" principle of the R. C. A., and under coin or token unit and time control, with reception normally under monochrome or black and white.

It is noted that fundamentally I have provided simple means in the form of a supplemental control for the kinescope beam or for the interlaces, whereby when said control element is in one position or one condition the translation and replica production will be in monochrome or black and white, whereas when such control element is in another condition or position the translation will be in true colors, with production of a corresponding replica. Although I have shown coin or token operated units for effecting time controls of these supplemental control elements I also contemplate remote control of such supplemental control elements, as from a central station or control office, either by wire control or by radio signal control, so that the ability to receive in color may be determined, in the case of each receiver, by signals transmitted from such central station or control office. By this means it will be possible to provide for normal television reception on the monochrome or black and white basis, and for color reception on the true color basis, but under subscription arrangements effected with such central station or control office. Therefore I also contemplate the connection of said supplemental control units 238, 261, 263 and 265 with a central station or control instead of being directly controlled by coin or token—time control units as previously mentioned herein.

In Figure 48 I have shown schematically a remote control of one form for enabling individual control of the supplemental units or elements for accomplishing the functions stated just above. In this case I have shown the plug board 267 located at a telephone exchange, for example, and provided with a jack 268 for each of the subscribers to the color television service. A line 269 is run from this control station to each subscriber, such line being provided with a plug which may be inserted into one of the jacks 268 when color service is to be rendered. The line 269 runs to the receiver of the subscriber and is properly connected therein to the supplemental control unit, such as the unit 238 shown in Figure 48. Thus, upon completing the connections at the plug board 267 of the control station the unit 238 will be properly actuated for enabling the receiver to produce the replica in true color. When such connection is not established at the control station the unit 238 will be in such condition that the reception of the television signals will be in form to produce the replica in monochrome or black and white. Several of the lines 269 are indicated in Figure 48 as 269$^a$, 269$^b$, 269$^c$, etc., it being understood that these lines are run to the different receivers which are entitled at times to receive the color service.

It is now seen that I have provided means whereby the received signals for color television camera analysis may be received and translated by the receiver either in true color replica, or in monochrome by simple switching control of supplementary means in various embodiments. However, in either of such conditions of operation a replica is produced which is a true replication of the object seen by the camera. Thus, such arrangements differ importantly from other and previously known arrangements wherein provision is made for reception in "scrambled" or incomplete, or unintelligible form of an image on the viewing screen, which image is thus of no value to the viewer, until application of a corrective control, either locally or remotely operated. In the case of my presently considered improvements there is always produced a true and satisfactory replica; in the case of such "scrambled" interpretation no image is produced of any intelligible or satisfactory value. In the case of my presently discussed feature, the replica is in monochrome or black and white quality of replication as a minimum quality; with production of a superior quality in true color as a higher quality of reception and replication. In the case of the "scrambled" type of reception the lower quality of reception ("scrambled") is of no value to the viewer whatsoever; and only upon introducing the corrective control into such an arrangement is there produced an intelligible signal.

It is further noted that I have made provision for normal reception in one quality of replica, monochrome or black and white, and for controlled reception in true color. Also, that such corrective effect may be produced either locally at or adjacent to the receiver itself, or remotely, as for example, from a suitable control station. Also, that provision is made for such corrective effect by pre-payed release, and for a time controlled duration, with restoration to the monochrome or black and white replication upon conclusion of such time interval, but that such restoration to monochrome or black and white at such conclusion of the time controlled interval does not destroy the usefulness of the receiver for further and indefinitely continued reception in true replica, but with a reduced quality of reception, in the sole sense that the replica is in monochrome or black and white instead of true color.

In connection with the disclosure herein of means to permit reception and translation in true colors a replica under time control a a pre-pay or other controlled or metered means, I have also provided means whereby translation of the replica may be made in true color according to either of two schemes of signal transmission, e. g., one scheme based on the linear scanning system of signals, and the other scheme based on the "dot" system of signals; together with pre-pay or other time-controlled or metered means to control reception of such color signals and translation thereof for replica production when operating on one of such systems, but without such control when operating on the other of such color translation and replica production system. For example, such pre-pay or metered reception and translation may be used when receiving the signals on the "dot" system, but without such necessity of pre-pay or metered control when operating on the linear scanning system. With this improvement it is possible for a sending station to emit its signals for some programs according to one such system, and to emit its signals for other programs according to the other such system; and the receiver would, with these improvements, be able to receive the signals emitted according to one system without time-control or pre-pay or the like, but in receiving according to the other signals emitted according to the other system of signalling it would be necessary to make use of the pre-pay or other controlled scheme of time control.

For example, a sending station might emit its normal programs throughout the day according to the linear system of scanning and reception, and the receivers incorporating the present improvements would be so constituted that reception and translation for production of the replica in color would be faithfully performed without need of pre-paying or metering the reception of such "normal service" color programs. Such sending station would also emit "special service" programs according to the other or "dot" system of emission, on a special charge or pre-pay basis for such special programs. According to the present improvements the same receiver would be able to receive and to faithfully translate and produce in color the replicas for both such kinds of programs, but in order to receive and translate the "special service" programs emitted under that other system (for example, the "dot" system) it would be necessary for the subscriber or user of such service to make pre-payment therefor on the time-controlled or other controlled or accounted basis.

As an example of means to effect such operations, reference may be had to Figures 48, 49 and 50, wherein I have shown a rotatable kinescope provided with the color lineations or the viewing screen capable of producing the colors in the lineated form for reception according to either the linear scanning or the "dot" system. In Figure 49 I have shown the unit 270 which is schematically shown as a coin operated pre-pay unit at or near the location of the receiver of which such kinescope is a part. This pre-pay unit is provided with the coin slot 271 and with the contacts 272 and 273 which latter are connected to the terminals 274 and 275. The rotatable kinescope carries the contact 276 to which is connected the flexible connection 277, so that when the kinescope is rotated substantially ninety degrees from its position shown in Figure 49 said contact 276 will engage another and stationary contact 278 connected to the connection 274 already referred to. The pre-pay unit contacts 272 and 273 are normally engaged with each other, and the connection 275 from the pre-pay unit leads to a special control element 279 to energize the same by current received over the flexible lead 277, contact 276, contact 278, connection 274, contacts 272 and 273, and connection 275, when the kinescope is rotated into the vertical lineation condition for color translation of signals incoming on the "dot" system, assuming that such "special service" is rendered on such "dot" system of signalling. The unit 279 is so constituted and comprises a portion of the receiving circuits, that when it is energized as just above described it places the kinescope or other essential element of the receiver in non-operative condition, until said contacts 272 and 273 are separated to thus open the circuit to this element 279. For example, such element 279 may serve when energized, to cut off the kinescope beam thus rendering the kinescope inoperative until the beam is again cut into service by the de-energizing of such element 279.

Upon inserting a suitable coin or token into the slot 271 the contacts 272 and 273 will be separated, to thus de-energize the element 279, and such condition will then continue for a predetermined time interval, after which the contacts 272 and 273 will again come together, to discontinue further color replica reception with the kinescope rotated into its vertical lineation condition. Of course the time interval which will be provided for by insertion of such coin or token should be sufficient to cover the time interval of such "special service" program, or the like.

It is to be noted that with this arrangement it is at all times possible to effect faithful color reception even without coin insertion or other control operation, but with such color reception limited to one of the two systems of signal emission, for example.

Instead of effecting the control which permits reception of the "special service" by means of a locally placed unit such as the pre-pay unit 270, or supplemental to such locally controlled unit I have also, in Figure 49, shown provision for a central station control whereby each of a number of subscribers may be supplied with such special service under contract or like arrangements. It is noted that when the kinescope is rotated to the special service reception position (for example, with the lineations substantially vertical), the supplemental unit or element 279 is caused to function to destroy or make inoperative the electron beam, and this condition continues until such element 279 is again made inoperative. When the pre-pay unit 270 is provided, the insertion of the coin therein opens the circuit to the element 279 for a predetermined time interval. Then, when such time interval has expired the pre-pay unit permits the element 279 to be again energized (assuming that the kinescope remains in its rotated condition), and the electron beam is either discontinued or interfered with to prevent reception. This condition will continue until another coin or token is inserted into the pre-pay unit, or until the kinescope is rotated back to its horizontal lineation condition, that is, to carry the contact 276 away from the contact 278.

I have shown, in Figure 49, the relay 282 including the stationary contacts 283 and 284, together with the solenoid 285 which acts, through its armature 286 to raise a movable contact 287 when the solenoid is energized. Otherwise, when the solenoid is de-energized said movable contact 287 will engage the stationary contacts 283 and 284 thus completing the circuit at this point. The connection 275 previously referred to includes the stationary contacts 283 and 284, so that as long as the movable contact 287 is down, the solenoid being un-energized, the circuit is completed between the contact 273 and the supplemental control unit 279. However, by energizing the solenoid 285 said movable contact 237 is raised to thus open the circuit between the contacts 283 and 284, thus deenergizing the element 279, and allowing the electron beam to again function for replica production.

Remote control means is provided for energizing or deenergizing such solenoid 285 of this relay. In the form shown in Figure 49 I have shown the control or switchboard 289, conveniently located, as at a subscriber's central office. This board 280 is provided with numerous jacks 280ᵃ for the various subscribers. There is carried a line 281 from each subscriber's receiver to this central office, each such line being provided with a plug which may be inserted into one of the jacks of the board 280. Each of these lines 281 extends to a location at or near to the subscriber's receiver, and is connected to the solenoid 285 of the corresponding relay. The other end of such solenoid is shown as being grounded, for convenient showing in Figure 49. Upon plugging the plug of the line 281 for any specified subscriber into the jack of the board 280 current will be supplied over the line 281 to the corresponding solenoid of the relay, thus raising the movable contact 287 of such relay, and opening the line 275 between the contacts 283 and 284. Thus, the supplemental element 279 for such receiver will be made inoperative as long as the line 281 has its plug inserted into the jack of the board 280, and the "special service" programs may be received and interpreted in correct color, over that system of radio signalling which has been reserved for such special service programs. This condition also will continue as long as the plug remains in the board 280, and irrespective of whether or not the pre-pay coin box or the like has been supplied with a coin or token. Thus the subscriber to the "special service" may receive the programs thereof, from day to day, or from time to time, without need of attending to the insertion of pre-pay into the coin box.

On the other hand, when the line 281 is disconnected at the board 280, by pulling out the plug from the jack, the relay 282 will be de-energized, and the movable contact 287 will engage the stationary contacts 283 and 284, thus completing the connection 275. Under these conditions, whenever the kinescope is rotated to the "special service" position the supplemental element 279 will be made operative to prevent production of the color replica received by signals of the "special service" type, and this condition will continue until the coin or token is introduced into the pre-pay box, assuming that the line 281 remains unplugged to the board 280 at the central station.

It is thus evident that I have provided means whereby such special service may be received under either local pre-pay control or under remote control, or by either of such schemes selectively on the same installation.

In Figure 49 I have shown several of the subscriber's lines 281 connected into the board 280, and individually designated as 281ᵃ, 281ᵇ, 281ᶜ, 281ᵈ, etc. In Figure 48 I have shown the supplemental element 279 schematically at a location adjacent to the kinescope gun, for convenience. This element may constitute an element in direct proximity to the kinescope gun, or may constitute an element constituting or controlling a portion of the receiver circuits, or the circuits energizing or controlling the electron gun, or otherwise.

I claim:

*Determining direction of scans compared to excitable surface*

1. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control strength of the electron beam, means to cause regularly recurring swings of the electron beam for excitation of the excitable surface along substantially parallel lines of scan, means to cause shifts of the electron beam in direction substantially at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, means to receive signals of varying strengths, means to vary the strength of the electron beam under control of the strengths of the received signals, the viewing screen and said excitable surface being constituted for delivery at the viewing surface of light from elemental areas under excitation of the excitable surface by registry of the electron beam with said areas, said viewing screen and said excitable surface being also constituted to deliver at the viewing screen surface light of one primary color from first selected areas under said electron beam excitation and to deliver at the viewing surface light of a second primary color from second selected areas under said electron beam excitation, said first selected areas being located in substantially parallel linear alignments, and said second selected areas being located in other substantially parallel linear alignments substantially parallel to and between linear alignments of the first selected areas, means to support the viewing screen and said excitable surface, means to support the electron beam swing producing means and the electron beam shift producing means, means to determine the direction of the parallel lines of scan of the electron beam as compared to elemental areas of the surface of the excitable surface, said direction determining means being constituted to produce said parallel lines of scan in a first selected direction on the excitable surface, being a direction of scan parallel to the linear alignments of the selected areas aforesaid, or in a second direction on the excitable surface, being a direction of scan across said linear alignments, selectively, together with adjustable means to select the direction of scan, whereby when said selecting means is adjusted to select the direction of the lines of scan in the first selected direction the replica is produced by scan along said alignments of the selected areas, and whereby when said selecting means is adjusted to select the direction of the lines of scan in the second selected direction the replica is produced by scan across said alignments of the selected areas.

2. Means as defined in claim 1, together with means to make inoperative said electron beam means when said direction determining means determines the direction of scan in one of said selected directions, a second control means, and means to make ineffective said inoperative making means under said second control means.

3. Means as defined in claim 2, wherein said second control means comprises an operator controlled device.

4. Means as defined in claim 2, wherein said second control comprises a remote control device.

5. In a television receiver a kinescope including a viewing screen having a viewing surface and also having a phosphor surface and means to excite said phosphor surface for the emission of an elemental area of light from the phosphor surface at the location of excitation of said phosphor surface, and viewable on said viewing surface, said exciting means including an electron beam delivering gun, means to vary the strength of the electron beam harmoniously with the strength of received signals, first beam deflecting means to cause regularly timed scans of the electron beam with respect to the phosphor surface in a first direction, second beam deflecting means to cause regular shifts of the said scans in direction normal to the direction of said scans, the phosphor surface and the viewing screen being constituted to deliver at the viewing surface an elemental area of light at location corresponding to the said elemental area of light excitation of the phosphor surface, and said phosphor surface and viewing screen being so constituted that the elemental areas of light delivered to the viewing surface include first selected areas of first primary color, and second selected areas of second primary color, and other selected areas of white illumination, all of said elemental areas being interspaced over the viewing surface according to a regular spatial pattern including groups of elemental areas, each group including at least one elemental area of first primary color, at least one elemental area of second primary color, and at least one elemental area of white illumination, the said elemental areas being coordinately spatially located in all of the groups, and means to control the direction of the scans of the electron beam with respect to the phosphor surface and viewing screen.

6. Means as defined in claim 5, wherein the spatial pattern of the elemental areas of the groups is characterized by the fact that scans of the electron beam in one direction with respect to the phosphor surface produce illumination for elemental areas of primary colors, and is further characterized by the fact that scans of the electron beam in another direction with respect to the phosphor surface and viewing screen produce illumination for elemental areas of white light.

7. Means as defined in claim 6, wherein the spatial pattern of the elemental areas of the groups is characterized by the fact that scans of the electron beam in the first direction also produce illumination for elemental areas of white light.

8. Means as defined in claim 5, wherein each group of elemental areas comprises elemental areas located in circular pattern, and wherein said circular pattern groups are located in substantially parallel alignments with respect to the viewing screen, and wherein the scans of the electron beam include functions of movement coordinated with the circular pattern of the group of elemental areas.

9. Means as defined in claim 8, wherein the elemental areas of white illumination of the groups are located in a series of lineations which are substantially parallel to each other and are non-parallel to the alignments of the groups.

10. Means as defined in claim 9, wherein the elemental areas of the first primary color are located in a series of lineations which are substantially parallel to each other and are substantially parallel to the lineations of the white illumination areas, and wherein the elemental areas of the second primary colors are located in a series of lineations which are substantially parallel to each other and are also substantially parallel to the lineations of the white illumination areas.

11. In a television receiver, means to receive and interpret either of a plurality of sets of received signals to produce a raster corresponding to either of at least two sets of the received signals, said receiving means including a screen having a set of light delivering elemental areas located in substantially parallel lineations, means to generate an electron beam, means to vary the intensity of said electron beam harmoniously with the variations of strength of the received signals, means to direct said electron beam to said elemental areas, first deflecting means to cause the electron beam to execute swings across the screen at substantially uniform speed, second deflecting means to cause the successive swings of the electron beam across the screen to occur at successive scans progressing in direction normal to the direction of said swings, said second deflecting means being constituted to produce the successive swings at separations substantially equal to the separations between the parallel lineations of the elemental areas aforesaid, one set of received signals including pulses of substantially uniform rate, the separations between the parallel lineations of elemental areas corresponding to advancements of the electron beam across the raster between successive pulses of said beam when the swings of the electron beam and the lineations of the elemental areas cross each other at a predetermined angle, together with means to cause the swings of the electron beam and the lineations of the elemental areas to be parallel to each other, or to cause the swings of the electron beam and the lineations of the elemental areas to cross each other at said predetermined angle.

12. Means as specified in claim 11, wherein the elemental areas of each lineation deliver light of one primary color, and wherein the successive lineations deliver light of at least two primary colors in succession when progressing across the screen in a selected direction, and wherein the successive pulses of the received signals correspond to the primary colors.

13. Means as specified in claim 11, wherein the elemental areas of each lineation deliver light of at least two primary colors, successive elemental areas of each lineation delivering said light of said two primary colors at the locations of successive elemental areas of such lineation, and wherein the elemental areas of successive lineations of the elemental areas crossed at said predetermined angle deliver light of said primary colors in succession harmoniously with the crossing of said lineations.

14. Means as specified in claim 11, wherein the elemental areas of alternate lineations deliver light of primary colors, the elemental areas of each lineation delivering light of a single primary color and successive primary color delivering lineations acting to deliver light of at least two primary colors in succession when progressing across the screen in a selected direction, and wherein the elemental areas of the intermediate lineations deliver white or monochrome light, and wherein the separations between alternate parallel lineations of elemental areas correspond to advancements of the electron beam across the raster between successive pulses of said beam when the swings of the electron beam and the lineations of the elemental areas cross each other at a predetermined angle.

15. Means as specified in claim 11, wherein the elemental areas of alternate lineations deliver light of at least two primary colors, successive elemental areas of each such lineation delivering said light of said two primary colors at the locations of successive elemental areas of such lineation, and wherein the elemental areas of the intermediate lineations deliver white or monochrome light, and wherein the elemental areas of successive primary color lineations which are crossed at said predetermined angle deliver light of said primary colors in succession, and wherein the separations between successive primary color lineations correspond to advancements of the electron beam across the raster between successive pulses of said beam when the swings of the electron beam and the lineations of the elemental areas cross each other at the predetermined angle.

16. Means as specified in claim 11, wherein the elemental areas of each lineation deliver light of at least two primary colors and white or monochrome, successive elemental areas of each lineation delivering said light of said primary colors and white or monochrome according to a regular spatial pattern over the area of the raster in which spatial pattern each traverse of the electron beam in direction parallel to the lineations includes elemental areas of all of the primary colors and white or monochrome in a regular succession, and in which spatial pattern each traverse of the electron beam in a direction crossing said lineations includes elemental areas of a single primary color contained in lineations so crossed.

17. Means as specified in claim 16, wherein said spatial pattern is so formed that each traverse of the electron beam in the direction crossing said lineations also includes elemental areas of white or monochrome.

18. Means as specified in claim 11, wherein the elemental areas of each lineation deliver light of a single primary color and white or monochrome, successive elemental areas of each lineation delivering said light of said primary color and white or monochrome according to a regular spatial pattern over the area of the raster in which spatial pattern each traverse of the electron beam in direction parallel to the lineations includes elemental areas of a single primary color and white or monochrome in a regular succession, and in which spatial pattern each traverse of the electron beam in a direction crossing said lineations includes elemental areas of all of the lineations so crossed.

19. Means as specified in claim 18, wherein said spatial pattern is so formed that each traverse of the electron beam in the direction crossing said lineations also includes elemental areas of white or monochrome.

20. Means as specified in claim 18, wherein said spatial pattern is so formed that selected traverses of the electron beam in the direction of crossing said lineations includes only elemental areas of white or monochrome.

*Producing raster and determining either monochrome or color*

21. In a television system, a receiver including a viewing screen having a viewing surface, an excitable surface in proximity to said viewing screen and including material to emit light under electron beam excitation, an electron beam, means to cause said electron beam to excite said excitable surface at selected elemental areas to produce a raster, the intensity of light emission of said material at each elemental area of the raster being proportional to the electron beam excitation of such elemental area, means to vary the strength of the electron beam excitation from elemental area to elemental area of said raster, means to deliver received signals to said electron beam strength varying means, the excitable surface being constituted for delivery to the viewing surface aforesaid a raster in monochrome when elemental areas of a first group of the excitable surface are excited, and for delivery to the viewing surface aforesaid a raster in natural color when elemental areas of a second group of the excitable surface are excited, means to determine the group of elemental areas excitable by the electron beam excitation, and means under control of the operator to actuate the determining means aforesaid for delivery of the raster to the viewing surface in monochrome or in natural color selectively.

22. Means as defined in claim 21, wherein said elemental area group determining means includes means to select one elemental area group, together with an operator controlled device in connection with said elemental area group determining means, and means in connection with said operator controlled device to select the other elemental area group upon operator actuation of said operator controlled device.

23. Means as defined in claim 21, wherein said elemental area group determining means includes means to select one elemental area group, together with an operator controlled remote control device in connection with said elemental area group determining means, and means in connection with said operator controlled remote control device to select the other elemental area group upon operator actuation of said operator controlled remote control device.

24. Means as defined in claim 21, wherein said elemental area group determining means includes means to normally cause determination of the elemental area group for delivery of the raster in monochrome.

25. In a television system, a receiver including a viewing screen having a viewing surface, an excitable surface in proximity to said viewing screen and including material to emit light under electron beam excitation, an electron beam, means to cause said electron beam to excite said excitable surface at selected elemental areas to produce a raster, the intensity of light emission of said material at each elemental area of the raster being proportional to the electron beam excitation of such elemental area, means to vary the strength of the electron beam excitation from elemental area to elemental area of said raster, means to deliver received signals to said electron beam strength varying means, the viewing surface and the excitable surface being constituted for delivery to the viewing surface aforesaid a raster in monochrome when elemental areas of a first group of the excitable surface are excited, and for delivery to the viewing surface aforesaid a raster in natural color when elemental areas of a second group of the excitable surface are excited, means to cause the electron beam to excite the elemental areas of either the first group of elemental areas or the second group of elemental areas selectively, to thereby determine the group of elemental areas excited by the electron beam excitation, and means under control of the operator to actuate the determining means aforesaid for delivery of the raster to said viewing surface in monochrome or in natural color selectively.

*Interwoven groups of light emitting areas*

26. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control strength of the electron beam, means to cause regularly recurring swings of the electron beam in one direction of lateral movements for excitation of the excitable surface across said surface along substantially parallel lines of scan, means to cause shifts of the electron beam in direction substantially at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, each cycle comprising a frame of said shifts, and including means to cause restoration of the beam to a location of frame start at completion of each of said frames of shifts, means to receive signals of varying strengths, means to vary the strength of the electron beam under control of the strengths of the received signals, the viewing screen and excitable surface being constituted for delivery at the viewing surface of light from elemental areas under excitation of the excitable surface by registry of the electron beam with said areas, said viewing screen and said excitable surface being also so constituted as to deliver at the viewing surface light of one primary color from first selected areas under said electron beam excitation and to deliver at the viewing surface light of a second primary color from second selected areas under said electron beam excitation, said first selected areas being spaced apart, said second selected areas being spaced apart, third selected areas between the spaced apart selected areas of the first and second primary colors aforesaid, all of said third selected areas being so constituted as to deliver at the viewing surface white light under said electron beam excitation, the selected areas for each primary color being located in linear alignments extending across the viewing screen in one direction, and the third selected areas being located in linear alignments extending across the viewing screen in a direction other than the direction of the linear alignments of the primary color selected areas.

27. Means as specified in claim 26, wherein the selected areas of the several primary colors are located in linear alignments in each of which linear alignments selected areas of the several primary colors are located in alternation, and in each of which linear alignments there is a third selected area between successive selected areas of the primary colors.

28. Means as specified in claim 27, wherein the selected areas of each primary color contained in adjacent linear alignments are not located in linear alignments extending at right angles to the linear alignments first mentioned.

29. Means as specified in claim 26, together with means to cause the electron gun to deliver pulses of electron beam during each scan swing of said electron beam, said pulse causing means producing said pulses harmoniously with sweep of the electron beam across the excitable surface by distances equal to the center to center distances between successive selected areas which produce primary colors at the viewing surface under electron beam excitation.

30. Means as specified in claim 29, together with means to control the electron beam swing producing means to cause delivery of electron beam pulses harmoniously with excitation of the primary color selected areas of the lineations or harmoniously with excitation of the white light selected areas of said lineations, together with means to select delivery of the electron beam pulses either harmoniously with excitation of the primary color selected areas of the lineations or harmoniously with excitation of the white light selected areas of said lineations.

31. Means as specified in claim 30, wherein said means to select delivery of the electron beam pulses normally functions for delivery of the pulses to excite the selected areas for white light.

32. Means as specified in claim 31, wherein said means to select delivery of the electron beam pulses includes a coin controlled time count device including means to make operative the means to select delivery of the electron beam pulses for excitation of the selected areas for primary colors for a predetermined time interval controlled by a coin or token.

*Selecting groups of elemental areas*

33. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control strength of the electron beam, means to cause regularly recurring swings of the electron beam in one direction of lateral movements for excitation of the excitable surface across said surface along substantially parallel lines of scan, means to cause shifts of the electron beam in direction substantially at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, each cycle comprising a frame of said shifts, and including means to cause restoration of the beam to a location of frame start at completion of each of said frames of shifts, means to receive signals of varying strengths, means to vary the strength of the electron beam under control of the strengths of the received signals, the viewing screen and excitable surface being constituted for delivery at the viewing surface of light from elemental areas under excitation of the excitable surface by registry of the electron beam with said areas, said viewing screen and said excitable surface being also so constituted as to deliver at the viewing surface light of one primary color from first selected areas under said electron beam excitation and to deliver at the viewing surface light of a second primary color from second selected areas under said electron beam excitation, and to deliver at the viewing surface white light from third selected areas under said electron beam excitation, said first selected areas being located in parallel linear alignments, and said second selected areas being located in other linear alignments parallel to and between the linear alignments of the first selected areas, and said third selected areas being located in other linear alignments parallel to and between selected ones of the linear alignments aforesaid, there being a linear alignment of the third selected areas for each linear alignment of the first selected areas and another linear alignment of the third selected areas for each linear alignment of the second selected areas, and there being one of said linear alignments of the third selected areas adjacent to each of the linear alignments of the first selected areas and another linear alignment of the third selected areas adjacent to each of the linear alignments of the second selected areas, the linear alignments of the first and second selected areas comprising linear alignments of one group and the linear alignments of the third selected areas comprising linear alignments of another group, together with means to control the electron beam shift causing means to establish the lines of electron beam scan in registry with the linear alignments of the first group, or in registry with the linear alignments of the second group, selectively, said electron beam control means last mentioned being constituted to normally cause beam scans to occur on the linear alignments of one of said groups, together with operator controlled means to cause electron beam scan on the linear alignments of the other group.

34. Means as specified in claim 33, wherein the means to selectively control the electron beam shift causing means includes a coin controlled time count device including means to make operative the means to cause electron beam scan on the alignments of said other group for a predetermined time interval controlled by a coin or token.

35. Means as specified in claim 33, wherein the means to selectively control the electron beam shift causing means includes a remote control device having a first position and a second position, and wherein said remote control device controls the electron beam shift causing means to cause scan on the alignments of said other group when said remote control device is in its second position.

36. Means as specified in claim 33, wherein the means to control the electron beam shift causing means includes means to control the amount of registry of the lines of electron beam scan with the linear alignments of the first selected areas and the second selected areas and the adjacent linear alignments of the third selected areas, said means to control the amount of registry aforesaid including means under the control of the strength or the strengths of the received signals to control the amount of such registry.

37. Means as specified in claim 33, wherein the electron beam shift causing means normally causes scan of the electron beam in registry with the alignments of the second group, and wherein said electron beam shift causing means includes means to cause shift of the said lines of electron beam scan towards the linear alignments of the first group which are adjacent to the third selected areas being scanned.

38. Means as specified in claim 37, wherein said means which causes shift of the lines of electron beam scan towards the linear alignments of the first group causes shift of said electron beam scan towards the linear alignments of the first group by amounts proportional to the strengths of the received signals.

*Relative movement of electron beam scans and viewing screen; direction*

39. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control strength of the electron beam, means to cause regularly recurring swings of the electron beam in one direction of movement for excitation of the excitable surface across said surface along substantially parallel lines of scan, means to cause shifts of the electron beam in direction substantially at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, each cycle comprising a frame of said shifts, and including means to cause restoration of the beam to a location of frame start at completion of each of said frames of shifts, means to receive signals of varying strengths, means to vary the strength of the electron beam under control of the strengths of the received signals, the viewing screen and said excitable surface being constituted for delivery at the viewing surface of light from elemental areas under excitation of the excitable surface by registry of the electron beam with said areas, said viewing screen and said excitable surface being also constituted to deliver at the viewing surface light of one primary color from first selected areas under said electron beam excitation and to deliver at the viewing surface light of a second primary color from second selected areas under said electron beam excitation, said first selected areas being located in substantially parallel linear alignments, and said second selected areas being located in other substantially parallel linear alignments substantially parallel to and between linear alignments of the first selected areas, means to support the viewing screen and said excitable surface, means to support the electron beam swing producing means and the electron beam shift producing means, all of said supporting means including means permitting relative movement of the electron beam swing producing means and electron beam shift producing means, and the viewing screen and excitable surface, with respect to each other, said relative movement comprising a rocking movement about an axis of rock substantially normal to the viewing screen and the excitable surface, whereby when the viewing screen and excitable surface, and the electron beam swing producing means and electron beam shift producing means are in one position of rock with respect to each other, the lines of electron beam scan are parallel to the linear alignments of the selected areas for primary colors aforesaid, for delivery of light at the viewing screen surface of the primary colors produced by excitation of the excitable surface along said alignments, and whereby when the viewing screen and excitable surface, and the electron beam swing producing means and electron beam shift producing means are in another position of rock with respect to each other, the lines of electron beam scan cross the linear alignments of the selected areas for primary colors aforesaid for delivery of light at the viewing screen surface produced by excitation of the excitable surface and viewed at the points of crossing said linear alignments, together with means to selectively produce either of said defined relative movements of the electron beam swing producing means and the electron beam shift producing means with respect to the viewing screen and excitable surface under control of the operator.

40. Means as defined in claim 39, wherein there are selected areas for delivery at the viewing surface of white light at uniformly spaced locations along each linear alignment, and wherein said white light selected areas of the linear alignments are located in linear alignments which cross the linear alignments first mentioned.

41. Means as defined in claim 39, together with means to make inoperative said electron beam means for one position of rock, and second means to make ineffective said inoperative making means upder a second control.

42. Means as defined in claim 41, wherein said second control comprises a coin controlled time count device.

43. Means as defined in claim 41, wherein said second control comprises a remote control device.

*Relative movement of election beam scans and viewing screen; rockable screen*

44. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control strength of the electron beam, means to cause regularly recurring swings of the electron beam in one direction of lateral movements for excitation of the excitable surface across said surface along substantially parallel lines of scan, means to cause shifts of the electron beam in direction substantailly at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, each cycle comprising a frame of said shifts, and including means to cause restoration of the beam to a location of frame start at completion of each of said frames of shifts, means to receive signals of varying strengths, means to vary the strength of the electron beam under control of the strengths of the received signals, the viewing screen and said excitable surface being mounted for rock about an axis substantially normal to said excitable surface, means to support the electron beam swing producing means and the electron beam shift producing means stationary during rock of the viewing screen and said excitable surface as aforesaid, whereby the lines of scan and the locations of the frames of said lines of scan for the electron beam swings and shifts of swings remain unchanged with respect to said axis of rock for all rock positions of the viewing screen and said excitable surface, the viewing screen and said excitable surface being constituted for delivery at the viewing surface of light from elemental areas under excitation of the excitable surface by registry of the electron beam with said areas, said viewing screen and said excitable surface being also constiutted to deliver at the viewing surface light of one primary color from first selected areas under said electron beam excitation and to deliver at the viewing surface light of a second primary color from second selected areas under said electron beam excitation, said first selected areas being located in substantially parallel linear alignments, and said second selected areas being located in other substantially parallel linear alignments substantially parallel to and between the linear alignments of the first selected areas, whereby when the viewing screen and the excitable surface are in one position of rock the lines of electron beam scan are parallel to the linear alignments of the selected areas for the primary colors aforesaid for delivery of light at the viewing surface of the same primary color during complete scan of each linear alignment of elemental areas, and whereby when the viewing screen and the excitable surface are in another position of rock the lines of electron beam scan cross the linear alignments of the selected areas for the different primary colors in succession for delivery of light at the viewing surface of different primary colors in succession corresponding to scan of the electron beam across the successive linear alignments of the elemental areas.

45. Means as specified in claim 44, together with means to control the electron beam producing and directing means, said control means having an electron beam producing and directing means first position and an electron beam producing and directing means second position, and means to move the control means to either of said positions selectively, said selectively moving means including means in connection with the viewing screen and the excitable surface and movable with rock of the viewing screen and said excitable surface to the first position of said control means for one position of said rock, and to the second position of said control means for the other position of said rock.

46. Means as specified in claim 45, together with second control means to make operative the electron beam producing and directing means when the viewing screen and the excitable surface are in said second position of rock of said viewing screen and said excitable surface.

47. Means as specified in claim 46, wherein said second control means includes a coin controlled time count device including means to make operative the electron beam producing and directing means for a predetermined time interval controlled by a coin or token.

48. Means as specified in claim 46, wherein said second control means includes a remote control device having an operative position and an inoperative position.

49. Means as specified in claim 44, wherein said viewing screen and said excitable surface are also constituted to deliver white light at the viewing surface from selected other areas under said electron beam excitation, and wherein said other areas are located in other linear alignments substantially parallel to and between selected linear alignments of the elemental areas which deliver at the viewing surface light of the pirmary colors by excitation of the electron beam.

50. Means as specified in claim 49, together with means to control the electron beam producing and directing means, said control means having an electron beam producing and directing means first position and an electron beam producing and directing means second position, and means to move the control means to either of said positions selectively, said selectively moving means including means in connection with the viewing screen and the excitable surface and movable with rock of the viewing screen and said excitable surface to the first position of said control means for one position of rock, and to the second position of said control means for the other position of said rock.

51. Means as specified in claim 50, together with second control means to make operative the electron beam producing and directing means when the viewing screen and the excitable surface are in said second position of rock of said viewing screen and said excitable surface.

52. Means as specified in claim 51, wherein said second control means includes a coin controlled time count device including means to make operative the electron beam producing and directing means for a predetermined time interval controlled by a coin or token.

53. Means as specified in claim 51, wherein said second control means includes a remote control device having an operative position and an inoperative position.

54. Means as specified in claim 49, wherein there is in said viewing screen and said excitable surface a linear alignment of said areas for delivery to the viewing surafce white light, said alignment being parallel to and adjacent to each of said linear alignments which delivers light of a primary color.

55. Means as specified in claim 54, together with means to control the electron beam producing and directing means, said control means having an electron beam producing and directing means first position and an electron beam producing and directing means second position, and means to move the control means to either of said positions selectively, said selectively moving means including means in connection with the viewing screen and the excitable surface and movable with rock of the viewing screen and said excitable surface to the first position of said control means for one position of said rock, and to the second position of said control means for the other position of said rock.

56. Means as defined in claim 55, together with second control means to make operative the electron beam producing and directing means when the viewing screen and the excitable surface are in said second position of rock of said viewing screen and said excitable surface.

57. Means as defined in claim 56, wherein said second control means includes a coin controlled time count device including means to make operative the electron beam producing and directing means for a predetermined time interval controlled by a coin or token.

58. Means as defined in claim 56, wherein said second control means includes a remote control device having an operative position and an inoperative position.

*Brilliance component; Munsell scale intensity*

59. In a system of television, means to produce a replica of an image which replica includes brilliance component substantially equal to the brilliance component contained in the object of which said image is a replica according to the Munsell scale, including means to produce at least two categories of signals, said signal producing means including means to produce the signals which are included in one category to comprise a plurality of sets of regularly recurring cycles of signals with each cycle of each set of said signals including signal elements corresponding to different elemental areas of an image of an object and with the signal elements in said category of strengths proportional to the intensity of illumination of said elemental areas to which said signal elements correspond, the elemental areas of the image which elemental areas correspond to the signals which are included in each cycle of each set of said category being located at predetermined locations of said image according to a predetermined spatial pattern of said elemental areas, the cycles of the signals of all the sets of said category being of the same frequency, means to produce the signals of one set of said category during illumination of the elemental areas to which the signals of said set correspond under light of one primary color, means to produce the signals of another set of said category under illumination of the elemental areas to which the signals of said set correspond under light of another primary color, and said signal producing means including means to produce the signals of the other category in at least one set of regularly recurring cycles of signals and including signal elements corresponding to different elemental areas of an image of the same object as aforesaid and including means to produce the signal elements in said other category of strengths on the Munsell scale proportional to the intensity of illumination of said elemental areas to which said other category signals correspond, the elemental areas of the image which elemental areas correspond to the signals which are included in each cycle of said regularly recurring cycles of signals of said other category being located at predetermined locations of said image according to a predetermined spatial pattern of said elemental areas, the cycles of the signals of said other category being of the same frequency as the cycles of the signals of the first category, means to produce the signals of said other category during illumination of the elemental areas to which the signals of said other category correspond under visible light including wave lengths different from the wave lengths of said primary colors, together with common signal sending means, means to deliver to said signal sending means signals from all of the cycles of signals of both of said signal category producing means, and means in connection with the signal sending means to emit cycles of signals, each cycle emitted including the signals of all sets of both categories in a preselected order of timing of the signals of all of said sets of signals.

60. Means as specified in claim 59, wherein the illumination of the elemental areas of the image during production of selected ones of the signals of said other category is light of color complementary to one of said primary colors, and wherein the illumination of the elemental areas of the image during production of other selected signals of said other category is light of color complementary to the other of said primary colors.

61. Means as specified in claim 59, wherein the illumination of the image during production of the signals of each cycle of said other category is of color complementary to the primary color under which the signals of the corresponding cycle of the first category are produced.

62. Means as specified in claim 59, wherein said signal producing means includes a plurality of image producing means, including one such means to produce an image of the object corresponding to each set of regularly recurring signals of the first category of signals and also corresponding to each set of regularly recurring signals of the second category of signals, and wherein the illumination means for the elemental areas for signals of the first mentioned category includes means to produce each of the images corresponding to a set of signals of such category under light of one primary color corresponding to said signals, and wherein the illumination means for the elemental areas for signals of the second mentioned category includes means to produce each of the images corresponding to a set of signals of such second mentioned category under visible light including wave lengths different from the wave lengths of said primary colors.

63. Means as specified in claim 62, wherein the illumination means for the elemental areas for signals of the second mentioned category includes means to produce the images corresponding to the sets of such second mentioned category signals under light of color complementary to one of the primary colors of light under which an image is illuminated during production of signals of one set of the first mentioned category.

Stereoscopic

64. In a system of television, the combination of a plurality of camera elements, each camera element including a lens system, and means in connection with such camera element to produce regularly timed signals of strength proportional to the intensity of light delivered by the lens system of such camera element from successively located elemental areas of an object in focal alignment with the lens system of such camera element, said signals of each camera element occuring at equal time intervals, and the signals of all the camera elements occurring at equal time intervals, and the lens systems of the camera elements being so constituted that the rays of light reflected from any elemental area of the object to any camera element leave such elemental area at an angle different from the rays of light leaving such elemental area to each of the other camera elements; a common signal delivering system, means to deliver to said common signal delivering system signals from all of the camera elements in regularly recurring cycles of signals, each cycle including a signal from each camera element and the signals contained in all of said cycles coming from all of the camera elements in the same order of progression, means to deliver from said common signal delivering system signals corresponding to the signals from all of the camera elements, said signals delivered from said common delivering system being of strengths proportionate to the strengths of the corresponding signals delivered from the camera elements to the common signal delivering system, the lens systems of all of the camera elements being constituted to simultaneously receive separate rays of light from any elemental area of an object and all of said rays of light being individual to said lens systems.

65. Means as defined in claim 64, wherein the signal producing means of each camera element in response to light rays of a primary color different from the primary colors of the light rays to which the signal producing means of the other camera elements respond.

66. In a system of television, the combination of signal sending means including a plurality of camera elements having lens systems to receive light from a common object, means to support said camera elements at positions to simultaneously receive at the lens systems of said camera elements light emitted by said common object, the arrangement being such that the light which is emitted from any elemental area of said common object and incident at the lens system of any camera element leaves said elemental area of the common object at an angle different from the light simultaneously emitted from said elemental area of the common object and incident at the lens systems of all of the other camera elements, an image surface element in each camera element on which the light received from the lens system of such camera element is brought to focus, means to continuously scan the image surfaces of all of the camera elements in synchronism and according to a preselected pattern of scanning, each camera element including means to emit signals during scan of the image surface of such camera element and of strength proportionate to the strength of illumination of such surface at the elemental areas being scanned, a common signal sending system, means to deliver to said common signal sending system signals from the camera elements in a regular order of succession and in repeated cycles of said signals from the camera elements, said signals corresponding in strengths to the intensities of illumination of the elemental areas of the image surfaces of the camera elements at the instants of the signals corresponding to such areas, to thereby deliver to the signal sending system signals of strengths corresponding to the light intensities received by the image surfaces of the several camera elements from their lens systems as aforesaid in a regular repetitive cyclic order of said signals, and means in connection with said sending system to emit signals of strengths corresponding to the strengths of the elemental signals and in the regular repetitive cyclic order aforesaid.

67. Means as defined in claim 66, wherein said camera elements are movable with respect to each other on said supporting means, the supporting means including means to produce movement of the camera elements with respect to each other to cause the focal axes of the camera elements to intersect each other at a common point for each moved position of the camera elements and to cause the lens systems of all of the camera elements to come to focus at such common point for any moved position of the camera elements.

68. Means as defined in claim 67, wherein said camera element supporting means for the camera elements includes a pivotal support for at least one of the camera elements, said pivotal support being so constituted that the camera elements are movable with respect to each other to positions to receive simultaneously at the lens systems of said camera elements light emitted by said common object.

69. Means as defined in claim 68, together with means in connection with the lens systems of the camera elements for change of the focal lengths of the lens systems of the camera elements harmoniously with rock of the camera elements with respect to each other, said means being constituted to cause the focal lengths of the camera lens systems to be substantially equal to the distances from the individual camera lens systems to the common point of light origin for all relatively rocked positions of the camera elements.

Compensation for "Efficiency of Vision" for various wave lengths

70. In a television system a receiver including a viewing screen having a viewing surface, an excitable surface in proximity to said viewing screen and including material to emit light under excitation of an electron beam, an electron gun to produce and direct an electron beam towards the excitable surface aforesaid, means to control the strength of the electron beam, means to cause regularly recurring swings of the electron beam in one direction of lateral movements for excitation of the excitable surface across said surface along substantially parallel lines of scan, means to cause shifts of the electron beam in direction substantially at right angles to the lines of scan aforesaid to establish the locations of the lines of scan on said excitable surface, the electron beam swing causing means producing said scans at substantially equal time intervals, the electron beam shift causing means producing lines of scan at substantially equal spacings on said excitable surface and at substantially equal time intervals through cycles of beam shifts, each cycle comprising a frame of said shifts, and including means to cause restoration of the beam to a location of frame start at completion of each of said frames of shifts, means to receive signals of varying strengths, means to vary the strength of the electron beam under control of the strengths of the received signals, the viewing screen and excitable surface being constituted for delivery at the viewing surface of light from elemental areas under excitation of the exictable surface by registry of the electron beam with said areas, said viewing screen and said excitable surface being also so constituted as to deliver at the viewing surface light of one primary color from first selected areas under said electron beam excitation and to deliver at the viewing surface light of a second primary color from second selected areas under said electron beam excitation, said first selected areas being located in parallel linear alignments, and said second selected areas being located in other linear alignments parallel to and between the linear alignments of the first selected areas, the swings of the electron beam being substantially parallel to all of said linear alignments, together with means to cause each frame of shifts of a cycle of swings of the electron beam to include scans of the linear alignments of the primary color elemental areas, the first selected areas and the second selected areas aforesaid being of sizes substantially proportional to the reciprocals of the efficiencies of the human eye to visual sensations caused by light of the wave lengths of said primary colors and emitted by said first and second selected areas under the electron beam excitation, respectively.

71. Means as specified in claim 70, together with means to deliver at the viewing surface white light from third selected areas under said electron beam excitation, wherein said third selected areas are of sizes substantially proportional to the reciprocals of the efficiency of the human eye to visual sensations caused by the white light emitted by said third selected areas under the electron beam excitation.

References Cited in the file of this patent

UNITED STATES PATENTS

| | | |
|---|---|---|
| 2,287,307 | Herbst | June 23, 1942 |
| 2,431,115 | Goldsmith | Nov. 18, 1947 |
| 2,492,926 | Valensi | Dec. 27, 1949 |
| 2,521,010 | Homrighous | Sept. 5, 1950 |
| 2,554,693 | Bedford | May 29, 1951 |
| 2,558,040 | Kalfaian | June 26, 1951 |
| 2,560,168 | Goldsmith | July 10, 1951 |
| 2,567,040 | Sziklai | Sept. 4, 1951 |
| 2,580,903 | Evans | Jan. 1, 1952 |
| 2,627,549 | Kell | Feb. 3, 1953 |
| 2,657,257 | Lesti | Oct. 27, 1953 |